(12) United States Patent
Komatsu et al.

(10) Patent No.: US 6,577,459 B1
(45) Date of Patent: *Jun. 10, 2003

(54) METHOD AND APPARATUS FOR MAGNETIC TRANSFER

(75) Inventors: Kazunori Komatsu, Odawara (JP);
Makoto Nagao, Odawara (JP);
Masakazu Nishikawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 116 days.

This patent is subject to a terminal disclaimer.

(21) Appl. No.: 09/592,447

(22) Filed: Jun. 12, 2000

(30) Foreign Application Priority Data

Jun. 11, 1999 (JP) .......................... 11-164876
Jul. 27, 1999 (JP) .......................... 11-211927

(51) Int. Cl.⁷ .................................. G11B 5/86
(52) U.S. Cl. ................ 360/15; 360/17; 360/360; 360/16
(58) Field of Search .................. 360/15, 17, 16; 369/13

(56) References Cited

U.S. PATENT DOCUMENTS 4,110,797 A * 8/1978 Hoshino et al. ............ 360/17
4,422,106 A * 12/1983 Sawazaki ................... 360/17
5,032,931 A * 7/1991 Suzuki et al. ............... 360/17
6,181,492 B1 * 1/2001 Bonyhard .................. 360/17
6,347,016 B1 * 2/2002 Ishida et al. ............... 360/135

FOREIGN PATENT DOCUMENTS

JP 360151843 A * 8/1985 ................. 360/17

* cited by examiner

*Primary Examiner*—David Hudspeth
*Assistant Examiner*—Varsha A. Kapadia
(74) *Attorney, Agent, or Firm*—Sughrue Mion, PLLC

(57) ABSTRACT

The present invention provides a method for magnetic transfer and an apparatus for magnetic transfer, by which it is possible to transfer a transfer pattern with high quality from a master carrier for magnetic transfer to a slave medium by magnetic transfer regardless of position of the magnetic pattern. The method and the apparatus for magnetic transfer according to the present invention are used to apply magnetic field for transfer by bringing the master carrier for magnetic transfer into contact with the slave medium, the master carrier having a magnetic layer formed on a portion corresponding to an information signal on surface of a substrate, and the slave medium being a magnetic recording medium for receiving magnetic transfer after performing initial DC magnetization by a magnetic field by more than 1.5 times higher than the coercive force Hcm of the slave medium under the condition that the slave medium is combined with the master carrier for magnetic transfer closely together, and a recording information on the master carrier for magnetic transfer is transferred by applying a magnetic field in opposite direction to the direction of the initial DC magnetization under the condition that the slave medium is combined with the master carrier for magnetic transfer closely together.

44 Claims, 45 Drawing Sheets

(A)

(B)

(C)

METHOD AND APPARATUS FOR MAGNETIC TRANSFER

BACKGROUND OF THE INVENTION

The present invention relates to a method for recording a large amount of information on a magnetic recording medium at one time, and in particular, to a method for transferring a recording information to a magnetic recording medium of large capacity and high recording density.

With rapid development and progress in the utilization of digital image, amount of information to be handled in personal computers and other devices has extensively increased. Because of the increase of the amount of information, there are now strong demands on a magnetic recording medium, which has larger capacity to record the information and can be manufactured at low cost and requires shorter time for writing and reading operations.

In a high density recording medium such as hard disk or in a high density floppy disk type magnetic recording medium represented by ZIP (Iomega Inc.), information recording area has narrower track compared with the floppy disk now commonly used. In order that magnetic head can scan over narrow track width and signals can be recorded or reproduced with high S/N ratio, it is necessary to perform accurate scanning by the tracking servo technique.

In a large capacity magnetic recording medium such as a hard disk or a removable type magnetic recording medium, servo signal for tracking or address information signal, reproduction clock signal, etc. are recorded with a certain spacing between them within one turn of the disk. This is the so-called pre-format.

By reading this pre-formatted signal and by correcting its own position, the magnetic head can run accurately on the track.

In the mode of pre-formatting currently in practice, disks are recorded one by one and track by track using a special-purpose servo recorder. However, there are problems in that the servo recorder are expensive and long time is required for the preparation of the pre-format and this means longer time for manufacture and higher manufacturing cost.

In this respect, a method has been proposed to perform magnetic transfer without carrying out pre-format for each track. For example, a transfer technique is described in Japanese Patent Publications Laid-Open 63-183623, 10-40544, and 10-269566. However, none of these inventions provides a proposal suitable for practical applications. There has been no disclosure on concrete means or conditions such as the condition of magnetic field to be applied at the magnetic transfer in the method for magnetic transfer or the means for generating the magnetic field.

To solve the problems as described above, the following method has been proposed in Japanese Patent Publications Laid-Open 63-183623 and 10-40544: On the surface of the substrate, surface irregularities (i.e. recesses and projections; concave portions and convex portions) corresponding to information signals are formed. The surface of the master carrier for magnetic transfer where ferromagnetic thin film is formed at least on the projections is brought into contact with the surface of sheet-type or disk-type magnetic recording medium where ferromagnetic thin film or ferromagnetic powder coating layer is formed. Or, AC bias magnetic field or DC magnetic field is applied to excite ferromagnetic material which constitutes the surface of the projections. As a result, magnetized pattern to match the surface irregularities is recorded on the magnetic recording medium.

According to this method, the surface of the projected portions of the master carrier for magnetic transfer is brought closely together to the magnetic recording medium to be pre-formatted, i.e. the slave medium, and the ferromagnetic material which constitutes the projected portions is excited. As a result, the desired format is formed on the slave medium. By this method, recording can be carried out statically without changing relative positions of the master carrier for magnetic transfer and the slave medium, and accurate pre-format recording can be performed. Also, the time required for the recording is very short. Specifically, in the method for recording from the magnetic head as described above, the time of several minutes to several tens of minutes is normally required, while magnetic transfer can be completed within one second regardless of the recording capacity or recording density in this magnetic transfer method.

Now, description will be given on the transfer of pattern for pre-format in the master carrier for magnetic transfer referring to FIG. 1. FIG. 1 (A) is a schematical plan view to explain magnetic layer surface of the master carrier for magnetic transfer, and FIG. 1 (B) is a cross-sectional view to explain the process of transfer.

On a certain area of the track of the master carrier 1 for magnetic transfer, a pre-format region 2 and a data region 3 where patterns of servo signals and address signal for tracking to be transferred are formed. By bringing the master carrier 1 for magnetic transfer and the slave medium 4 closely together and by applying an external magnetic field 6 for transfer in track direction 5, the pre-format information can be transferred to the slave medium as a recording information 7. Thus, the slave medium can be manufactured with high efficiency.

However, it has been made clear that, when magnetic transfer is performed according to this method, the quality of information signal may be deteriorated, and that servo action may be inaccurate.

SUMMARY OF THE INVENTION

It is an object of the present invention to provide a method and an apparatus for stable magnetic transfer by bringing a master carrier for magnetic transfer and a slave medium closely together and by transferring a pre-format pattern through application of an external magnetic field in order to prevent inaccurate servo operation of the slave medium.

It is another object of the present invention to provide a method for magnetic transfer and an apparatus for magnetic transfer for performing a series of processes including initial DC magnetization of the slave medium and the transfer of the recording information.

The object of the present invention can be attained by a method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprises a step of performing initial DC magnetization prior to the magnetic transfer under the condition that said master carrier for magnetic transfer is closely combined together with said slave medium.

The present invention also provides a method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprising the steps of applying magnetic field in track direction on the surface of the slave medium under the condition that said master carrier for magnetic transfer is closely combined together with said slave medium, and after performing initial DC magnetization in track direction on the slave medium in advance, of applying a magnetic field for transfer in track direction on the surface of the slave medium, and of performing magnetic transfer.

The present invention also provides the method for magnetic transfer as described above, wherein said method comprises the steps of generating a magnetic field, on a part in track direction, with magnetic field intensity distribution having a portion with magnetic field intensity by more than 1.5 times higher than coercive force Hcm of the slave medium at least at one point on a position in track direction, and of applying magnetic field for performing initial DC magnetization in track direction on the slave medium by rotating a combination unit comprising the slave medium and the master carrier for magnetic transfer combined closely together or by rotating the magnetic field in track direction.

The present invention also provides a method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprising the steps of generating a magnetic field with magnetic field intensity distribution for initial DC magnetization by more than 1.5 times higher than coercive force Hcm of the slave medium on a portion in track direction, and after the magnetic field for initial DC magnetization has been applied, under the condition that the slave medium is closely combined together with the master carrier for magnetic transfer so that the magnetic field for magnetic transfer is applied on the surface of the slave medium, of applying magnetic field in track direction on the surface of the slave medium under the condition that the master carrier for magnetic transfer is closely combined together with the slave medium by rotating the combination unit or the magnetic field, and of performing magnetic transfer by applying the magnetic field for transfer to the surface of the slave medium immediately after the initial DC magnetization of the slave medium.

The present invention also provides the method for magnetic transfer as described above, wherein the coercive force Hcm of the magnetic layer of said master carrier for magnetic transfer is not more than 47.7 kA/m (600 Oe).

The present invention also provides the method for magnetic transfer as described above, wherein the coercive force Hcm of the slave medium receiving the magnetic transfer is not less than 143 kA/m (1800 Oe).

The present invention also provides the method for magnetic transfer as described above, wherein the direction of initial DC magnetization by applying magnetic field in track direction on the slave medium is in opposite direction to the magnetic field for transfer applied to perform magnetic transfer on the surface of the slave medium.

The present invention also provides the method for magnetic transfer as described above, wherein a portion with magnetic field intensity higher than the maximum value of the optimal transfer magnetic field intensity range is not present in any of track direction, and a portion with magnetic field intensity within the optimal transfer magnetic field intensity range is present at least at one point in one track direction, said method comprising the steps of generating a magnetic field with magnetic field intensity distribution where magnetic field intensity in track direction opposite thereto is lower than the minimum value of the optimal transfer magnetic field intensity range at a position in any track direction, and of applying magnetic field for transfer in track direction on the surface of the slave medium by rotating a combination unit of the master carrier for magnetic transfer closely combined together with the slave medium processed by initial DC magnetization in track direction or by rotating the magnetic field in track direction.

Further, the present invention provides a method for magnetic transfer according to claim 8, wherein the optimal transfer magnetic field intensity is in the range of 0.6×Hcm to 1.3×Hcm to the coercive force Hcm of the slave medium.

The present invention also provides an apparatus for magnetic transfer for applying magnetic field for transfer by combining a master carrier for magnetic transfer and a slave medium closely together, said master carrier having a magnetic layer formed on a portion corresponding to an information signal on surface of a substrate, and said slave medium receiving magnetic transfer, said apparatus comprising means for combining said master carrier for magnetic transfer with said slave medium closely together, initial DC magnetizing means for performing initial DC magnetization in track direction on the slave medium by applying magnetic field in advance in track direction on the surface of the slave medium under the condition that said master carrier for magnetic transfer is closely combined together with the slave medium, and transfer magnetic field applying means for applying magnetic field for transfer in track direction of the slave medium under the condition that said master carrier for magnetic transfer is closely combined together with the slave medium.

The present invention also provides an apparatus for magnetic transfer wherein the coercive force Hcm of the magnetic layer of said master carrier for magnetic transfer is not more than 47.7 kA/m (600 Oe).

The present invention also provides the apparatus for magnetic transfer as described above, wherein the coercive force Hcm of the slave medium receiving the magnetic transfer is not less than 143 kA/m (1800 Oe).

The present invention also provides the apparatus for magnetic transfer as described above, wherein the direction of initial DC magnetization by applying magnetic field in track direction on the slave medium is in opposite direction, on the surface of the slave medium, to the magnetic field for transfer applied for performing magnetic transfer.

The present invention also provides the apparatus for magnetic transfer as described above, wherein said initial DC magnetizing means has a portion with magnetic field intensity by more than 1.5 times higher than the coercive force Hcm of the slave medium only in one direction at a position in track direction, the magnetic field intensity is such that a magnetic field with magnetic field intensity distribution lower than the coercive force Hcm of the slave medium at any position in any track direction is generated at one portion in track direction, and a magnetic field for initial DC magnetization is applied in track direction on the slave medium by rotating the combination unit of the slave medium with the master carrier for magnetic transfer or by rotating the magnetic field in track direction.

The present invention also provides the apparatus for magnetic transfer as described above, wherein said transfer magnetic field applying means comprises means for generating a magnetic field in one portion in track direction, said magnetic field has such magnetic field intensity distribution that there is a magnetic field intensity higher than the maximum value in the optimal transfer magnetic field intensity range at any position in any track direction, that there is a magnetic field intensity within the optimal transfer magnetic field intensity range at least at one point in one track direction, and that a magnetic field intensity in track direction opposite thereto is lower than the minimum value of the optimal transfer magnetic field intensity range at any position in any track direction, whereby said apparatus comprises means for rotating a combination unit comprising the master carrier for magnetic transfer closely combined together with the slave medium processed by initial DC magnetization in track direction, or means for rotating the magnetic field in track direction to apply the magnetic field for transfer in track direction on the surface of the slave medium.

The present invention also provides the apparatus for magnetic transfer as described above, wherein said apparatus comprises means for applying initial DC magnetization by more than 1.5 times higher than the coercive force Hcm of the slave medium, means for applying magnetic field for magnetic transfer within the optimal transfer magnetic field intensity range in opposite direction to the magnetic field for initial DC magnetization, means for combining the slave medium with the master carrier for magnetic transfer closely together, and rotating means for rotating either the combination unit comprising the slave medium and the master carrier for magnetic transfer or the magnetic field in track direction, whereby magnetic field is applied in track direction on the surface of the slave medium under the condition that the slave medium is combined with the master carrier for magnetic transfer closely together, and immediately after the completion of initial DC magnetization in track direction of the slave medium, magnetic transfer is performed by applying the magnetic field for transfer in track direction of the slave medium under the condition that the slave medium is combined with the master carrier for magnetic transfer closely together.

The present invention also provides an apparatus for magnetic transfer as described above, wherein the optimal transfer magnetic field intensity is 0.6×Hcm to 1.3×Hcm.

BRIEF DESCRIPTION OF THE DRAWINGS

FIG. 15 represents drawings to explain a method for applying magnetic field using two pairs of electromagnets placed at adjacent positions and arranged perpendicularly to the surface of the slave medium with the slave medium interposed between;

FIG. 23 represents drawings to explain a method for transfer and an apparatus for transfer for applying magnetic field using two pairs of permanent magnets placed at adjacent positions and arranged perpendicularly to the surface of the slave medium and with the slave medium interposed between;

FIG. 37 represents drawings to explain a method for applying magnetic field using two pairs of permanent magnets with one magnet each of the pairs at adjacent positions and arranged perpendicularly to the surface of the slave medium of a combination unit comprising the slave medium and a master carrier for magnetic transfer and with the combination unit interposed between;

FIG. 42 represents drawings to explain a method for applying magnetic field using two pairs of electromagnets placed at adjacent positions and arranged perpendicularly to the surface of the slave medium with the slave medium interposed between;

DETAILED DESCRIPTION OF THE PREFERRED EMBODIMENT

In a method of magnetic transfer for applying magnetic field for transfer by combining a master carrier for magnetic transfer with a slave medium closely together, whereby the master carrier has a magnetic layer on a portion corresponding to an information signal on the surface of a substrate and the slave medium is used to receive transfer of the information, the present inventors have found that it is possible to perform initial DC magnetization prior to magnetic transfer under the condition where the master carrier for magnetic transfer and the slave medium are closely combined together.

Also, when a master carrier for magnetic transfer and a slave medium are brought closely together and a magnetic: field for transfer is applied from outside, magnetic transfer operation is unstable and a portion with signals of poor quality is produced as the result of transfer. Having found that the quality of signals is decreased because the magnetic field applied at the time of transfer is not adequate, the present inventors have found the basic concept of the present invention. The present inventors have also found that it is possible to provide a method and an apparatus for performing the initial DC magnetization of the slave medium and the transfer of recording information from the master carrier for magnetic transfer to the slave medium. Further, it has been found that it is possible to provide a method for transfer and an apparatus for transfer to achieve transfer processing within very short time by performing transfer of the recording information to the slave medium immediately after the completion of the initial DC magnetization of the slave medium.

In the magnetic transfer from the master carrier for magnetic transfer to the slave medium, it has been believed in the past that, when an external magnetic field higher than the coercive force Hcm of the slave medium is applied, the slave medium is magnetized all in applied direction, and this is the reason why the pattern to be transferred is not recorded. For example, in Japanese Patent Publication Laid-Open 10-40544, it is described in the paragraph 0064 that it is preferable to have coercive force equal to or lower than the coercive force of the magnetic recording medium.

Figure 1A:
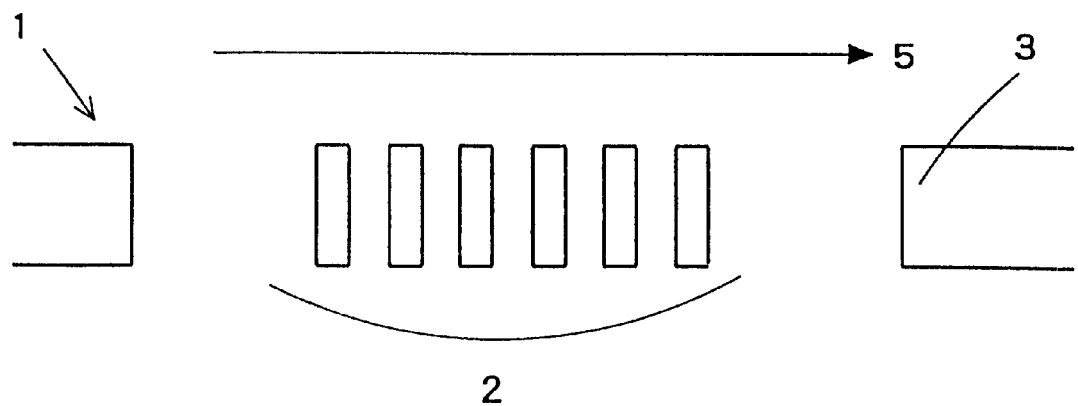
FIG. 1 represents drawings to explain transfer of a pattern on a master carrier for magnetic transfer.
Figure 1B:
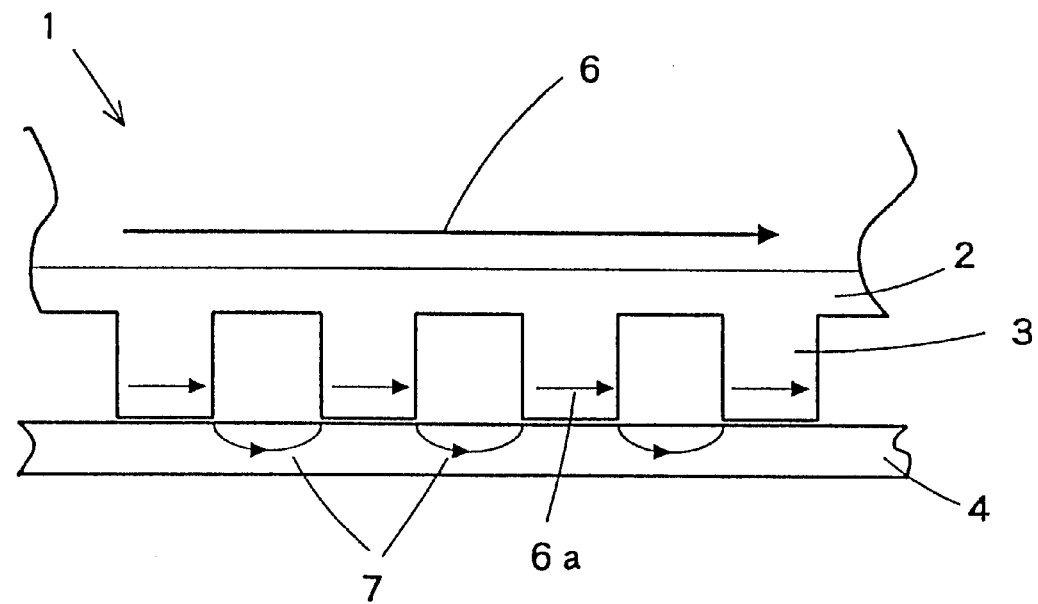

However, the present inventors have found the following principle after elaborate study. The principle of magnetic transfer according to the present system is as follows: As shown in FIG. 1, in a convex portion of a magnetic layer of a master carrier 1 for magnetic transfer, which is substantially in contact with a slave medium 4, an external magnetic field 6 for transfer is turned to a magnetic field 6a which is absorbed to the convex portion, and the recordable magnetic field intensity is not attained on the magnetic layer of the slave medium 4 in contact. However, on the magnetic layer of the slave medium 4 corresponding to a concave portion of the master carrier 1 for magnetic transfer not in contact with the slave medium 4, the recordable magnetic field intensity is attained. As shown by reference numeral 7 in the figure, magnetization occurs in a direction of the external magnetic field 6 for transfer, and a pattern for pre-format of the master carrier 1 for magnetic transfer can be transferred to the slave medium 4 as a recording information 7.

Therefore, when transfer is performed from the master carrier for magnetic transfer to the slave medium, in the portion in contact with the slave medium, most of the magnetic field enters the pattern portion of the master carrier for magnetic transfer, and it appears that no inversion occurs even when transfer magnetic field higher than the coercive force Hcm of the slave medium is applied. By applying magnetic field for transfer having intensity in specific relation to the coercive force Hcm of the slave medium, it is possible to obtain a slave medium with the signal of high quality.

Under the condition where the slave medium and the master carrier for magnetic transfer are closely combined together, a magnetic field by more than 1.5 times, or more preferably by more than 2 times, higher than coercive force Hcm of the slave medium is applied in one direction of track direction of the slave medium, and the magnetic field for transfer is applied in a direction opposite to the direction of the initial DC magnetization of the slave medium immediately after the initial DC magnetization.

Magnetic field for transfer with specific intensity, i.e. a magnetic field within optimal transfer magnetic field intensity range, should be applied. The preferable magnetic field for transfer is given as:

$$0.6 \times Hcm \leq \text{Magnetic field for transfer} \leq 1.3 \times Hcm$$

It should be applied in a direction reverse to the direction of the initial DC magnetization.

More preferably, the magnetic field for transfer has coercive force of 0.8–1.2 Hcm, or most preferably, 1–1.1 Hcm.

The magnetic recording medium for performing pre-format for servo is a disk-type recording medium, and information is recorded along a track, which is formed concentrically from the center of rotation. To apply the magnetic field to transfer a radial pattern in the disk-type magnetic recording medium as described above, the magnetic field is applied in the direction of the track on the slave medium surface, i.e. in tangential direction of a circular arc at a position in arbitrary track direction, and initial DC magnetization is performed in track direction of the slave medium.

It has been found that the direction of initial DC magnetization when magnetic field of track direction is applied on the slave medium must be in opposite direction to the magnetic field for transfer to be applied for magnetic transfer on the surface of the slave medium.

Therefore, in order to transfer a pattern formed radially around the central axis on a disk-type recording medium, under the condition that the master carrier for magnetic transfer and the slave medium are closely combined together, magnetic field is applied in track direction on the surface of the slave medium, i.e. in tangential direction of circular arc at an arbitrary circumferential direction on a disk-type slave medium, and initial DC magnetization is performed on the slave medium in track direction.

Next, the master carrier for magnetic transfer and the slave medium processed by the initial DC magnetization are brought closely together, and the magnetic field for transfer is applied in the direction of track on the slave medium surface.

In this case, the direction of the initial DC magnetization when magnetic field is applied in the direction of track on the slave medium must be reverse to the direction of the magnetic field for transfer applied for magnetic transfer on the slave medium surface.

Therefore, in order to apply the magnetic field under the above condition to apply magnetic field to the entire surface of a disk-type medium, a magnetic field is generated on a portion in circumferential direction, whereby said magnetic field has magnetic field intensity distribution by more than 1.5 times higher than the coercive force Hcm of the slave medium at least at one point in track direction. Then, a combination unit comprising the master carrier for magnetic transfer and the slave medium closely combined together is rotated or a magnetic field is rotated in track direction. Thus, a magnetic field to perform initial DC magnetization in track direction of the slave medium is applied in advance. Then, a magnetic field is generated on a portion in circumferential direction, whereby said magnetic field has such a magnetic field intensity distribution that magnetic field intensity higher than the maximum value of the optimal transfer magnetic field intensity range is not present at any position in track direction, that there is at least one point in one track direction where magnetic field intensity is within the optimal transfer magnetic field intensity range, and that magnetic field intensity in track direction opposite to the above direction is lower than the minimum value of the optimal transfer intensity range at any position in track direction. Under the condition that the master carrier for magnetic transfer and the slave medium processed by initial DC magnetization are closely combined together, magnetic field for transfer is applied in track direction on the surface of the slave medium by rotating the combination unit in track direction or by rotating the magnetic field in track direction.

In the method for magnetic transfer according to the present invention, under the condition where the master carrier for magnetic transfer and the slave medium are closely combined together, magnetic field for initial DC magnetization of the slave medium is applied to initial DC magnetization of the slave medium. Immediately thereafter, under the condition where the master carrier for magnetic transfer and the slave medium are closely combined together, magnetic field for initial DC magnetization is applied to continuously perform magnetic transfer after the initial DC magnetization. While the initial DC magnetization is being performed, the magnetic field for transfer is applied on a region where initial DC magnetization has been already performed, and magnetic transfer is carried out.

In the present invention, the expression "immediately after" means that the magnetic field for transfer is applied within short time interval after the initial DC magnetization. It also means that the magnetic field for transfer is applied on a region where initial DC magnetization has been already completed while initial DC magnetization is still in progress on the other portion of the slave medium.

The spacing or the distance between the portions to apply magnetic transfer after the application of initial DC magnetization can be determined as desired so far as the initial DC magnetic field with a given intensity and the magnetic field for transfer can be applied at the same time.

The magnetic field for initial DC magnetization and the magnetic field for transfer can be applied on predetermined portions of the combination unit by arranging a plurality of permanent magnets or electromagnets. It may be designed in such manner that, when the magnetic field for initial DC magnetization is applied from the same magnet, by adjusting an angle between the central axis of the magnetic field of the magnet and the combination unit, the magnetic field for transfer within the optimal transfer range and in opposite direction to the above magnetic field may be applied on a region where initial DC magnetization has been completed immediately before.

As a concrete example of a unit for generating and applying magnetic field for initial DC magnetization, the following apparatuses may be used:

FIG. 2 represents drawings to explain a unit for generating and applying magnetic field using a single permanent magnet having a magnetic field symmetrical to the central axis of the magnetic poles with respect to the surface of the slave medium.

Figure 2A:
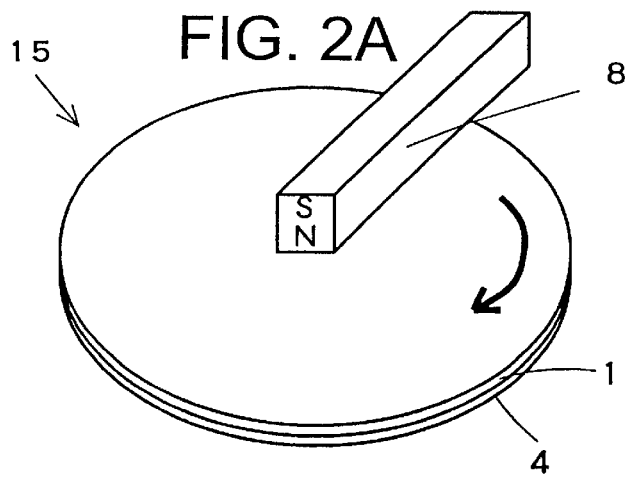
FIG. 2 represents drawings to explain a unit for generating and applying magnetic field using a single permanent magnet having a magnetic field symmetrical to the central axis of magnetic poles with respect to the surface of a slave medium.

FIG. 2(A) shows an example where magnetic field is applied on upper surface of a combination unit 15, which comprises a slave medium 4 and a master carrier for magnetic transfer 1 closely combined together, using a permanent magnet 8, and the slave medium is rotated.

Figure 2B:
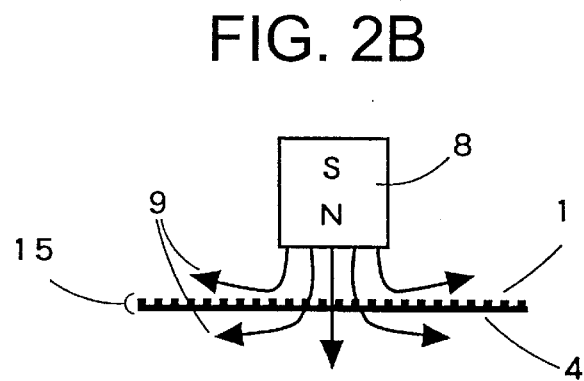
Figure 2C:
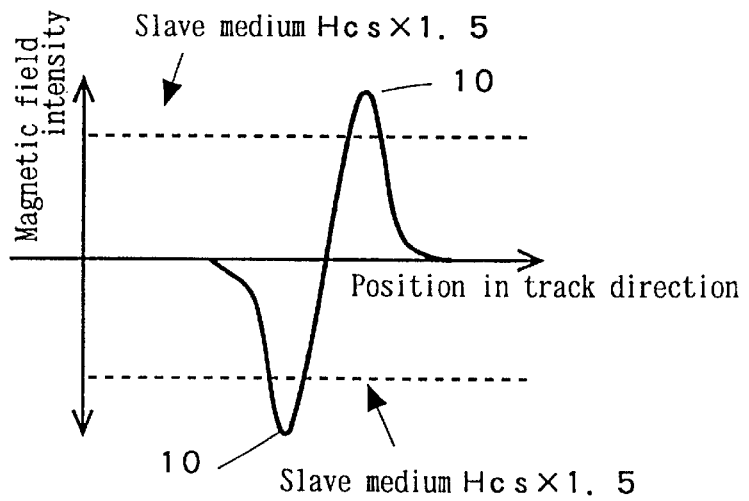

From a single permanent magnet 8 placed on upper surface of the combination unit 15 comprising the slave medium 4 and the master carrier for magnetic transfer 1, a magnetic field 9 in track direction in parallel to the surface of the slave medium is applied as shown in FIG. 2(B), and the combination unit 15 or the permanent magnet 8 is rotated in track direction with respect to the central axis of the slave medium. To the surface of the slave medium, a magnetic field having a peak 10 of more than 1.5 times higher than the coercive force Hcm of the slave medium is applied as shown in FIG. 2(C), and initial DC magnetization is performed. In the example shown in FIG. 2, the magnet is placed on the upper surface of the slave medium, while it may be placed on lower surface.

FIG. 3 represents drawings to explain application of an asymmetrical magnetic field using a single permanent magnet.

Figure 3A:
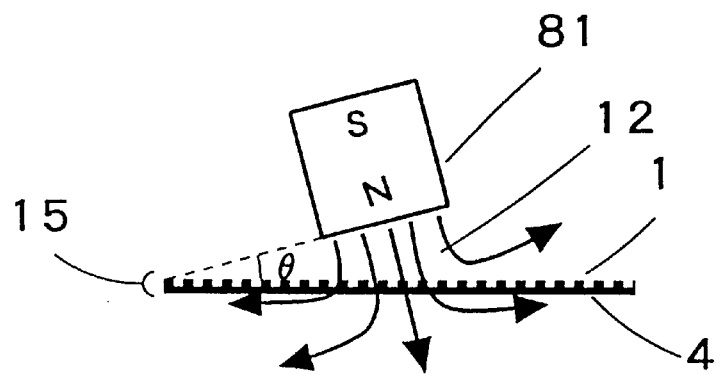
FIG. 3 represents drawing to explain application of an asymmetrical magnetic field by a single permanent magnet.
Figure 3B:
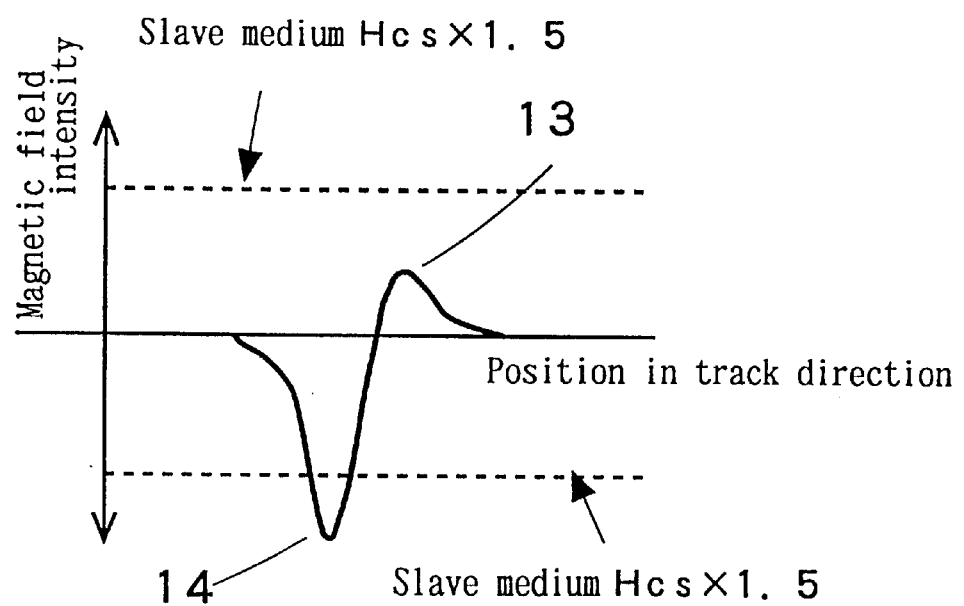

FIG. 3(A) is a drawing to explain application of an asymmetrical magnetic field, and FIG. 3(B) is a diagram to explain intensity of the magnetic field applied when the magnetic field of FIG. 3(A) is applied.

This is to explain a method for applying magnetic field for initial DC magnetization using a tilted permanent magnet 81 arranged on upper surface of a combination unit 15 comprising a slave medium 4 and a master carrier for magnetic transfer 1. An asymmetrical magnetic field 12 is applied on the slave medium 4, and by rotating the combination unit 15 or the tilted permanent magnet 81 in track direction with respect to the central axis of the slave medium, the asymmetrical magnetic field is applied and the initial DC magnetization is performed.

A peak 13 with lower intensity applied on the combination unit 15 exerts no influence on initial DC magnetization to the slave medium, and only a peak 14 with high intensity of more than 1.5 times higher than the coercive force Hcm of the slave medium exerts action for the initial DC magnetization.

As described above, when the magnetic field for initial DC magnetization is applied by tilting the axis of the magnetic poles of the permanent magnet obliquely with respect to the surface of the slave medium, the optimal value of tilting of the axis of the magnetic poles varies according to the shape of the magnet. In case of a permanent magnet in form of rectangular parallelepiped, it is preferable to set an angle between a surface perpendicular to the axis of magnetic poles and the surface of the slave medium to 5° to 70°, or more preferably, to 20° to 55°.

Figure 4A:
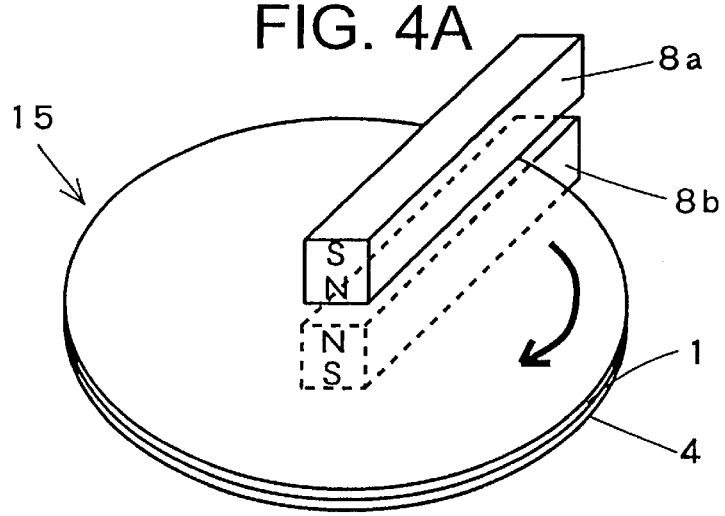
FIG. 4 represents drawings to explain a method for applying magnetic field using two permanent magnets at opposed positions.

FIG. 4 represents drawings to explain a method for applying magnetic field using two permanent magnets arranged at opposed positions. FIG. 4(A) shows an example where permanent magnets 8a and 8b each magnetized symmetrically to the axis of magnetic poles are arranged on upper and lower surfaces respectively of the combination unit 15, which comprises the slave medium 4 and the master carrier for magnetic transfer 1, and the combination unit 15 is rotated with the magnetic poles of the same polarity facing to each other.

Figure 4B:
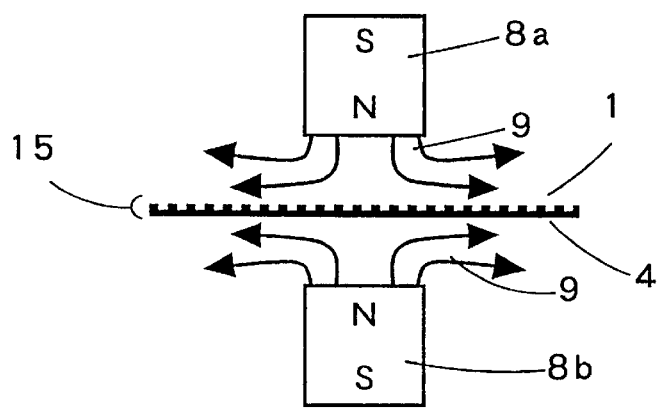

From each of the permanent magnets 8a and 8b arranged on upper and lower surface of the combination unit 15 respectively, a magnetic field 9 is applied to the surface of the slave medium 4 as shown in FIG. 4(B).

Figure 4C:
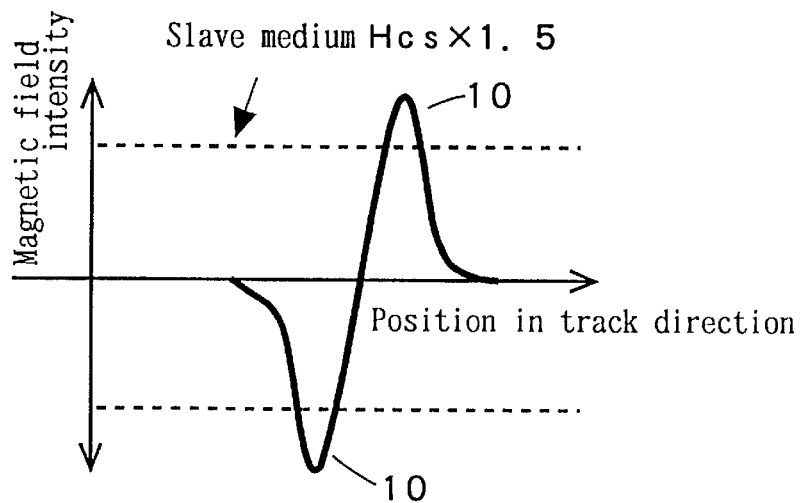

FIG. 4(C) is a diagram showing intensity of the magnetic field to be applied on the slave medium. The magnetic field to be applied to the slave medium has a peak value 10, which is by more than 1.5 times higher than the coercive force Hcm of the slave medium. By rotating the combination unit comprising the slave medium and the master carrier for magnetic transfer or by rotating the magnets, initial DC magnetization can be performed on the slave medium.

FIG. 5 represents drawings to explain a method for applying magnetic field using two tilted permanent magnets.

Figure 5A:
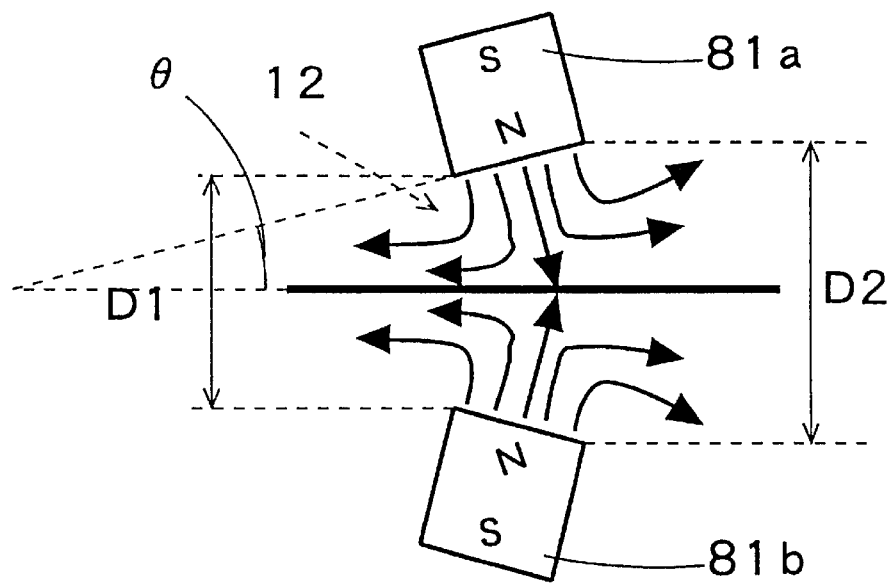
FIG. 5 represents drawings to explain a method for applying magnetic field using tilted permanent magnets.
Figure 5B:
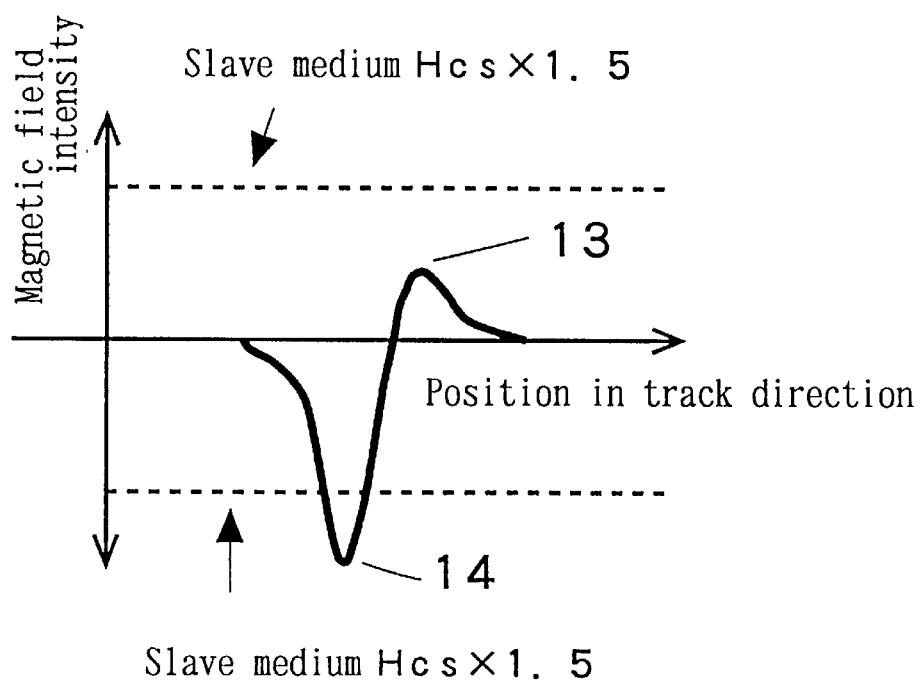

FIG. 5(A) is a drawing to explain a method for applying an asymmetrical magnetic field on the surface of the slave medium, and FIG. 5(B) is a diagram to explain intensity of the magnetic field given by the application of the magnetic field of FIG. 5(A).

Tilted permanent magnets 81a and 81b each magnetized symmetrically to the axis of magnetic poles are arranged at opposed positions on upper and lower surfaces of the combination unit 15, which comprises the slave medium 4 and the master carrier for magnetic transfer 1, with the magnetic poles of the same polarity facing to each other and with the combination unit 15 interposed between. Magnetic field intensity distribution in track direction is turned to asymmetrical by arranging in such manner that a distance D1 between the ends of the permanent magnets at one end of the track direction is different from a distance D2 between the ends of the permanent magnets at the other end of the track direction. When an asymmetrical magnetic field 12 is applied to the surface of the slave medium 4 and when the combination unit 15 is rotated or the tilted permanent magnets 81a and 81b are rotated in track direction with respect to the central axis of the combination unit 15, an asymmetrical magnetic field is applied to the entire surface of the slave medium, and initial DC magnetization can be performed.

In the asymmetrical magnetic field, a peak value 13 with lower intensity exerts no influence on the initial DC magnetization to the slave medium. Only a peak value 14 with intensity which is by more than 1.5 times higher than the coercive force Hcm of the slave medium can exert action of initial DC magnetization.

When a transfer magnetic field is applied by tilting the axis of magnetic poles of the permanent magnet obliquely to the surface of the slave medium, the optimal value of the tilting of the axis of the magnetic poles varies according to the shape of the magnet. In case of a permanent magnet in form of rectangular parallelepiped, it is preferable that the angle θ between a surface perpendicular to the axis of magnetic poles and the surface of the slave medium is set to 5° to 70°, or more preferably, to 20° to 55°

FIG. 6 represents drawings to explain a method for applying magnetic field using a permanent magnet with axis of magnetic poles in lateral direction.

Figure 6A:
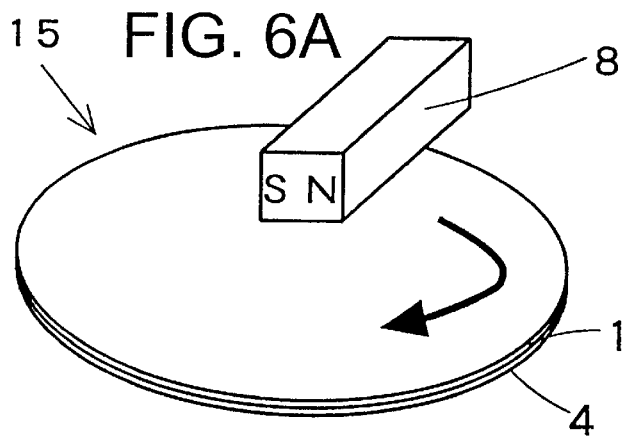
FIG. 6 represents drawings to explain a method for applying magnetic field using a single permanent magnet with axis of magnetic poles in lateral direction.

FIG. 6(A) shows an example where a permanent magnet 8 having magnetic field symmetrical to the axis of magnetic poles is placed on upper surface of a combination unit 15, which comprises a slave medium 4 and a master carrier for magnetic transfer 1, with the axis of magnetic poles in parallel to the surface of the slave medium, and the combination unit 15 is rotated.

Figure 6B:
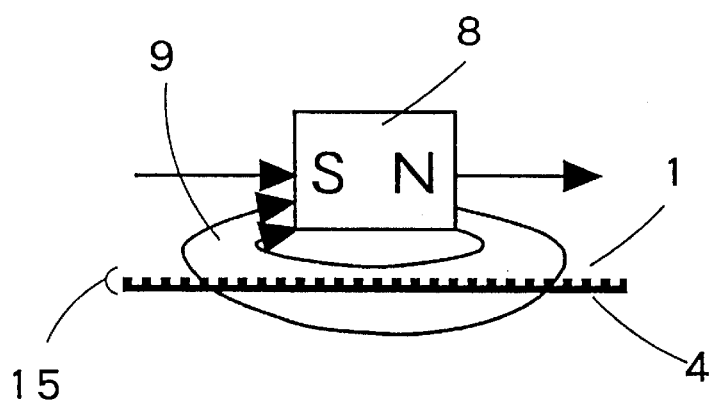

From a single permanent magnet 8 arranged on the upper surface of the combination unit 15, a magnetic field 9 is applied to the surface of the slave medium 4 as shown in FIG. 6(B).

Figure 6C:
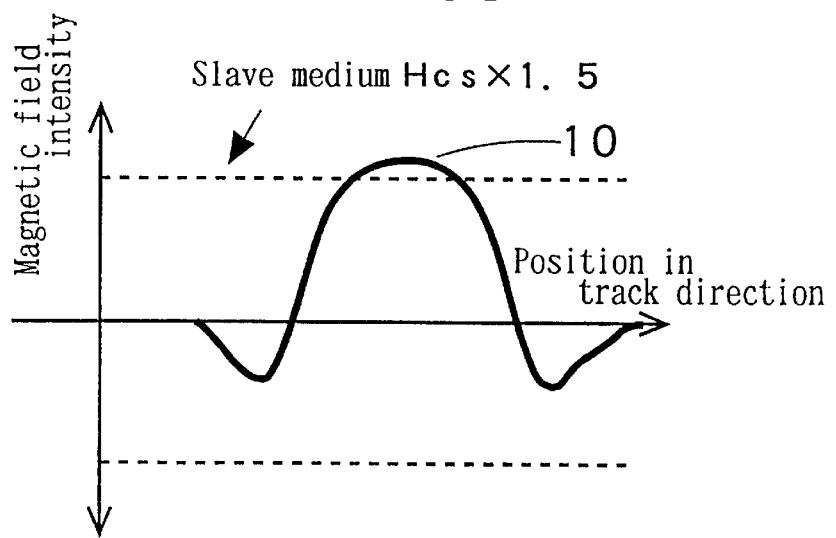

FIG. 6(C) is a diagram showing intensity of the magnetic field given to the slave medium. The magnetic field applied on the slave medium has a peak value 10, which is by more than 1.5 times higher than the coercive force Hcm of the slave medium. When the combination unit comprising the slave medium and the master carrier for magnetic transfer is rotated or when the magnet is rotated, it is possible to perform initial DC magnetization on the slave medium. In the example shown in FIG. 6, the magnet is placed only on the upper surface of the combination unit, while it may be placed on the lower surface or may be arranged on both upper and lower surfaces of the combination unit.

FIG. 7 represents drawings to explain a method for applying magnetic field using two pairs of permanent magnets placed at adjacent positions and arranged perpendicularly to the surface of the slave medium of the combination unit which comprises the slave medium and the master carrier for magnetic transfer, and with the combination unit interposed between.

Figure 7A:
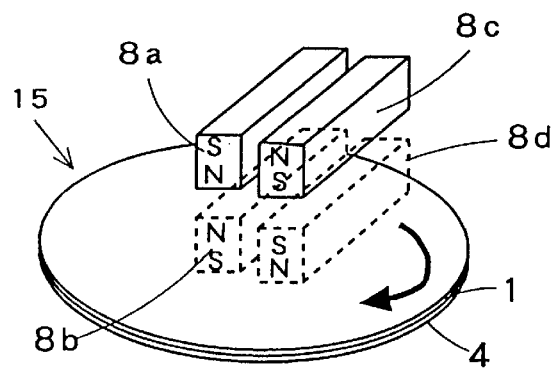
FIG. 7 represents drawings to explain a method for applying magnetic field using two pairs of permanent magnets at adjacent positions.
Figure 7B:
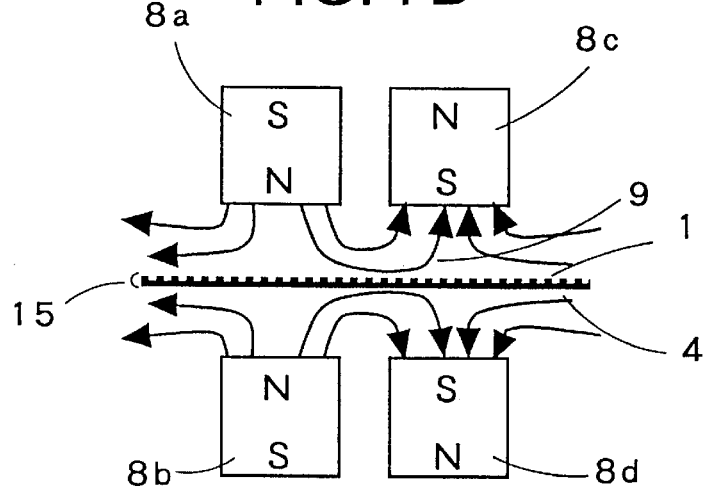

FIG. 7(A) shows an example where a pair of permanent magnets 8a and 8b each having magnetic field symmetrical to the axis of magnetic poles are arranged respectively on upper surface and lower surface of the combination unit 15 which comprises the slave medium 4 and the master carrier for magnetic transfer 1 and with magnetic poles of the same polarity facing to each other. Further, another pair of permanent magnets 8c and 8d are arranged at positions adjacent to the above pair of magnets in such manner that each magnetic pole faces to a magnetic pole of opposite polarity in the adjacent pair of magnets. Under this condition, the combination unit 15 is rotated.

On the upper surface and the lower surface of the combination unit 15, the permanent magnets 8a and 8b are arranged with magnetic poles with the same polarity facing to each other. As shown FIG. 7(B), magnetic fields of the magnets 8a and 8b repel each other, and magnetic field of the permanent magnet 8a is directed to the permanent magnet 8c of the adjacent pair of permanent magnets. Magnetic field of the permanent magnet 8b is directed to the permanent magnet 8d of the adjacent pair of the permanent magnets. As a result, a magnetic field 9 is applied to the surface of the slave medium 4.

Figure 7C:
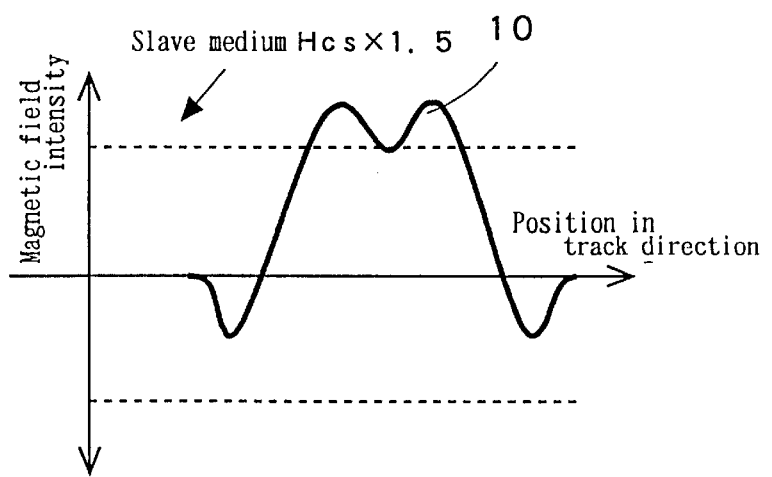

FIG. 7(C) is a diagram showing intensity of the magnetic field applied to the slave medium. The magnetic field applied to the slave medium has a peak value 10 by more than 1.5 times higher than the coercive force Hcm of the slave medium. By rotating the combination unit 15 or by rotating the magnet, initial DC magnetization can be performed on the slave medium.

The distance between the opposed magnets arranged at adjacent positions should be set to such a distance that a magnetic field with intensity by more than 1.5 times higher than the coercive force of the slave medium can be given to the combination unit by a magnetic field of track direction provided by the adjacent magnets.

FIG. 8 represents drawings to explain a method for applying magnetic field using two permanent magnets arranged at adjacent positions and placed on one surface of a combination unit which comprises a slave medium and a master carrier for magnetic transfer.

Figure 8A:
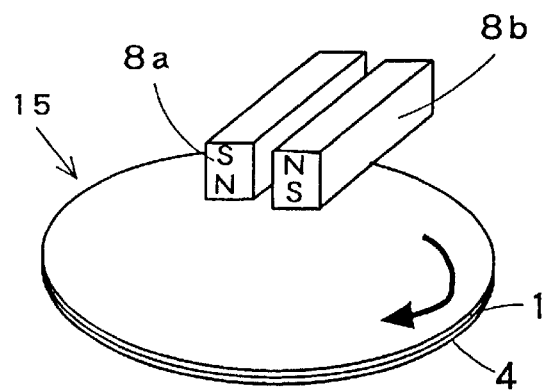
FIG. 8 represents drawings to explain a method for applying magnetic field using two permanent magnets at adjacent positions and placed on one side of a combination unit comprising a slave medium and a master carrier for magnetic transfer closely combined together.

FIG. 8(A) shows an example where two permanent magnets 8a and 8b are arranged on one surface of the combination unit 15 in such manner that magnetic poles at adjacent positions have opposite direction, i.e. each magnetic pole faces to a magnetic pole of opposite polarity in the adjacent pair of magnets and with axis of magnetic poles of each magnet arranged perpendicularly to the surface of the combination unit 15. Under this condition, the combination unit 15 is rotated.

Figure 8B:
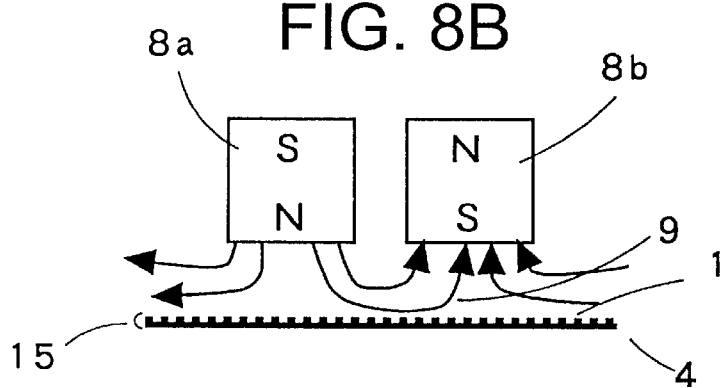

As described above, two permanent magnets 8a and 8b are arranged with axis of magnetic poles of each magnet directed perpendicularly to the slave medium so that the adjacent magnetic poles have opposite direction, i.e. the adjacent magnetic poles have opposite polarity. As a result, as shown in FIG. 8(B), magnetic field of the permanent magnet 8a is directed to the other permanent magnet 8b, and a magnetic field 9 is applied to the surface of the slave medium 4.

Figure 8C:
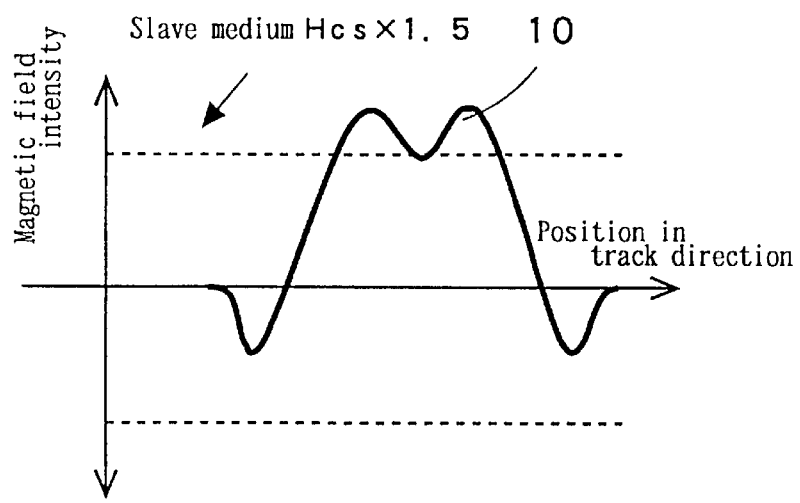

FIG. 8(C) is a diagram showing intensity of the magnetic field applied to the combination unit. The magnetic field applied to the combination unit has a peak value 10 which is by more than 1.5 times higher than the coercive force Hcm of the slave medium. By rotating the combination unit or by rotating two magnets, initial DC magnetization can be performed to the slave medium.

The distance between the magnets arranged at adjacent positions may be set to such a distance that the magnetic field provided by the adjacent magnets can apply a magnetic field, which is by more than 1.5 times higher than the coercive force Hcm of the slave medium, to the combination unit.

FIG. 9 represents drawings to explain a method for applying magnetic field using a permanent magnet placed on the surface of a combination unit and with end surfaces of both magnetic poles facing to the surface of the combination unit.

Figure 9A:
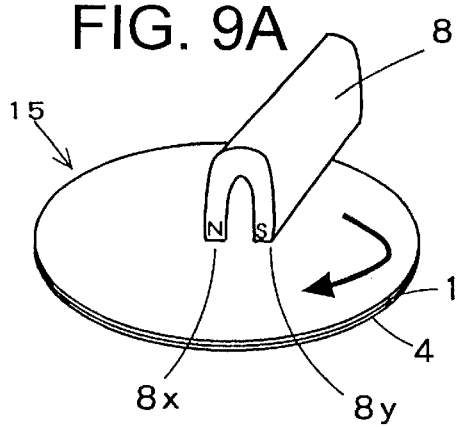
FIG. 9 represents drawings to explain a method for applying magnetic field using a permanent magnet placed on the surface of the combination unit and with end surfaces of both magnetic poles thereof being faced to the surface of the combination unit.

FIG. 9(A) shows an example where a permanent magnet 8 is placed on upper surface of a combination unit 15, which comprises a slave medium 4 and a master carrier 1 for magnetic transfer, and is arranged with end surfaces 8x and 8y of both magnetic poles faced to the combination unit 15. Then, magnetic field is applied, and the combination unit is rotated under this condition.

Figure 9B:
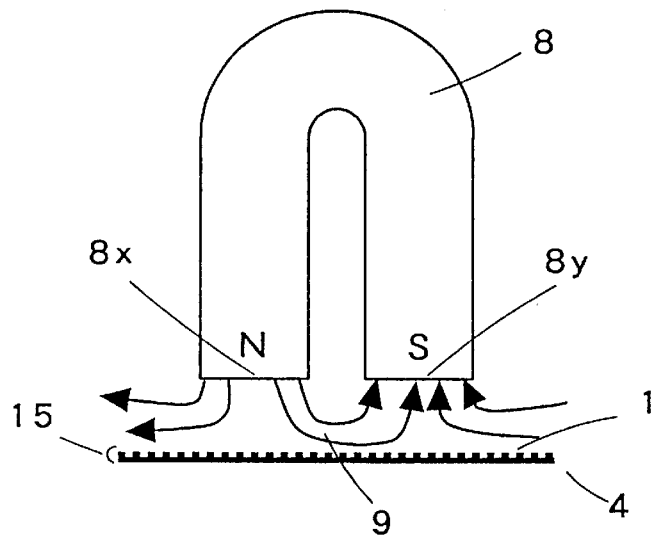
Figure 9C:
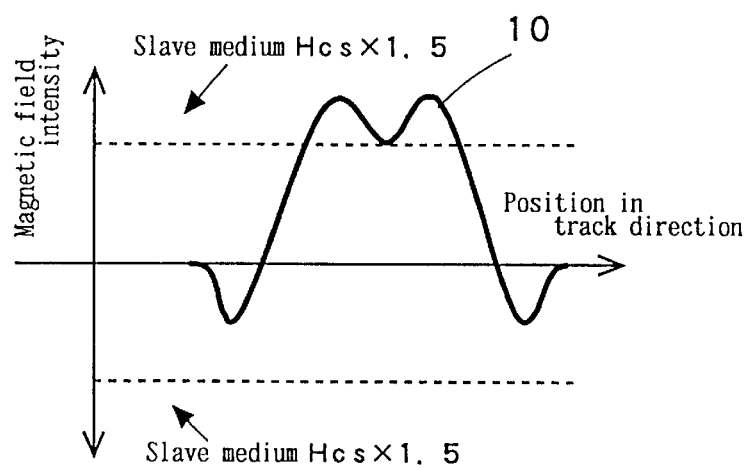

From the end surfaces 8x and 8y of both magnetic poles of a single permanent magnet 8 placed on the upper surface of the combination unit 15, a magnetic field 9 in track direction in parallel to the surface of the slave medium is applied as shown in FIG. 9(B). Then, the combination unit 15 or the permanent magnet is rotated in track direction with respect to the central axis of the combination unit. To the surface of the slave medium, a magnetic field having a peak value 10 which is by more than 1.5 times higher than the coercive force Hcm of the slave medium is applied as shown in FIG. 9(C), and initial DC magnetization is performed. In the example shown in FIG. 9, a permanent magnet is placed on the upper surface of the slave medium, while it may be arranged on the lower surface or on both surfaces.

Because the end surfaces of both magnetic poles are positioned to face the surface of the combination unit and magnetic field is applied, a magnet in form of U-shape, horseshoe-shape, circular shape, or elliptical shape may be used. Also, a permanent magnet of such type may be used that the central axes of the magnetic poles are not in parallel to but cross each other. The end surface of the magnetic poles is not limited to the surface in parallel to the surface of the slave medium but may be tilted with respect to the surface of the slave medium.

FIG. 10 represents drawings to explain an example of a permanent magnet. By this magnet, end surfaces of the magnetic poles of the permanent magnet are arranged to face the surface of the slave medium and a magnetic field is applied to the slave medium by the two magnetic poles.

Figure 10A:
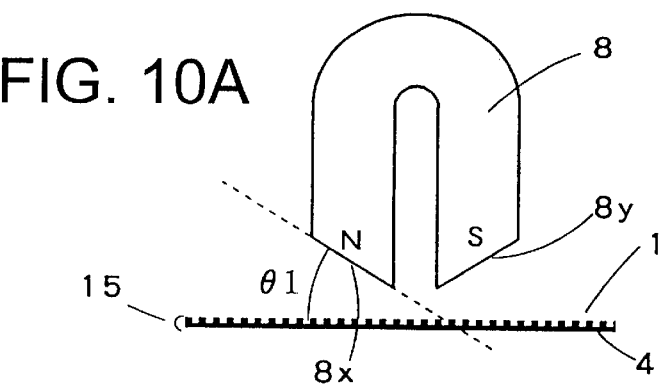
FIG. 10 represents drawings each to explain an example of a permanent magnet with end surfaces of both magnetic poles being faced to the surface of the slave medium to apply magnetic field to the slave medium.

In a permanent magnet 8 shown in FIG. 10(A), unlike the permanent magnet shown in FIG. 9 which has end surfaces arranged in parallel to the slave medium, each end surfaces 8x and 8y of the magnetic poles is tilted at a tilt angle $\theta_1$ tilted outwardly with respect to the surface of the slave medium.

The outwardly tilted angle $\theta_1$ is preferably not more than 30°, or more preferably, not more than 10°.

Figure 10B:
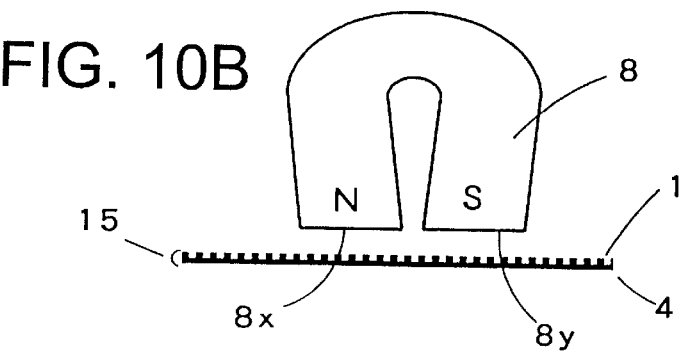

In the permanent magnet 8 shown in FIG. 10(B), unlike the permanent magnet shown in FIG. 9 which is U-shaped, the central axes of the two magnetic poles are not parallel to each other but cross each other. The end surfaces 8x and 8y of the magnetic poles are in parallel to the combination unit 15.

In the relationship between the end surfaces of the magnetic poles and the slave medium 4, acting surface to apply magnetic field to the slave medium is the same as in the example shown in FIG. 9, and only the shape of the upper portion of the magnet differs. Therefore, the same action as in the example shown in FIG. 9 is exerted.

Figure 10C:
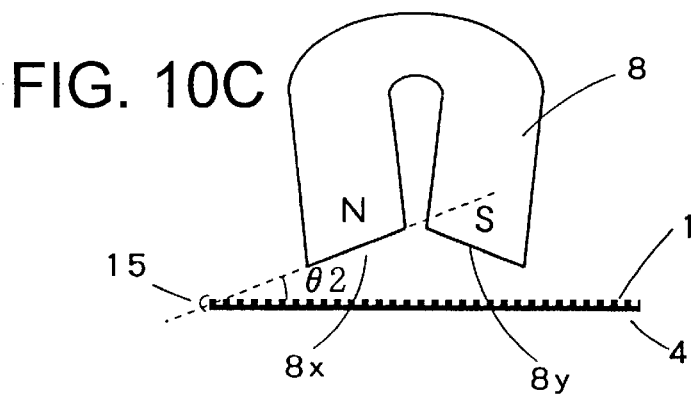

In case of the permanent magnet 8 shown in FIG. 10(C), each of end surfaces 8x and 8y of the magnetic poles of the permanent magnet shown in FIG. 10(B) has a tilt angle $\theta_2$ tilted inwardly with respect to the combination unit 15. The inwardly tilted angle $\theta_2$ is preferably not more than 90°, or more preferably, not more than 30°.

In the permanent magnet shown in FIG. 10(C), the central axes of the two magnetic poles cross each other, while it may be designed in such manner that each of the end surfaces of the magnetic poles of the U-shaped magnet having the central axes of the magnetic poles in parallel to each other may has an inwardly tilted angle.

Figure 10D:
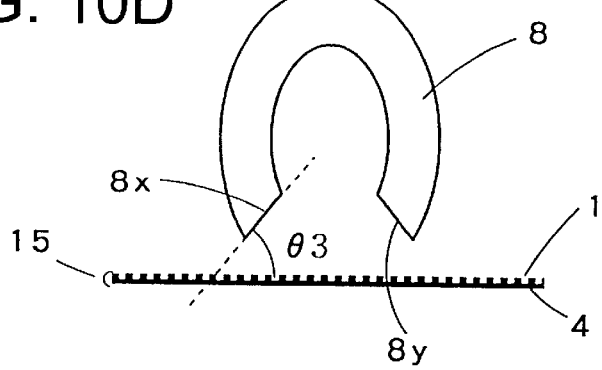

In the permanent magnet 8 shown in FIG. 10(D), the magnet is designed in elliptical shape. Each of the end surfaces 8x and 8y of the magnetic poles of the permanent magnet has a tilt angle $\theta_3$ tilted inwardly with respect to the combination unit 15.

Like the example shown in FIG. 10(C), the inwardly tilted angle $\theta_3$ tilted with respect to the surface of the slave medium is preferably not more than 90°, or more preferably, not more than 30°.

FIG. 11 represents drawings to explain a method for applying magnetic field using an electromagnet arranged on upper surface or lower surface of the combination unit which comprises the slave medium and the master carrier for magnetic transfer.

Figure 11A:
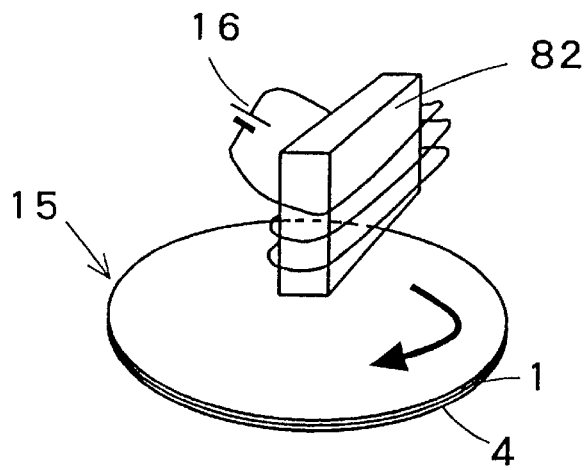
FIG. 11 represents drawings to explain a method for applying magnetic field using an electromagnet placed on one of upper or lower surfaces of a combination unit comprising a slave medium and a master carrier for magnetic transfer closely combined together.
Figure 11B:
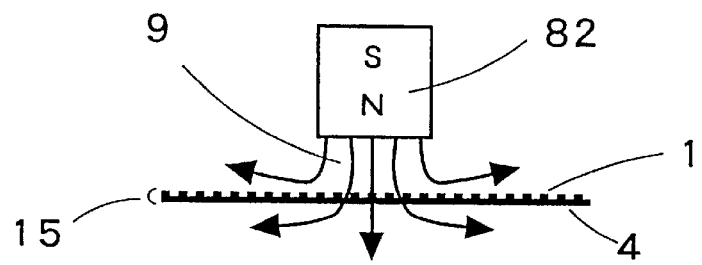
Figure 11C:
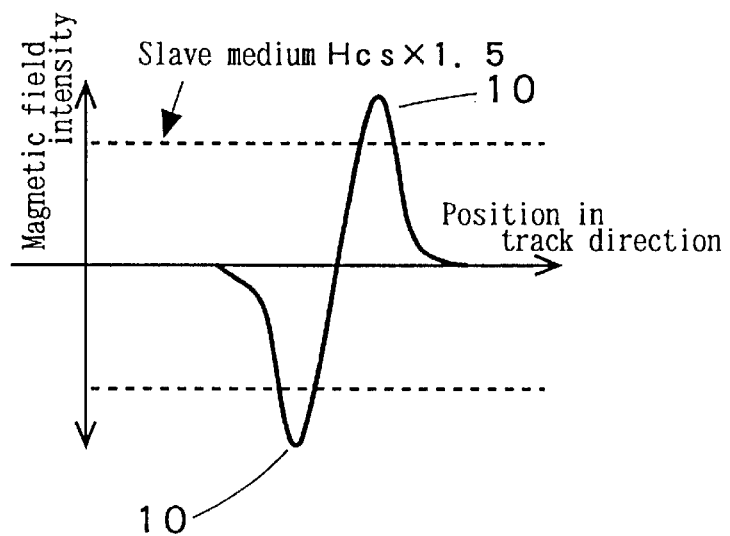

FIG. 11(A) shows an example where magnetic field is applied on a combination unit 15 by an electromagnet 82, and the combination unit is rotated under this condition. FIG. 11(B) is a drawing to explain magnetic field applied on the combination unit, and FIG. 11(C) is a diagram to explain intensity of the magnetic field applied on the combination unit.

As shown in FIG. 11(A), DC current is provided to the electromagnet 82 arranged on the upper surface of the combination unit 15 from a DC power source 16, and it is under DC excitation. The axis of magnetic pole given by the electromagnet 82 is arranged perpendicularly to the surface of the slave medium.

AS shown in FIG. 11(B), a magnetic field 9 in parallel to the surface of the slave medium is applied to the slave medium 4. As shown in FIG. 11(C), a magnetic field having a peak value 10 which is by more than 1.5 times higher than the coercive force Hcm of the slave medium is applied to the slave medium, and initial DC magnetization is performed. In the example shown in FIG. 11, the electromagnet is arranged on the upper surface of the combination unit 15, while it may be arranged on the lower surface of the combination unit.

FIG. 12 represents drawings to explain a method for applying magnetic field using a tilted electromagnet.

Figure 12A:
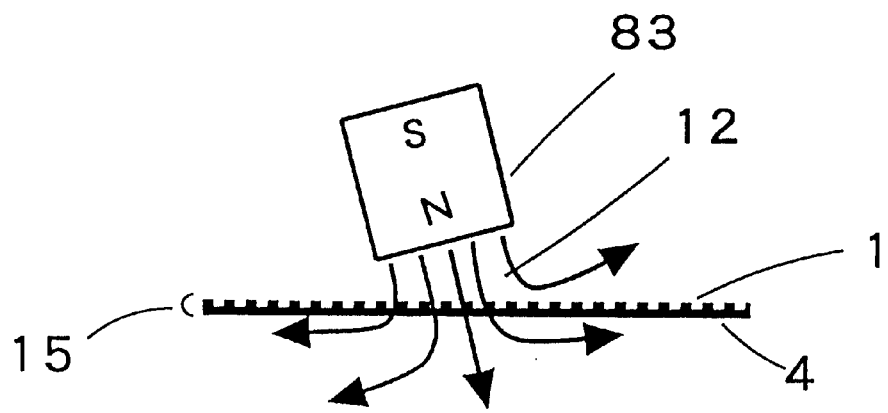
FIG. 12 represents drawings to explain a method for applying magnetic field using a tilted electromagnet.
Figure 12B:
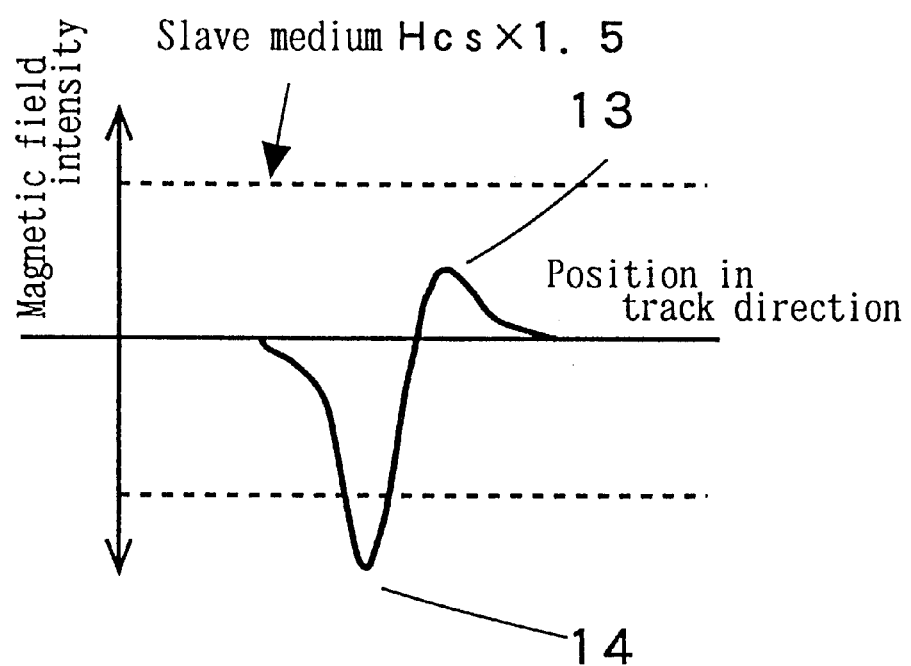

FIG. 12(A) is a drawing to explain application of an asymmetrical magnetic field. FIG. 12(B) is a diagram to explain intensity of the magnetic field to be given by application of the magnetic field of FIG. 12(A).

This is to explain a method for applying a transfer magnetic field using a tilted electromagnet 83 under DC excitation to the surface of the combination unit which comprises the slave medium and the master carrier for magnetic transfer. When an asymmetrical magnetic field 12 is applied on the combination unit 15 and the combination unit 15 of the tilted electromagnet 83 is rotated in track direction with respect to the central axis of the combination unit 15, an asymmetrical magnetic field is applied, and initial DC magnetization is performed.

Among the peak values given to the slave medium, a peak value 13 with lower intensity exerts no influence on the initial DC magnetization to the slave medium. Only a peak value 14 with higher intensity exerts action of the initial DC magnetization.

FIG. 13 represents drawings to explain a method for applying magnetic field using two electromagnets.

Figure 13A:
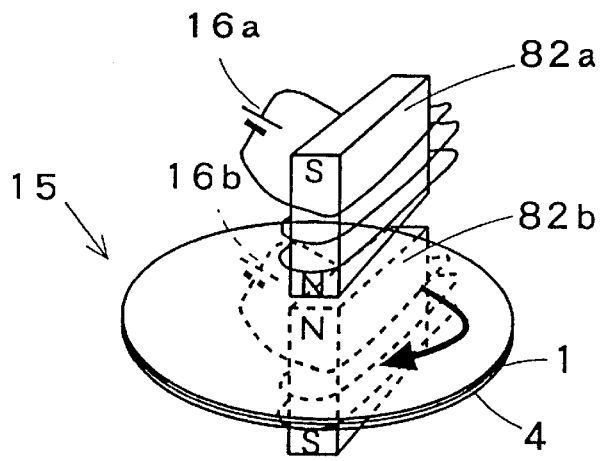
FIG. 13 represents drawings to explain a method for applying magnetic field using two electromagnets.
Figure 13B:
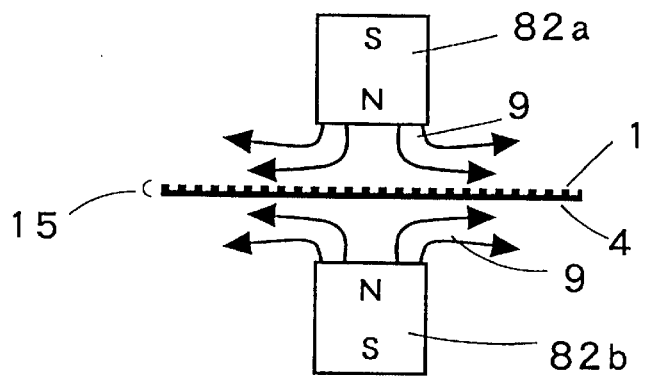

FIG. 13(A) is a perspective view, and FIG. 13(B) is a cross-sectional view. Electromagnets 82a and 82b each magnetized symmetrically with respect to the axis of magnetic poles are arranged respectively on upper surface and lower surface of a combination unit 15 which comprises a slave medium 4 and a master carrier for magnetic transfer 1 closely combined together and with magnetic poles of the same polarity facing to each other, and the slave medium is rotated. To the electromagnets 82a and 82b, DC excitation current is supplied from DC power sources 16a and 16b. From the electromagnets 82a and 82b arranged respectively on upper surface and lower surface of the combination unit 15, a magnetic field 9 is applied to the surface of the slave medium 4.

Figure 13C:
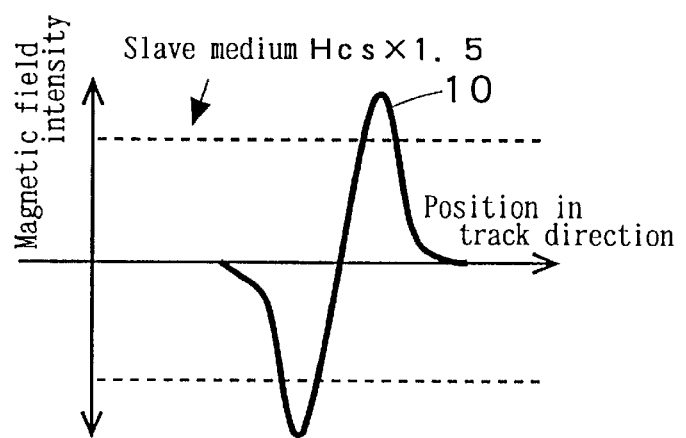

FIG. 13(C) is a diagram to show intensity of the magnetic field applied to the slave medium. The magnetic field applied to the slave medium has a peak value 10 which is by more than 1.5 times higher than the coercive force Hcm of the slave medium. By rotating the combination unit or the electromagnet, initial DC magnetization can be performed on the slave medium.

FIG. 14 represents drawings to explain a method for applying magnetic field using two tilted electromagnets.

Figure 14A:
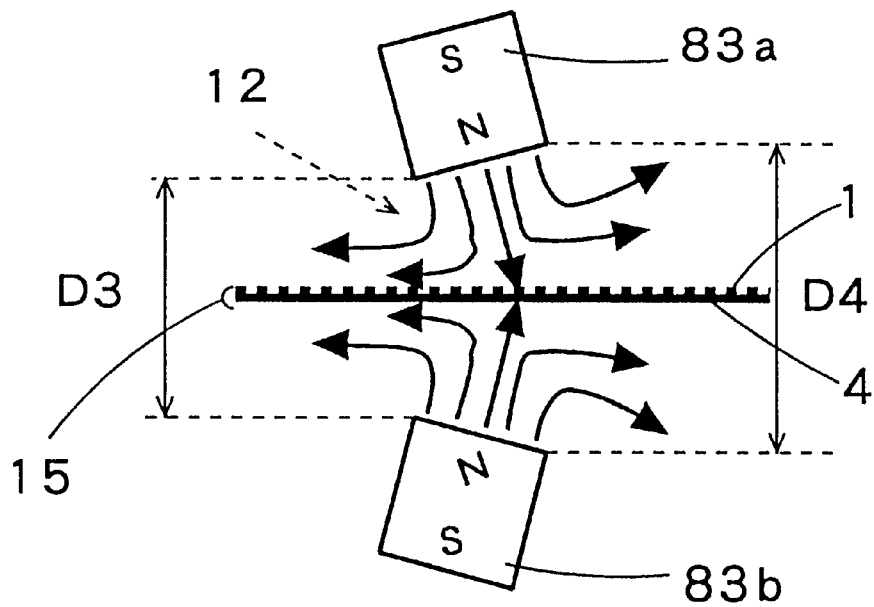
FIG. 14 represents drawings to explain another method for applying magnetic field using electromagnets.
Figure 14B:
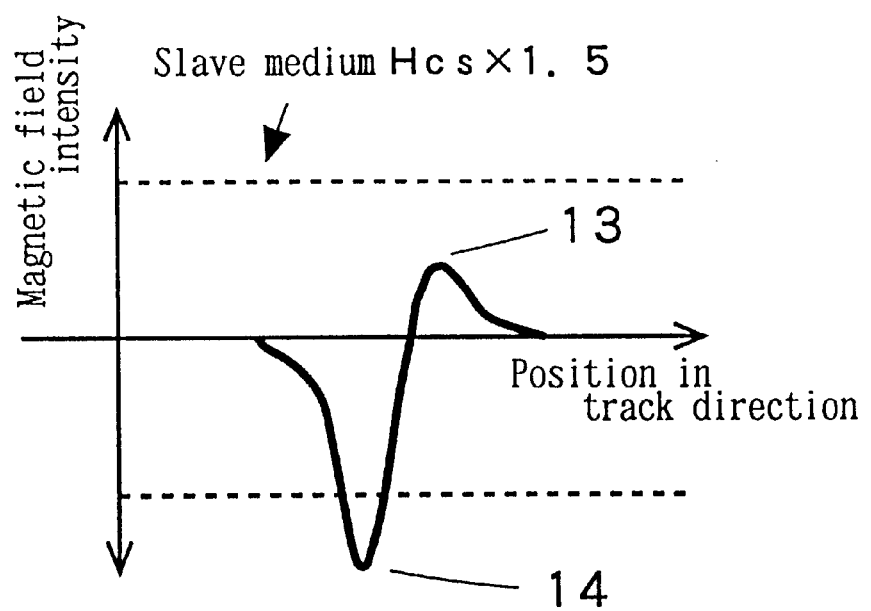

FIG. 14(A) is a drawing to explain a method for applying an asymmetrical magnetic field. FIG. 14(B) is a diagram to explain intensity of the magnetic field to be given by application of the magnetic field of FIG. 14(A).

Tilted electromagnets 83a and 83b are each magnetized symmetrically to axis of magnetic poles by DC excitation current, and these electromagnets are arranged with magnetic poles with the same polarity facing to each other and with a combination unit 15 comprising a slave medium and a master carrier for magnetic transfer closely combined together, said combination unit 15 being interposed between the electromagnets. The electromagnets are arranged in such manner that a distance D3 between ends of the electromagnet at one end of track direction is different from a distance D4 between ends of the electromagnets at the other end, and magnetic field intensity distribution in track direction is turned to asymmetrical. To the surface of the slave medium 4, an asymmetrical magnetic field 12 is applied. The combination unit comprising the slave medium and the master carrier for magnetic transfer or the tilted electromagnets 83a and 83b are rotated in track direction with respect to the central axis of the combination unit 15. By applying an asymmetrical magnetic field to the entire surface of the slave medium, initial DC magnetization is performed.

In the asymmetrical magnetic field, a peak value 13 with lower intensity exerts no influence on the initial DC magnetization to the slave medium, and only a peak value 14 with higher intensity exerts action on initial DC magnetization.

FIG. 15 represents drawings to explain a method for applying magnetic field using two pairs of electromagnets arranged at adjacent positions and perpendicularly to the surface of the slave medium with the slave medium interposed between the electromagnets.

Figure 15A:
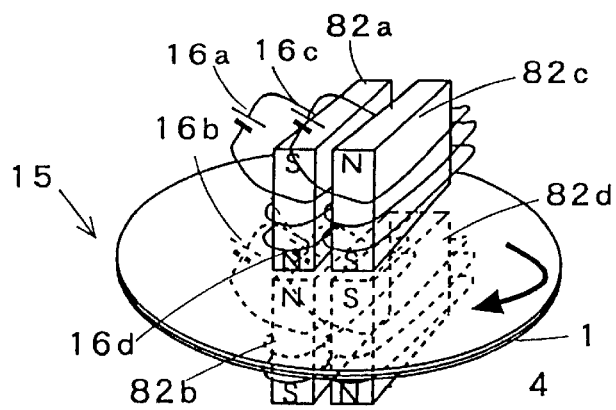

FIG. 15(A) shows an example where a pair of electromagnets 82a and 82b each having magnetic field symmetrical to the axis of magnetic poles and placed respectively on upper surface and lower surface of a combination unit 15 comprising a slave medium and a master carrier for magnetic transfer, and said electromagnet are arranged with the magnetic poles with the same polarity facing to each other. Further, another pair of electromagnets 82c and 8d are arranged in such manner that each magnetic pole faces to a magnetic pole of opposite polarity in the adjacent pair of magnets. Under this condition, the combination unit 15 is rotated. To each of the electromagnets 82a, 82b, 82c and 82d, DC excitation current is supplied from DC power sources 16a, 16b, 16c and 16d respectively.

Figure 15B:
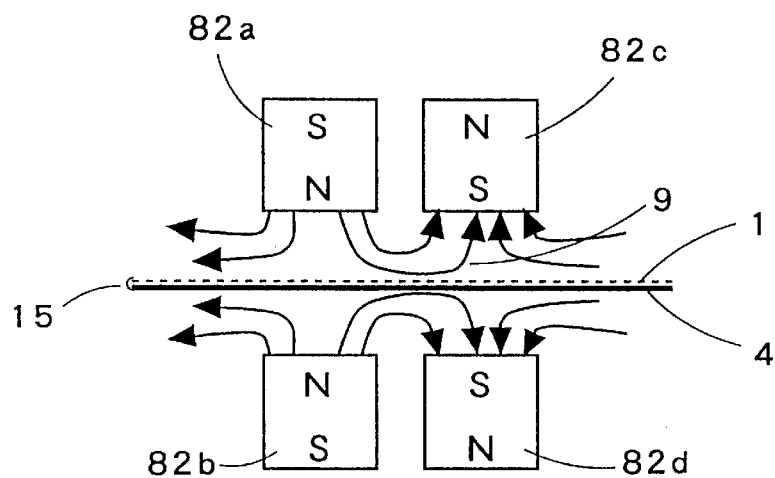

The electromagnets 82a and 82b are arranged on upper surface and lower surface of the combination unit 15 respectively with the magnetic poles with the same polarity facing to each other. As shown in FIG. 15(B), the electromagnets 82a and 82b repel each other. The magnetic field of the electromagnet 82a is directed to the electromagnet 82c of the adjacent pair of electromagnets 82c and 82d. The magnetic field of the electromagnet 82b is directed to the electromagnet 82d of the adjacent pair of the electromagnets. As a result, a magnetic field 9 is applied to the surface of the slave medium 4.

Figure 15C:
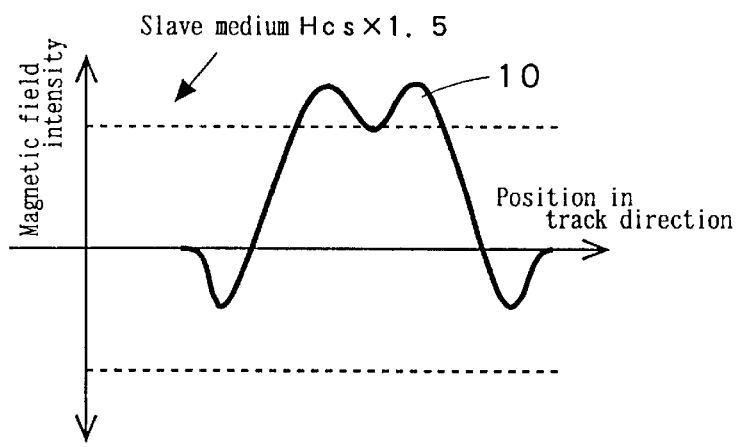

FIG. 15(C) is a diagram showing intensity of the magnetic field applied to the slave medium. The magnetic field applied to the slave medium has a peak value 10, which is by more than 1.5 times higher than the coercive force Hcm of the slave medium. By rotating the slave medium or the electromagnet, initial DC magnetization can be performed to the slave medium.

A distance between the electromagnets arranged at adjacent positions and facing to each other should be set to such a distance that the magnetic field provided by the adjacent electromagnets can give a magnetic field, which has intensity higher than the coercive force of the slave medium, to the slave medium.

FIG. 16 represents drawings to explain a method for applying magnetic field using a single electromagnet with axis of magnetic poles in lateral direction.

Figure 16A:
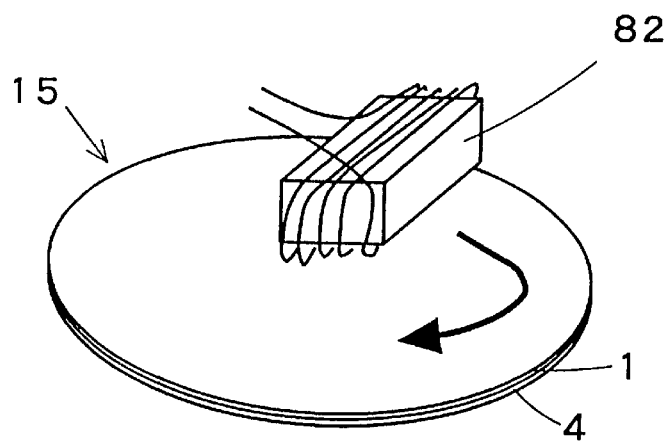
FIG. 16 represents drawings to explain a method for applying magnetic field using a single electromagnet with axis of magnetic poles in lateral direction.

FIG. 16(A) shows an example where an electromagnet 82 having magnetic field symmetrical to the axis of magnetic poles is arranged on the upper surface of a combination unit 15 which comprises a slave medium 4 and a master carrier for magnetic transfer 1. With the axis of the magnetic poles arranged in parallel to the surface of the slave medium 4, the combination unit 15 is rotated.

Figure 16B:
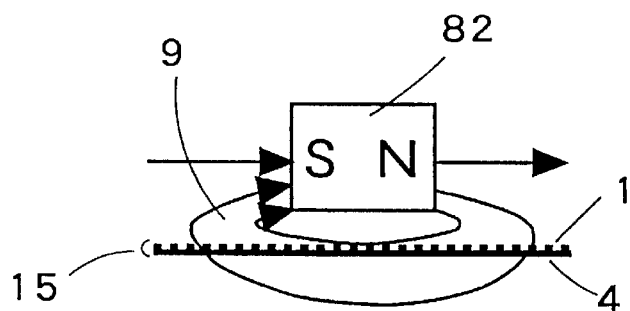

From the electromagnet 82 arranged on the upper surface of the combination unit 15, a magnetic field 9 is applied to the surface of the slave medium 4 as shown in FIG. 16(B).

Figure 16C:
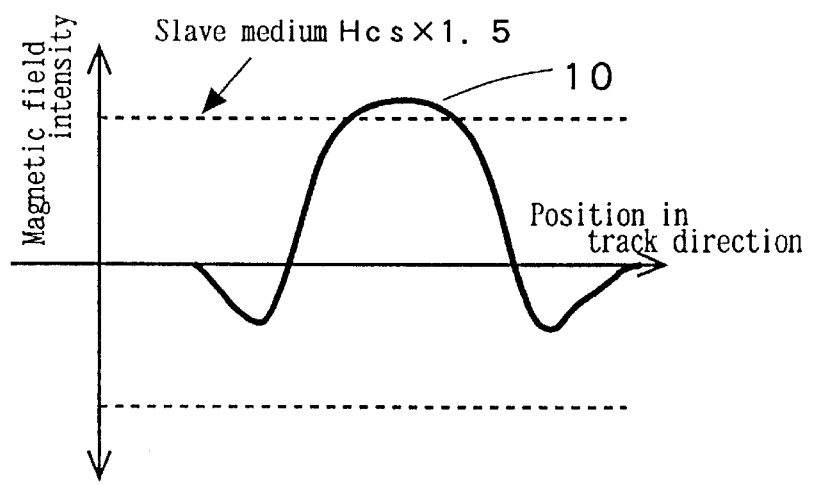

FIG. 16(C) is a diagram showing intensity of the magnetic field applied to the slave medium. The magnetic field applied to the slave medium has a peak value 10 which is by more than 1.5 times higher than the coercive force Hcm of the slave medium. By rotating the combination unit: or by rotating the electromagnet, initial DC magnetization can be performed to the slave medium.

FIG. 17 represents drawings to explain a method for applying magnetic field using two electromagnets arranged at adjacent positions and placed on one of the surfaces of a combination unit, which comprises a slave medium and a master carrier for magnetic transfer closely combined together.

Figure 17A:
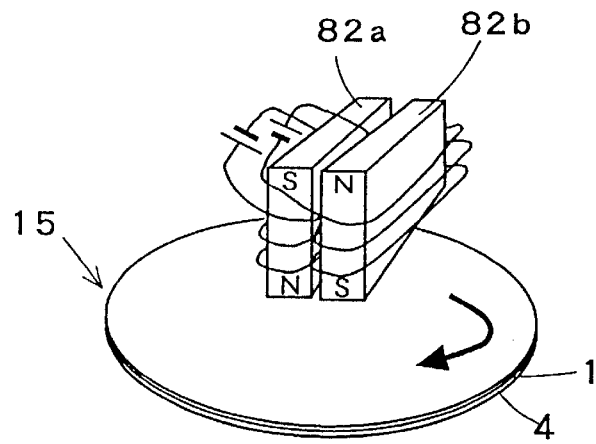
FIG. 17 represents drawings to explain a method for applying magnetic field using two electromagnets arranged at adjacent positions and placed on one of the surfaces of a combination unit comprising the slave medium and the master carrier for magnetic transfer closely combined together.

FIG. 17(A) shows an example where two electromagnets 82a and 82b are arranged in such manner that direction of the magnetic poles are opposite to each other, i.e. each magnetic pole faces to a magnetic pole of opposite polarity in the adjacent magnet, and axis of the magnetic poles arranged perpendicularly to the slave medium. Under this condition, the combination unit 15 is rotated.

Figure 17B:
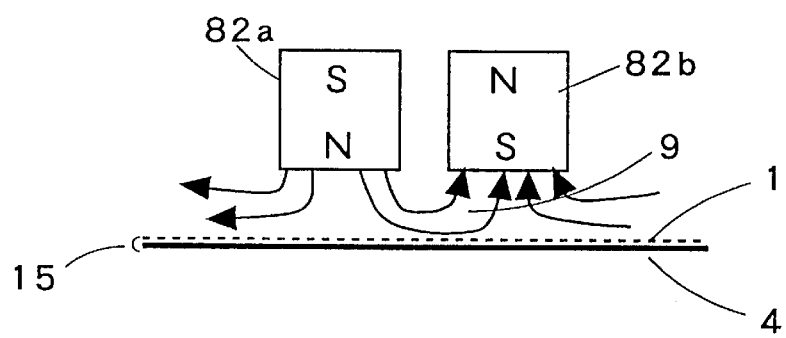

As described above, two electromagnets 82a and 82b are arranged in such manner that the direction of the magnetic poles is opposite to each other, i.e. each magnetic pole faces to a magnetic pole of opposite polarity in the adjacent magnet, and axis of the magnetic poles is arranged perpendicularly to the slave medium. As a result, as shown in FIG. 17(B), magnetic field of the electromagnet 82a is directed to the other electromagnet 82b at adjacent position. Thus, a magnetic field 9 is applied to the surface of the slave medium 4. In FIG. 17, the electromagnet is arranged on the upper surface of the combination unit, while it may be disposed on any surface of the combination unit or on both surfaces of the combination unit.

Figure 17C:
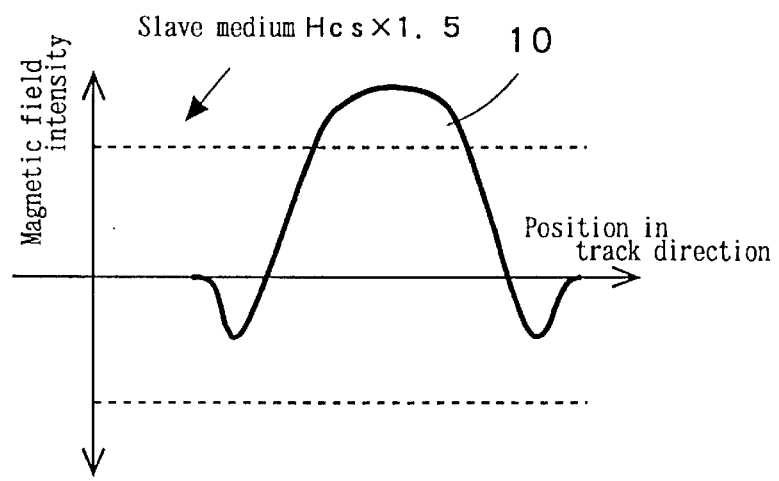

FIG. 17(C) is a diagram showing intensity of the magnetic field to be given to the slave medium. The magnetic field to be applied to the slave medium has a peak value 10 which is by more than 1.5 times higher than the coercive force Hcm of the slave medium. By rotating the combination unit or by rotating the two electromagnets, initial DC magnetization can be performed to the slave medium.

Figure 18A:
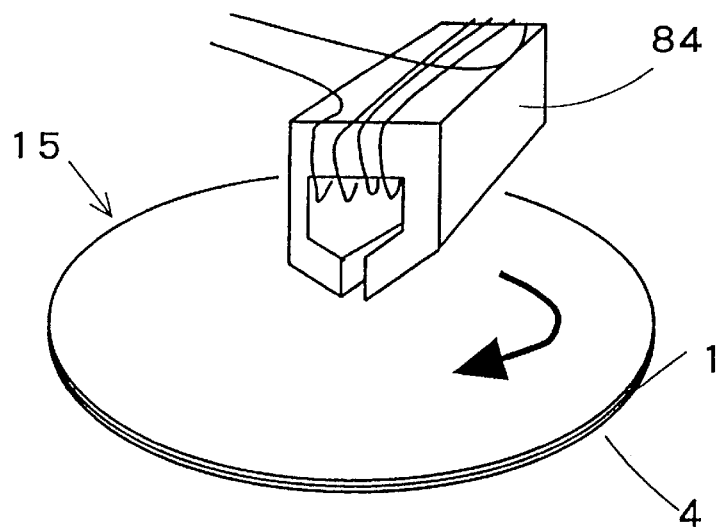
FIG. 18 represents drawings to explain a method for applying magnetic field using a ring-type head electromagnet.

FIG. 18 represents drawings to explain a method for applying magnetic field using a ring-type head electromagnet. FIG. 18(A) shows an example where a ring-type head electromagnet 84 is arranged on upper surface of a combination unit 15 which comprises a slave medium and a master carrier for magnetic transfer closely combined together, and the combination unit 15 is rotated.

Figure 18B:
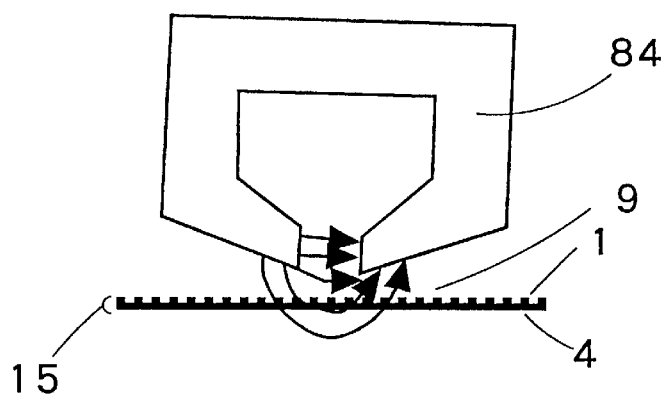

From the ring-type head electromagnet 84 arranged on the upper surface of the combination unit 15, a magnetic field 9 is applied to the surface of the slave medium 4 as shown in FIG. 18(B).

Figure 18C:
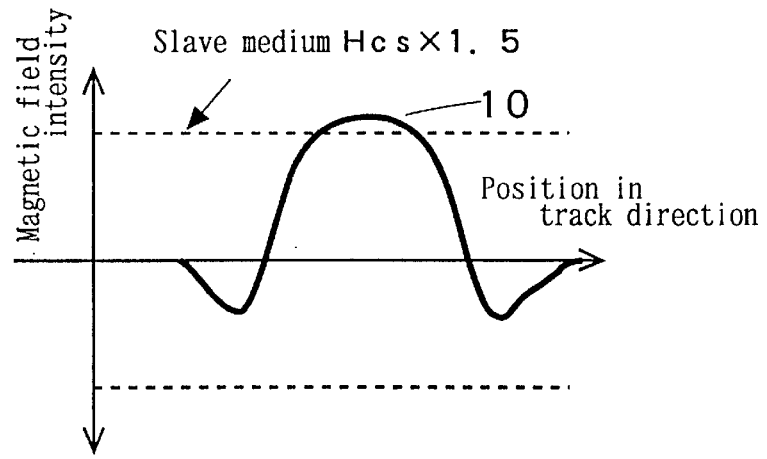

FIG. 18(C) is a diagram showing intensity of the magnetic field applied to the slave medium. The magnetic field to be applied to the slave medium has a peak value 10 which is by more than 1.5 times higher than the coercive force Hcm of the slave medium. By rotating the combination unit or by rotating the ring-type head electromagnet, initial DC magnetization can be performed to the slave medium.

In FIG. 18, description has been given on an example where the ring-type head electromagnet is arranged on the upper surface of the combination unit, while it may be disposed on any surface of the combination unit or may be arranged on both surfaces.

FIG. 19 represents drawings to explain a method for applying magnetic field using an annular electromagnet.

An annular electromagnet is designed in such manner that, on the surface of an annular body such as annular unit which is formed by rotating a circle around a central axis, a coil having the same size as diameter of the circle is wound. Major line of magnetic force is formed inside the annular body. In the present invention, the line of magnetic force provided outside the annular body is utilized.

Cross-section of the coil wound on the surface of the annular body is not limited to a circular shape but may be a flattened circular shape, a rectangular shape or a rectangle with circular ends. It is preferable that track surface of the annular electromagnet is of flat shape. It is also preferable that the distance between the annular electromagnet and the slave medium or the combination unit is minimized. The distance is preferably from 0.5 mm to 20 mm.

Figure 19A:
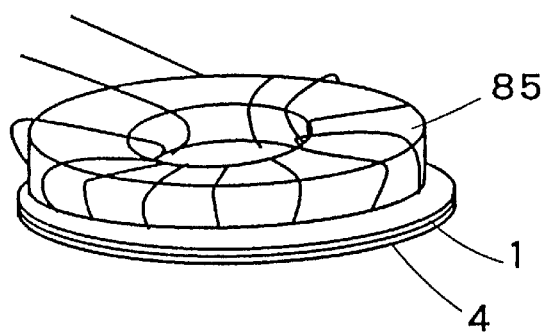
FIG. 19 represents drawings to explain a method for applying magnetic field using an annular electromagnet.

FIG. 19(A) shows a combination unit 15 with an annular electromagnet 85 arranged on the upper surface of the combination unit 15, which comprises a slave medium and a master carrier for magnetic transfer closely combined together.

Figure 19B:
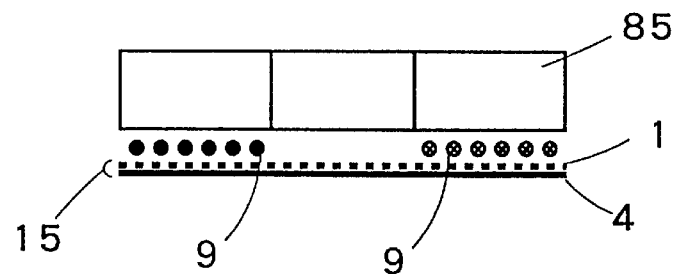

From the annular electromagnet 85 placed on the upper surface of the combination unit 15, a magnetic field 9 from the annular electromagnet is applied with intensity by more than 1.5 times higher than the coercive force Hcm of the slave medium to the surface of the slave medium 4 as shown in FIG. 19(B), and initial DC magnetization can be performed to the slave medium.

Figure 19C:
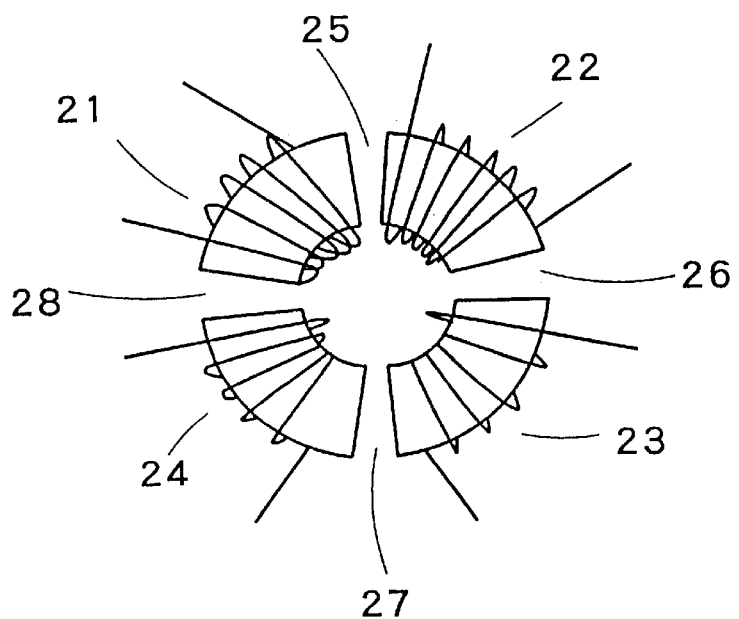

In the annular electromagnet shown in FIG. 19(C), the coil wound on the annular electromagnet is divided to four pieces 21 to 24. In addition to the means such as adjustment of electric current in the coils 21 to 24, it is possible to adjust magnetic field intensity on the surface of the slave medium by adjusting spaces 25 to 28 between the coils.

Referring to FIG. 19, description has been given on an example where the annular electromagnet is placed on the upper surface of the combination unit, while the electromagnet may be arranged on the lower surface or on both surfaces of the combination unit.

Next, description will be given on a method to transfer a recording information from the master carrier for magnetic transfer to the slave medium.

FIG. 20 represents drawings to explain a method for transfer and an apparatus for transfer to apply magnetic field using a single permanent magnet with axis of magnetic poles tilted with respect to the surface of a slave medium.

Figure 20A:
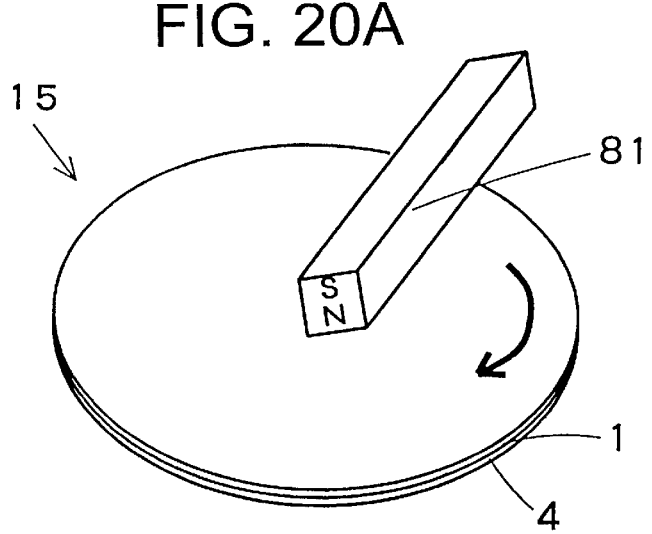
FIG. 20 represents drawings to explain a method for transfer and an apparatus for transfer for applying magnetic field using a single permanent magnet with axis of magnetic poles tilted with respect to the surface of the slave medium.
Figure 20B:
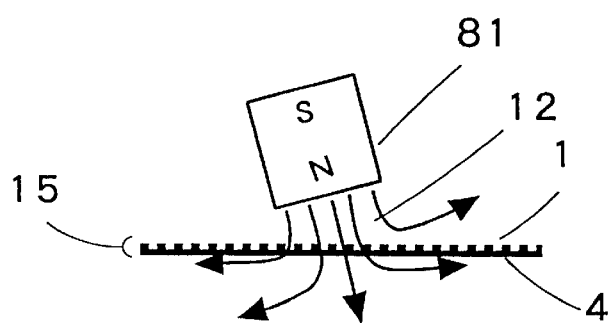
Figure 20C:
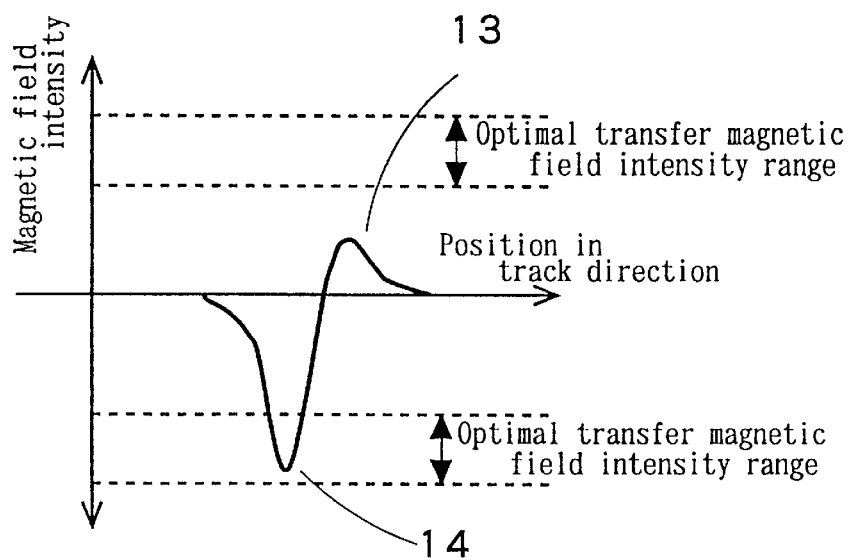

FIG. 20(A) is a perspective view, and FIG. 20(B) is a cross-sectional view. FIG. 20(C) is a diagram to show magnetic field applied to a combination unit.

Description is given on a method for applying a transfer magnetic field using a tilted permanent magnet 81 on the surface of a combination unit 15, which comprises a slave medium 4 processed by initial DC magnetization and a master carrier for magnetic transfer 1 closely combined together. By rotating the tilted permanent magnet 81 or the combination unit 15 in track direction with respect to the central axis, an asymmetrical magnetic field 12 is applied to the combination unit 15, and a magnetic field is applied in opposite direction to the magnetizing direction of the initial DC magnetization.

In the asymmetrical magnetic field, a peak value 13 with lower intensity exerts no influence on transfer of a pattern to the slave medium from the master carrier for magnetic transfer, and only a peak value 14 with higher intensity contributes to the magnetic transfer.

FIG. 21 represents drawings to explain a method for transfer and an apparatus for transfer to apply magnetic field using permanent magnets arranged on two surfaces of a slave medium respectively and each having axis of magnetic pole placed obliquely to the surface of the slave medium.

Figure 21A:
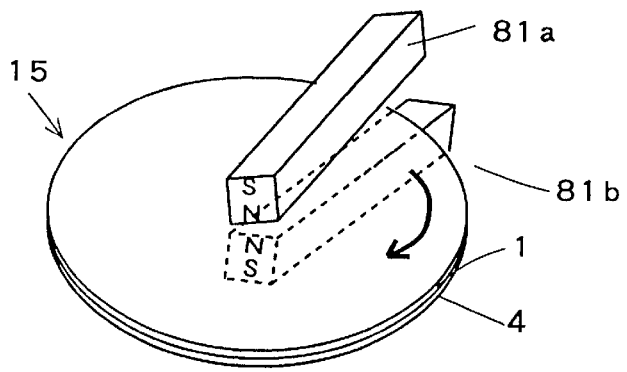
FIG. 21 represents drawings to explain a method for transfer and an apparatus for transfer for applying magnetic field using permanent magnets being placed on surfaces of the slave medium respectively and each having axis of magnetic poles placed obliquely to each surface of the slave medium.
Figure 21B:
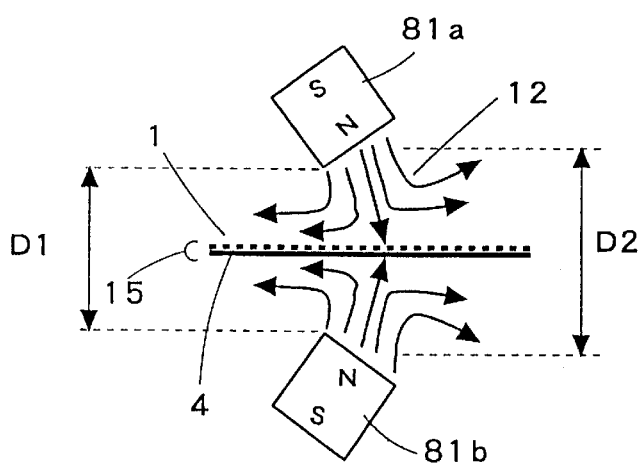
Figure 21C:
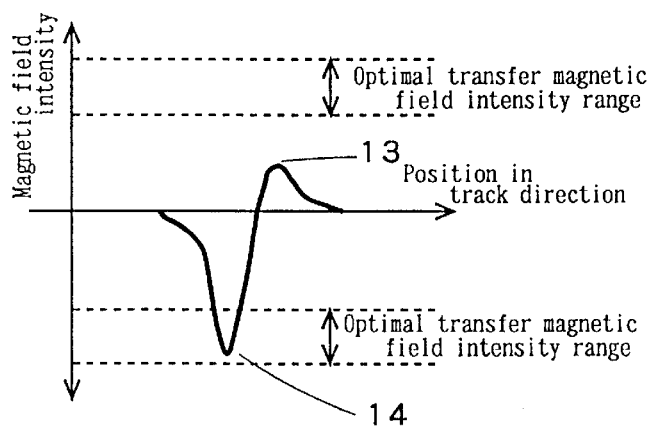

FIG. 21(A) is a perspective view, and FIG. 21(B) is a cross-sectional view. FIG. 21(C) is a diagram showing the magnetic field applied on a combination unit.

To the surface of a combination unit 15 comprising a slave medium 4 under initial DC magnetization and a master carrier 1 for magnetic transfer closely combined together, tilted permanent magnets 81a and 81b each magnetized symmetrically to the axis of magnetic poles are arranged with magnetic poles of the same polarity facing to each other and with the combination unit 15 interposed between. Magnetic field intensity distribution is turned to asymmetrical in track direction by arranging the magnets in such manner that a distance D1 between ends of the permanent magnets at one end of track direction is different from a distance D2 between ends of the permanent magnets at the other end. By applying an asymmetrical magnetic field 12 to the surface of the slave medium 4, and by rotating the combination unit 15 or at least one of the tilted permanent magnets 81a and 81b in track direction with respect to the central axis of the combination unit 15, a magnetic field in opposite direction to the magnetizing direction of the initial DC magnetization can be applied to the entire surface of the combination unit 15.

In the asymmetrical magnetic field, a peak value 13 with lower intensity exerts no influence on transfer of a pattern to the slave medium from the master carrier for magnetic transfer, and only a peak value 14 with higher intensity contributes to the magnetic transfer.

By applying a magnetic field of optimal transfer magnetic field intensity range from the master carrier for magnetic transfer to the slave medium, the peak value 14 with higher intensity can provide a satisfactory pattern regardless of the shape of the pattern.

FIG. 22 represents drawings to explain a method for transfer and an apparatus for transfer to apply magnetic field using a single permanent magnet with axis of magnetic poles in lateral direction.

Figure 22A:
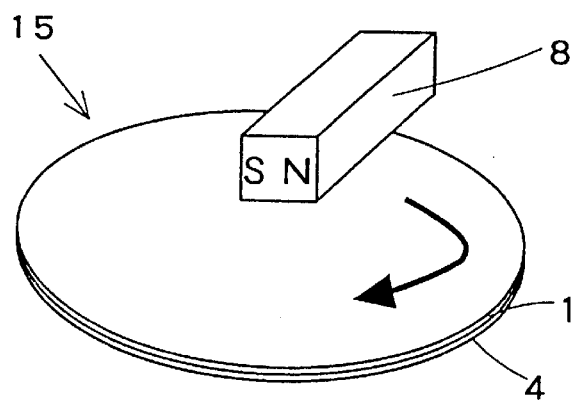
FIG. 22 represents drawings to explain a method for transfer and an apparatus for transfer for applying magnetic field using a single permanent magnet with axis of magnetic poles in lateral direction.
Figure 22B:
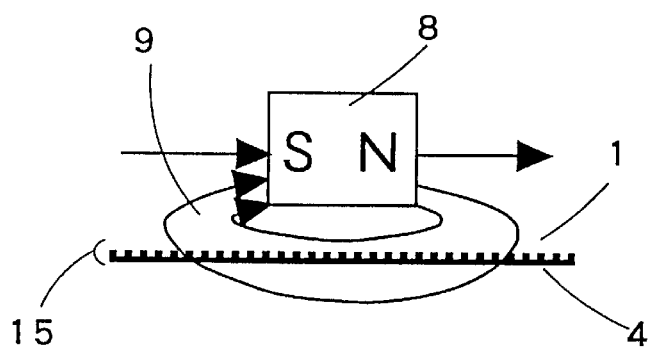
Figure 22C:
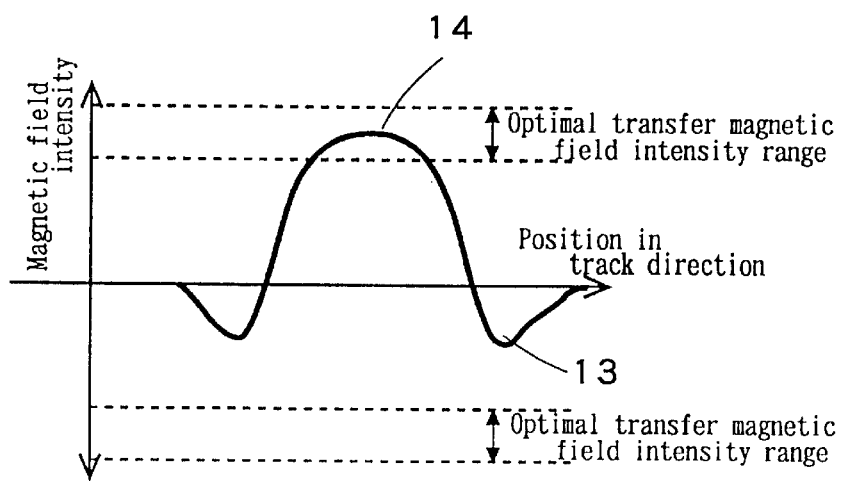

FIG. 22(A) is a perspective view, and FIG. 22(B) is a cross-sectional view. FIG. 22(C) is a diagram to show the magnetic field applied on a combination unit.

On the upper surface of a combination unit 15 comprising a slave medium 4 and a master carrier for magnetic transfer 1 closely combined together, a permanent magnet 8 having magnetic field symmetrical to axis of magnetic poles is rotated in track direction with respect to the central axis of the combination unit 15, while axis of magnetic poles is disposed in parallel to the surface of the slave medium 4. As a result, a magnetic field in opposite direction to the magnetizing direction of the initial DC magnetization is applied to the entire surface of the combination unit 15.

In the magnetic field applied, a peak value 13 with lower intensity exerts no influence on transfer of a pattern from the master carrier for magnetic transfer to the slave medium, and only a peak value 14 with higher intensity contributes to the magnetic transfer.

By applying a magnetic field in optimal transfer magnetic field intensity range from the master carrier for magnetic transfer to the slave medium, the peak value 14 with higher intensity can provide a satisfactory pattern regardless of the shape of the pattern.

In FIG. 22, description has been given on an example where a magnet is arranged on the upper surface of the combination unit, while the magnet may be arranged on any surface of the combination unit or may be arranged on both surfaces.

FIG. 23 represents drawings to explain a method for transfer and an apparatus for transfer to apply magnetic field using two pairs of permanent magnets at adjacent positions arranged perpendicularly to the surface of the slave medium with the slave medium interposed between.

Figure 23A:
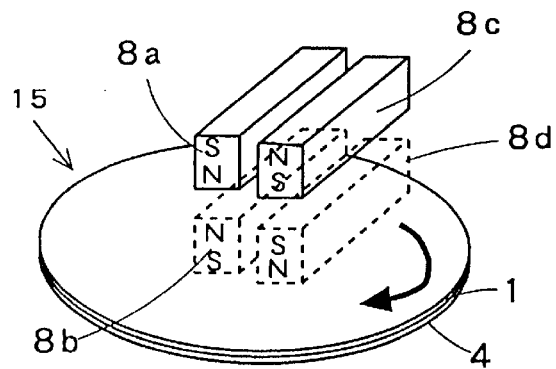

FIG. 23(A) shows an example where, on upper surface and lower surface of a combination unit comprising a slave medium 4 and a master carrier for magnetic transfer 1 closely combined together, a pair of permanent magnets 8a and 8b each having magnetic field symmetrical to axis of magnetic poles are arranged with magnetic poles of the same polarity facing to each other. At adjacent positions to this pair of magnets, another pair of permanent magnets 8c and 8d are arranged so that each magnetic pole faces to a magnetic pole of opposite polarity in the adjacent pair of magnets. Under this condition, the combination unit 15 is rotated.

Figure 23B:
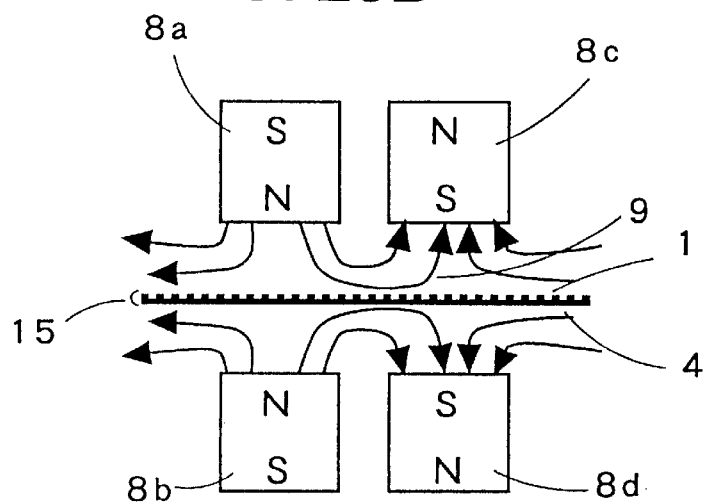

On upper surface and lower surface of the combination unit 15, the permanent magnets 8a and 8b are arranged with the magnetic poles of the same polarity facing to each other. As shown in FIG. 23(B), magnetic fields of the permanent magnets 8a and 8b repel each other. Magnetic field of the permanent magnet 8a is directed to the permanent magnet 8c of the adjacent pair of permanent magnets. Magnetic field of the permanent magnet 8b is directed to the permanent magnet 8d of the adjacent pair of permanent magnets. As a result, a magnetic field 9 is applied to the surface of the slave medium 4.

Figure 23C:
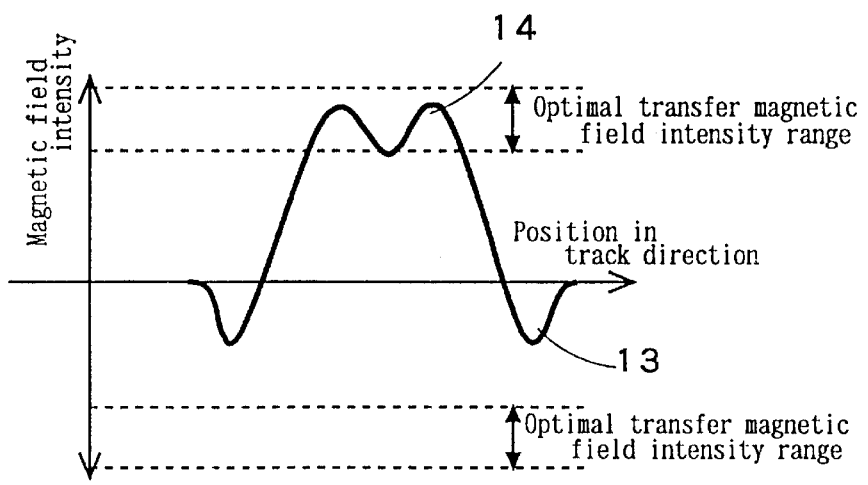

As a result, a magnetic field with magnetic field intensity as shown in FIG. 23(C) is applied to the combination unit.

In the magnet field applied to the slave medium, a peak value 13 with lower intensity exerts no action to transfer of a pattern from the master carrier for magnetic transfer to the slave medium because it is far lower compared with the optimal transfer magnetic field intensity range, and only a peak 14 with higher intensity contributes to the magnetic transfer. By applying magnetic field within the optimal transfer magnetic field intensity range from the master carrier for magnetic transfer to the salve medium, the peak 14 with higher intensity can provide a satisfactory pattern regardless of the shape of the pattern.

FIG. 24 represents drawings to explain a method for transfer and an apparatus for transfer to apply magnetic field using two permanent magnets at adjacent positions on one surface of a combination unit comprising a slave medium and a master carrier for magnetic transfer closely combined together.

Figure 24A:
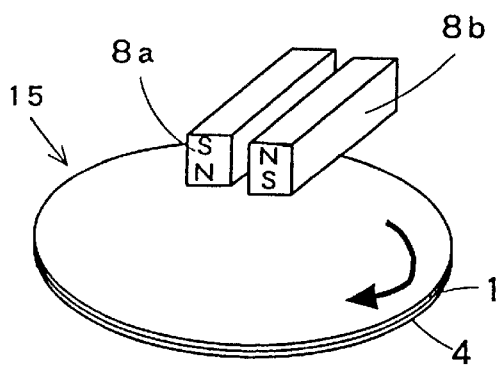
FIG. 24 represents drawings to explain a method for transfer and an apparatus for transfer for applying magnetic field using two permanent magnets placed at adjacent positions and arranged on one surface of a combination unit comprising a slave medium and a master carrier for magnetic transfer closely combined together.

In FIG. 24(A), on one surface of a combination unit comprising a slave medium 4 and a master carrier for magnetic transfer 1, two permanent magnets 8a and 8b are arranged so that the magnetic poles of the two magnets have directions opposite to each other, i.e. each magnetic pole faces to a magnetic pole of opposite polarity in the adjacent magnet, and arranged with axis of magnetic poles perpendicularly to the slave medium. Under this condition, the combination unit 15 is rotated.

Figure 24B:
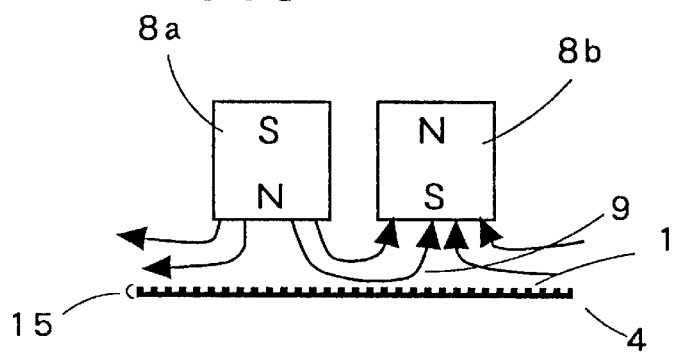

On at least one of the surfaces of the combination unit 15, two permanent magnets 8a and 8b are arranged with each of the magnetic poles to have opposite polarity, i.e. each magnetic pole faces to a magnetic pole of opposite polarity in the adjacent magnet, and with axis of magnetic poles arranged perpendicularly to the slave medium. As a result, as shown in FIG. 24(B), magnetic field of the permanent magnet 8a is directed to the permanent magnet 8b of the adjacent pair of magnets, and a magnetic field 9 is applied to the combination unit 15.

Figure 24C:
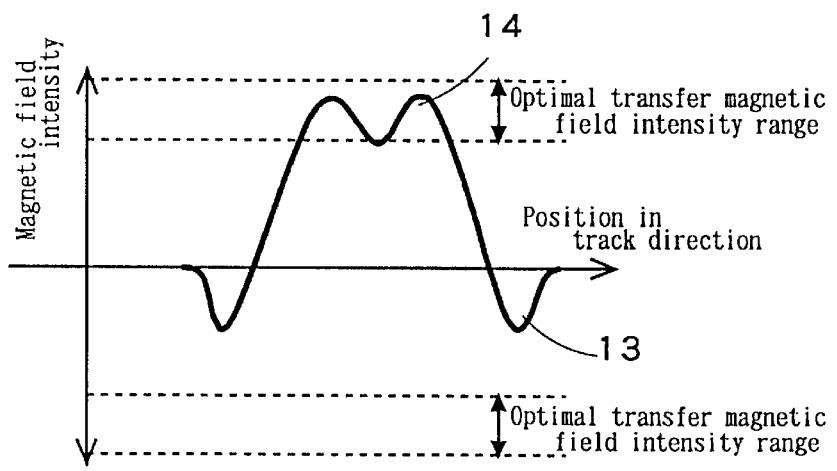

FIG. 24(C) is a diagram to show intensity of the magnetic field applied to the slave medium, which is closely combined with the master carrier for magnetic transfer.

In the magnetic field applied to the slave medium, a peak value 13 with lower intensity exerts no influence on transfer of a pattern from the master carrier for magnetic transfer because it is far lower than the optimal transfer magnetic field intensity range. Only a peak value 14 with higher intensity contributes to the magnetic transfer. By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 25 represents drawings to explain a method for transfer and an apparatus for transfer to apply magnetic field using a permanent magnet with end surfaces of the two magnetic poles facing to the surface of a slave medium.

Figure 25A:
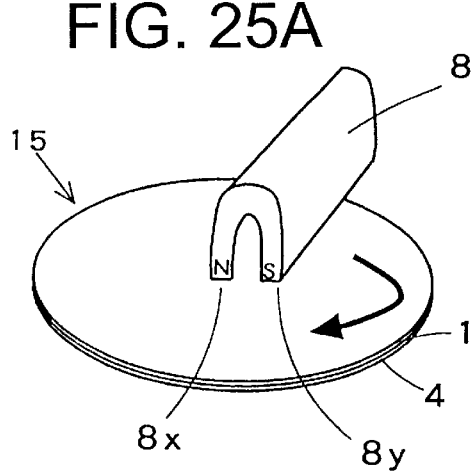
FIG. 25 represents drawings to explain a method for transfer and an apparatus for transfer for applying magnetic field using a single permanent magnet placed on the surface of the slave medium and with end surfaces of both magnetic poles being faced to the surface of the slave medium.

FIG. 25(A) shows an example where a permanent magnet 8 is arranged on upper surface of a combination unit 15 comprising a slave medium and a master carrier for magnetic transfer with end surfaces 8x and 8y of the two magnetic poles of the magnet facing to the combination unit 15, and a magnetic field is applied and the combination unit 15 is rotated.

Figure 25B:
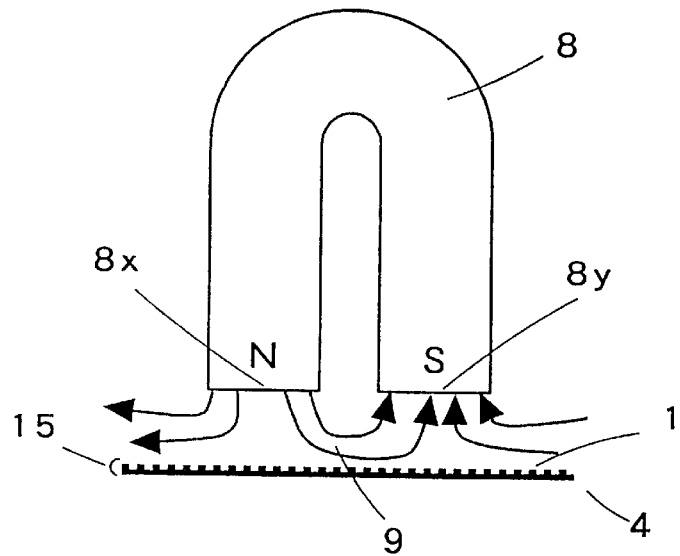
Figure 25C:
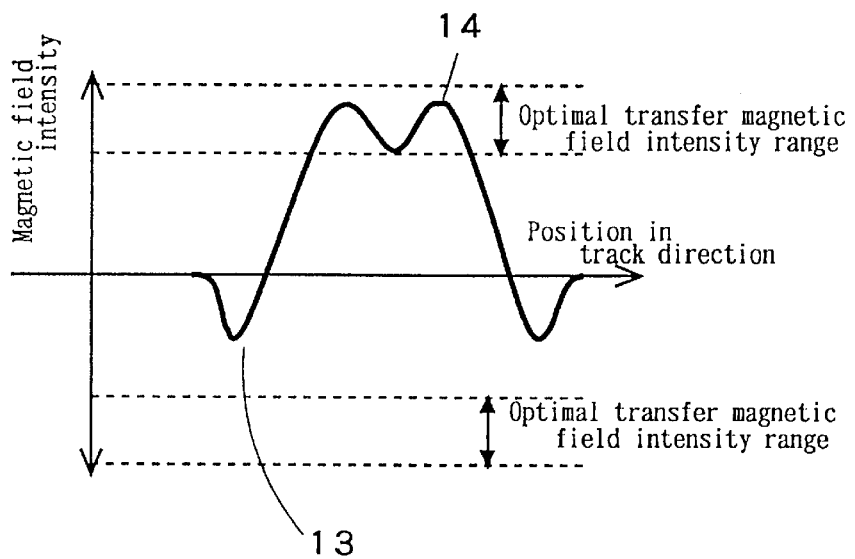

From the end surfaces 8x and 8y of the two magnetic poles of a single permanent magnet 8 placed on upper surface of the combination unit 15, a magnetic field 9 of track direction in parallel to the surface of the slave medium is applied as shown in FIG. 25(B), and the slave medium or the permanent magnet is rotated in track direction with respect to the central axis of the slave medium. To the combination unit 15, a magnetic field in opposite direction to the magnetizing direction of initial DC magnetization is applied as shown in FIG. 25(C).

In the magnetic field, a peak 13 with lower intensity exerts no influence on transfer of a pattern from the master carrier for magnetic transfer to the slave medium, and only a peak 14 with higher intensity contributes to the magnetic transfer.

By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 26 represents drawings to explain a method for transfer and an apparatus for transfer to apply magnetic field using an electromagnet on one surface of a combination unit.

Figure 26A:
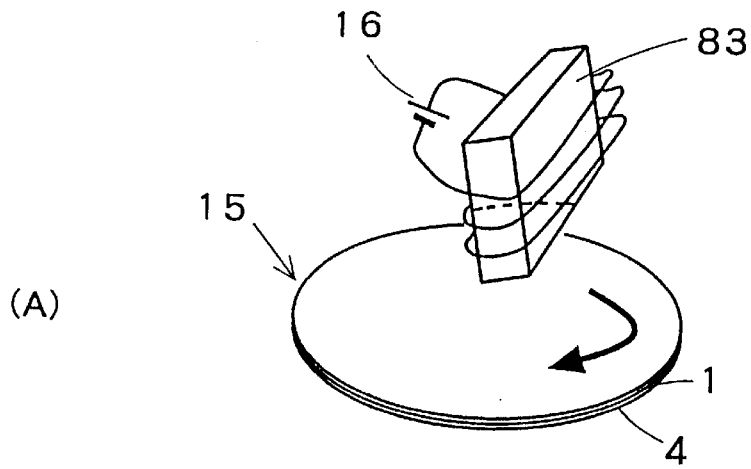
FIG. 26 represents drawings to explain a method for transfer and an apparatus for transfer for applying magnetic field using an electromagnet tilted with respect to one surface of a combination unit.
Figure 26B:
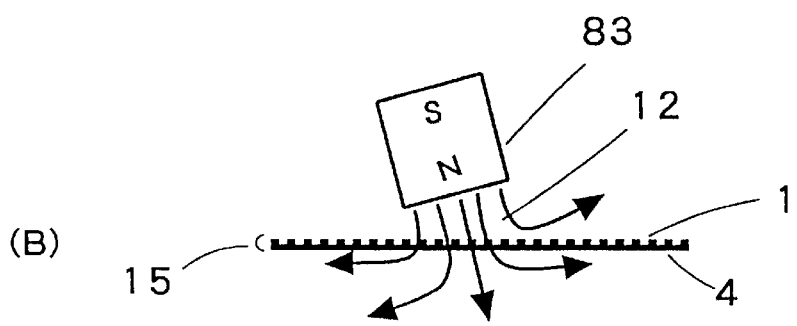
Figure 26C:
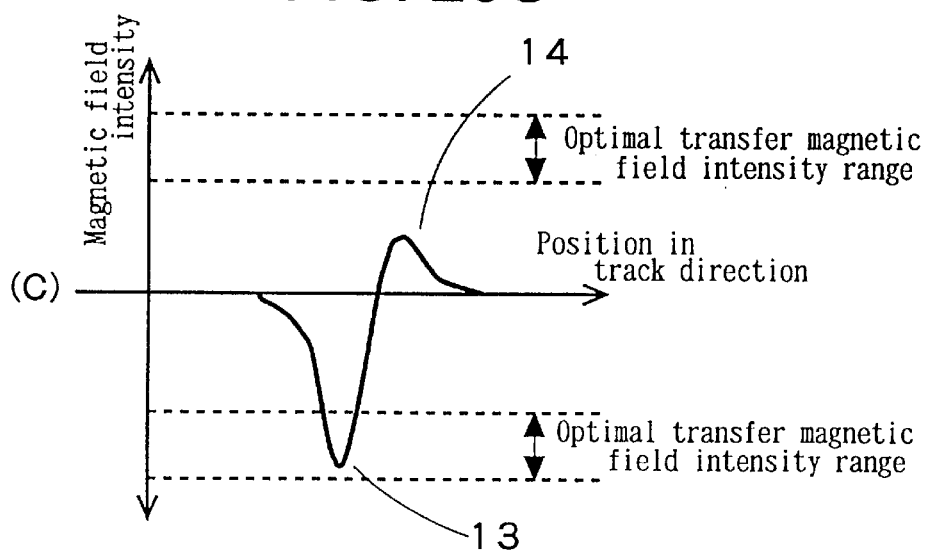

FIG. 26(A) shows an example where a tilted electromagnet 83 is arranged on a combination unit 15 comprising a slave medium 4 and a master carrier for magnetic transfer 1, and magnetic field is applied and the combination unit 15 is rotated. FIG. 26(B) is a drawing to explain the magnetic field applied to the combination unit, and FIG. 26(C) is a diagram to explain intensity of the magnetic field applied to the combination unit.

As shown in FIG. 26(A), a single tilted electromagnet 83 arranged on upper surface of the combination 15 is under DC excitation by DC current supplied from a DC power source 16. Axis of magnetic poles of the tilted electromagnet 83 is arranged obliquely to the combination unit 15.

As shown in FIG. 26(B), an asymmetrical magnetic field 12 is applied to the combination unit 15. When the tilted electromagnet 83 or the combination unit 15 is rotated in track direction with respect to the central axis of the combination unit as shown in FIG. 26(C), an asymmetrical magnetic field can be applied. Thus, magnetic transfer can be carried out by the asymmetrical magnetic field.

In the magnetic field applied to the slave medium, a peak 13 with lower intensity exerts no influence on transfer of a pattern from the master carrier for magnetic transfer to the slave medium because it is far lower compared with the optimal transfer magnetic field intensity range. Only a peak 14 with higher intensity contributes to the magnetic transfer. By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 27 represents drawings to explain a method for transfer and an apparatus for transfer to apply magnetic field using two tilted electromagnets at adjacent positions.

Figure 27A:
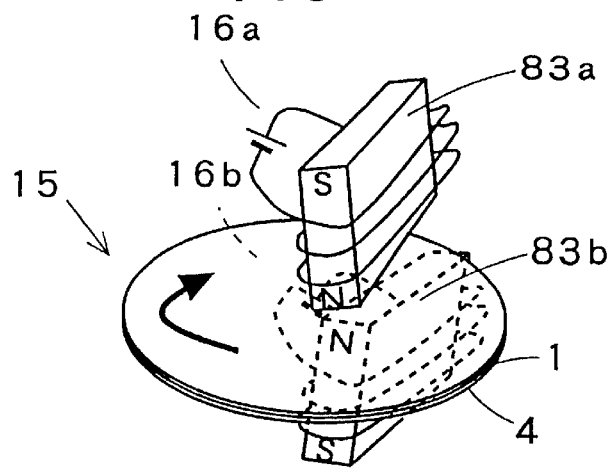
FIG. 27 represents drawings to explain a method for transfer and an apparatus for transfer for applying magnetic field using two tilted electromagnets.

FIG. 27(A) shows an example where, on upper surface and lower surface of a combination unit 15 comprising a slave medium 4 and a master carrier for magnetic transfer 1 closely combined together, tilted electromagnets 83a and 83b each magnetized symmetrically to axis of the magnetic poles are arranged with the magnetic poles of the same polarity facing to each other, and the slave medium is rotated. DC excitation current is supplied to the tilted electromagnets 83a and 83b from DC power sources 16a and 16b respectively.

Figure 27B:
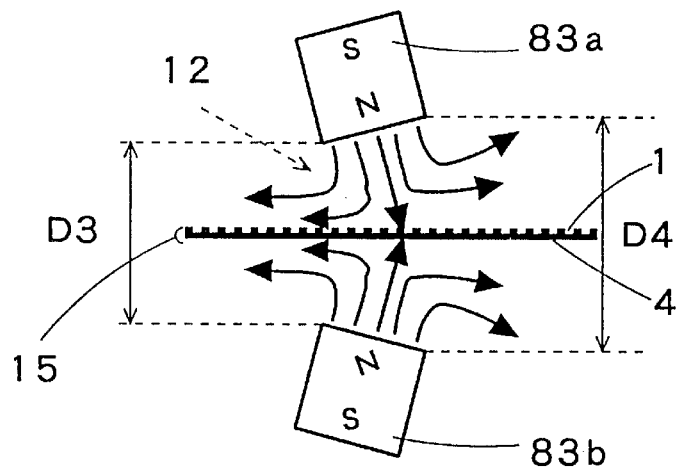

As shown in FIG. 27(B), the tilted electromagnets 83a and 83b are arranged with the magnetic poles of the same polarity facing to each other and with the combination unit 15 interposed between. Magnetic field intensity distribution is turned to asymmetrical by arranging in such manner that a distance D3 between ends of the electromagnets at one end of track direction is different from a distance D4 between ends of the electromagnets at the other end. An asymmetrical magnetic field 12 is applied to the combination unit 15, and the combination unit 15 or the tilted electromagnets 82a and 82b are rotated in track direction with respect to the central axis of the combination unit 15. As a result, a magnetic field in opposite direction to the magnetizing direction of initial DC magnetization is applied to the entire surface of the combination unit 15.

Figure 27C:
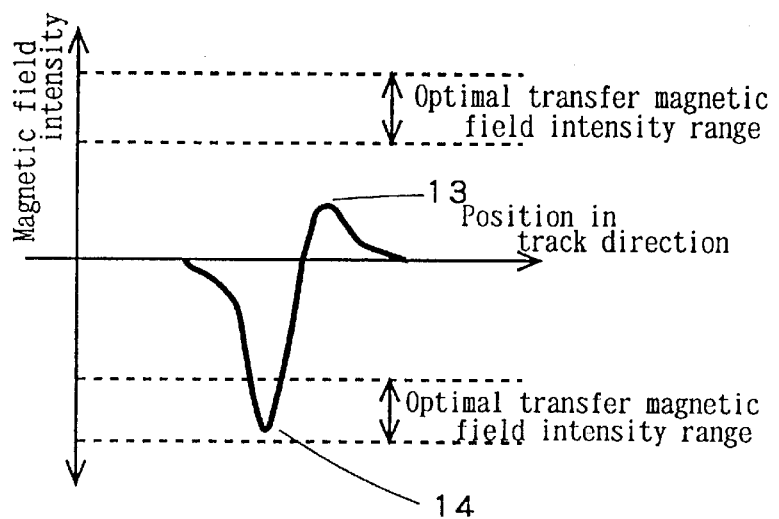

As shown in FIG. 27(C), a peak 13 with lower intensity in the asymmetrical magnetic field exerts no influence on transfer of a pattern from the master carrier for magnetic transfer to the slave medium, and only a peak 14 with higher intensity contributes to the magnetic transfer.

By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 28 represents drawings to explain a method for transfer and an apparatus for transfer to apply magnetic field using two pairs of electromagnets placed at adjacent positions and arranged perpendicularly to a combination unit comprising a slave medium and a master carrier for magnetic transfer.

Figure 28A:
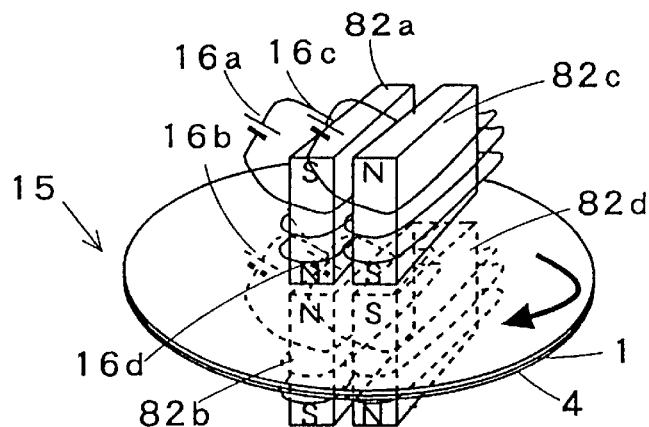
FIG. 28 represents drawings to explain a method for transfer and an apparatus for transfer for applying magnetic field using two pairs of electromagnets placed at adjacent positions and arranged perpendicularly to a combination unit comprising a slave medium and a master carrier for magnetic transfer closely combined together.

As shown in FIG. 28(A), on upper surface and lower surface of a combination unit 15 comprising a slave medium 4 and a master carrier for magnetic transfer 1, a pair of electromagnets 82a and 82b each having magnetic field symmetrical to axis of magnetic poles are arranged with magnetic poles of the same polarity facing to each other. Another pair of electromagnets 82c and 83d are arranged that each magnetic pole faces to a magnetic pole of opposite polarity in the adjacent pair of magnets. Under this condition, the combination unit 15 is rotated. DC excitation current is given to the electromagnets 82a, 82b, 82c and 82d from DC power sources 16a, 16b, 16c, and 16d respectively.

Figure 28B:
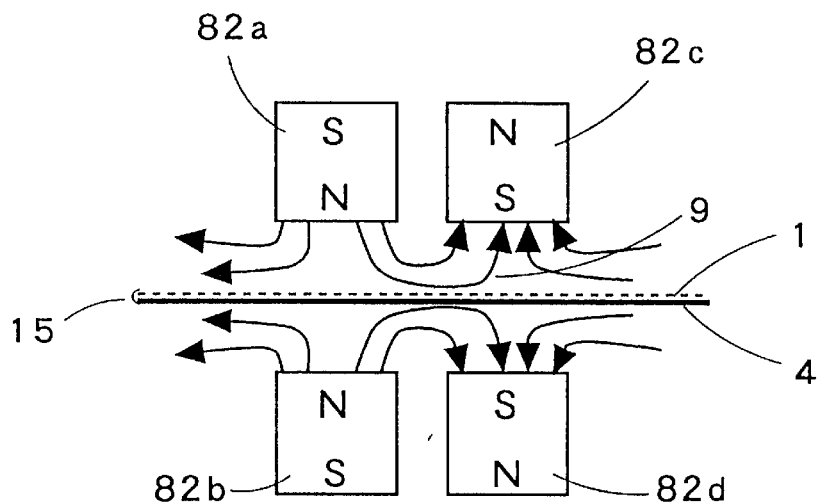

The electromagnets 82a and 82b are arranged on upper surface and lower surface of the combination unit 15 with magnetic poles of the same polarity facing to each other. As shown in FIG. 28(B), magnetic fields of the electromagnets 82a and 82b repel each other. Magnetic field of the electromagnet 82a is directed to the electromagnet 82c of the adjacent pair of electromagnets. Magnetic field of the electromagnet 82b is directed to the electromagnet 82d of the adjacent pair of electromagnets. As a result, a magnetic field 9 in opposite direction to the direction of initial DC magnetization is applied to the combination unit 15.

Figure 28C:
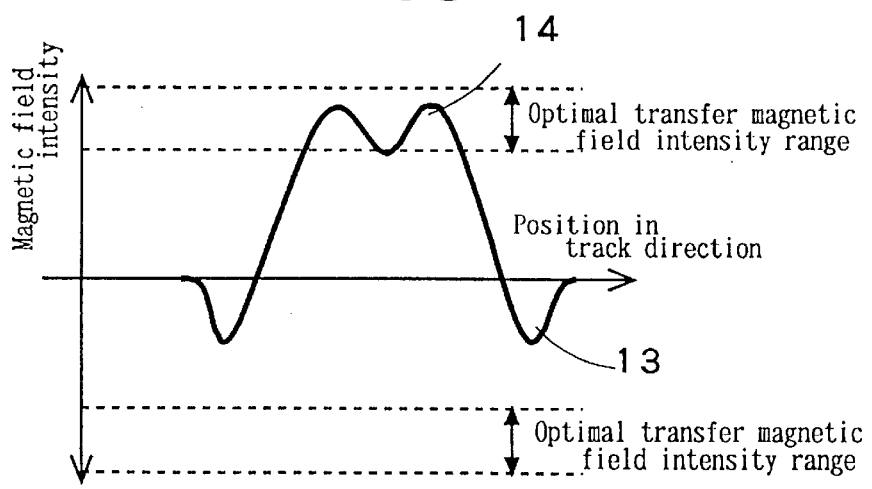

FIG. 28(C) is a diagram showing intensity of the magnetic field applied to the combination unit comprising the slave medium and the master carrier for magnetic transfer.

In the magnetic field applied to the combination unit, a peak 13 with lower intensity exerts no influence on transfer of a pattern from the master carrier for magnetic transfer to the slave medium because it is far lower compared with the optimal transfer magnetic field intensity range. Only a peak 14 with higher intensity contributes to the magnetic transfer. By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 29 represents drawings to explain a method for transfer and an apparatus for transfer to apply magnetic field using a single electromagnet with axis of magnetic poles in lateral direction.

Figure 29A:
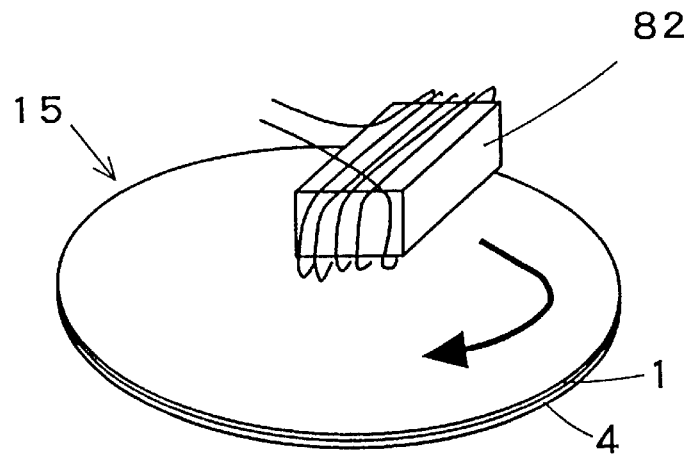
FIG. 29 represents drawings to explain a method for transfer and an apparatus for transfer for applying magnetic field using a single electromagnet with axis of magnetic poles in lateral direction.
Figure 29B:
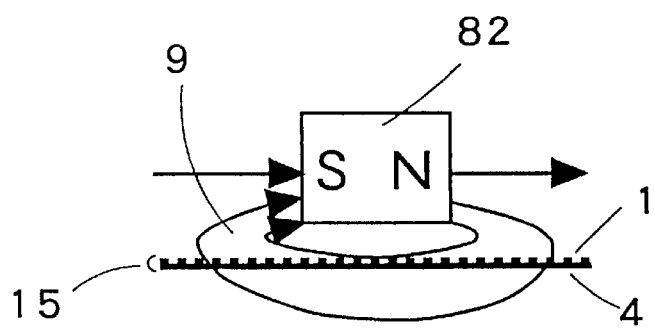

As shown in FIG. 29(A), on upper surface of a combination unit 15 comprising a slave medium 4 and a master carrier for magnetic transfer 1, an electromagnet 82 having magnetic field symmetrical to axis of magnetic poles is arranged with axis of magnetic poles in parallel to the surface of the slave medium 4, and the combination unit 15 is rotated. As shown in FIG. 29(B), a magnetic field 9 is applied to the surface of the slave medium 4.

Figure 29C:
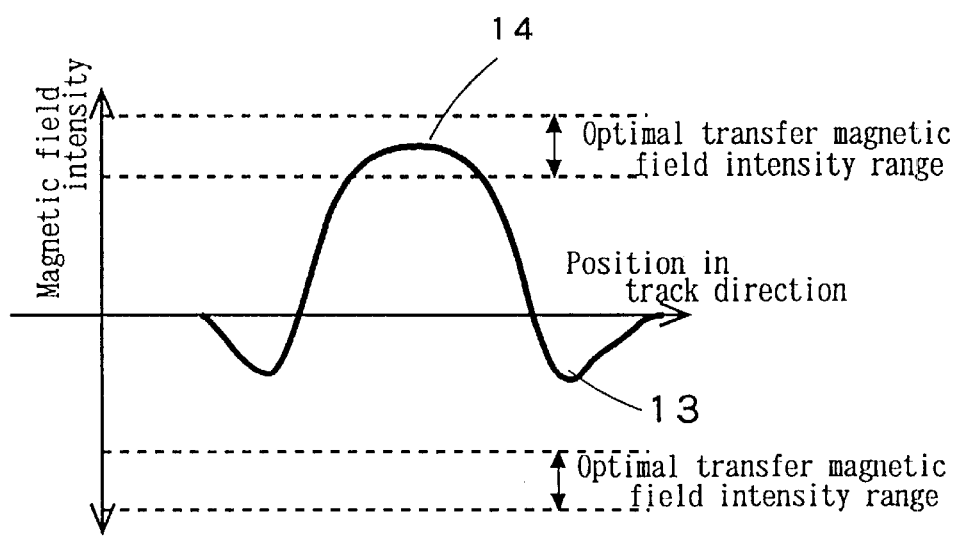

Then, as shown in FIG. 29(C), at least one of the combination unit 15 or the electromagnet 82 is rotated in track direction with respect to the central axis of the combination unit 15, and a magnetic field in opposite direction to the magnetizing direction of initial DC magnetization is applied to the entire surface of the combination unit 15.

In the magnetic field applied, a peak 13 with lower intensity exerts no influence to the magnetic transfer. Only a peak 14 with higher intensity contributes to the magnetic transfer.

By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 30 represents drawings to explain a method for transfer and an apparatus for transfer to apply magnetic field using two electromagnets at adjacent positions and placed on one surface of a combination unit.

Figure 30A:
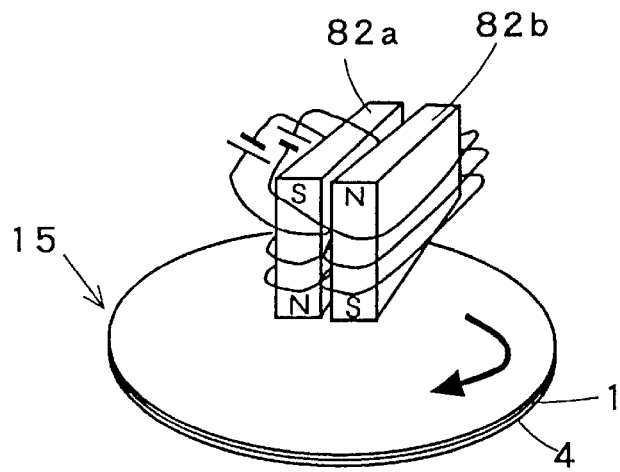
FIG. 30 represents drawings to explain a method for transfer and an apparatus for transfer for applying magnetic field using two electromagnets arranged at adjacent positions and placed on one surface of the combination unit.

In FIG. 30(A), on one surface of a combination unit 15 comprising a slave medium 4 and a master carrier for magnetic transfer 1 closely combined together, two electromagnets 82a and 82b are arranged with each of the adjacent magnetic poles to have opposite polarity, i.e. each magnetic pole faces to a magnetic pole of opposite polarity in the adjacent magnet, and with axis of each of the magnetic poles arranged perpendicularly to the slave medium 4. Under this condition, the combination unit 15 is rotated.

Figure 30B:
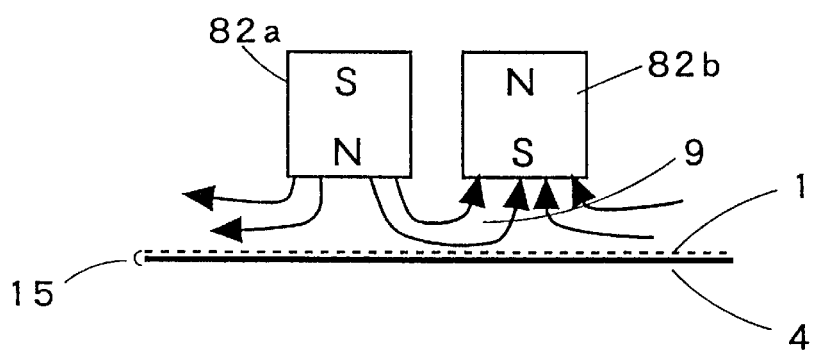

As described above, on at least one of the surfaces of, the combination unit 15, two electromagnets 82a and 82b are arranged with the direction of the magnetic pole in opposite direction, i.e. each magnetic pole faces to a magnetic pole of opposite polarity in the adjacent magnet, and with axis of magnetic poles perpendicularly to the slave medium. As shown in FIG. 30(B), magnetic field of the electromagnet 82a is directed to the adjacent electromagnet 82b, and a magnetic field 9 is applied to the combination unit 15.

Figure 30C:
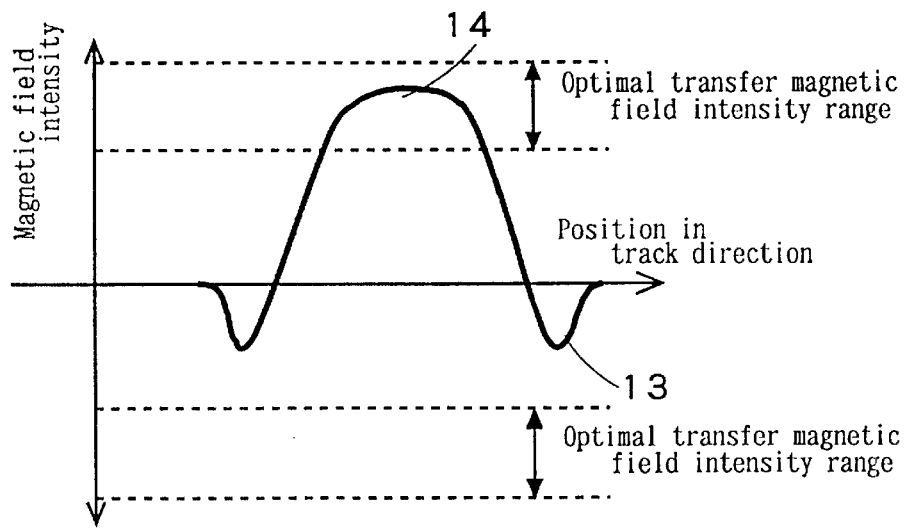

FIG. 30(C) is a diagram showing intensity of the magnetic field applied to the combination unit.

In the magnetic field applied to the slave medium, a peak 13 with lower intensity exerts no influence on transfer of a pattern from the master carrier for magnetic transfer to the slave medium because it is far lower compared with the optimal transfer magnetic field intensity range, and only a peak 14 with higher intensity contributes to the magnetic transfer. By applying a magnetic field within the optimal transfer magnetic field intensity range from the master carrier for magnetic transfer to the slave medium, the peak 14 with higher intensity can provide a satisfactory pattern regardless of the shape of the pattern.

FIG. 31 represents drawings to explain a method for transfer and an apparatus for transfer to apply magnetic field using a ring-type head electromagnet.

Figure 31A:
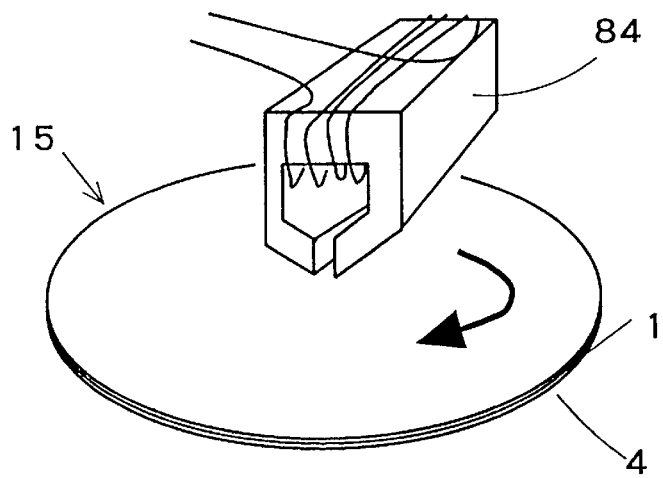
FIG. 31 represents drawings to explain a method for transfer and an apparatus for transfer for applying magnetic field using a ring-type head electromagnet.

FIG. 31(A) shows an example where a ring-type head electromagnet 84 is arranged on upper surface of a combination unit 15 comprising a slave medium 4 and a master carrier for magnetic transfer 1, and the combination unit 15 is rotated.

Figure 31B:
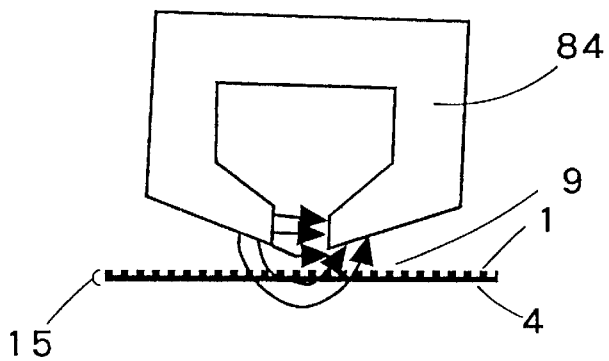

From the ring-type head electromagnet 84 arranged on upper surface of the combination unit 15, a magnetic field 9 is applied to the surface of the slave medium 4 as shown in FIG. 31(B).

Figure 31C:
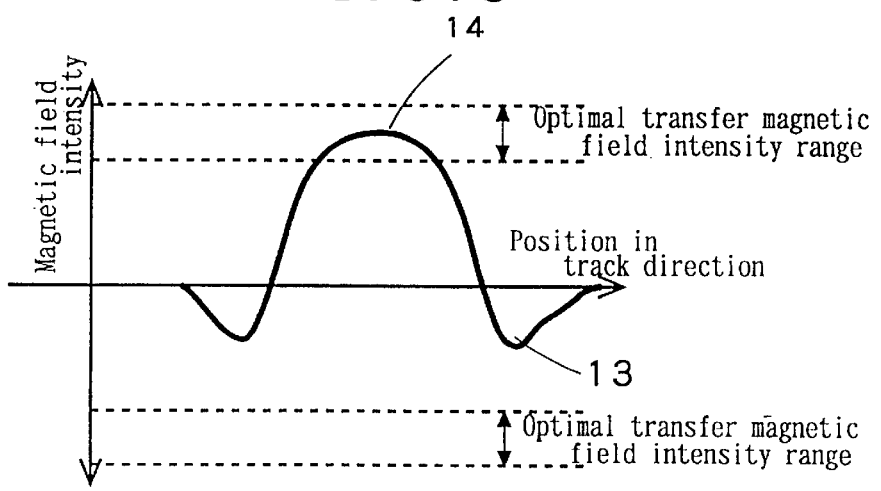

FIG. 31(C) is a diagram showing intensity of the magnetic field applied by application of the magnetic field of FIG. 31(B).

To the combination unit 15 comprising the slave medium 4 and the master carrier for magnetic transfer 1, the ring-type head electromagnet 84 is arranged, and at least one of the combination unit 15 or the ring-type head electromagnet 82 is rotated in track direction with respect to the central axis of the combination unit 15. Then, a magnetic field in opposite direction to the magnetizing direction of initial DC magnetization is applied to the entire surface of the combination unit 15.

In the magnetic field applied to the slave medium, a peak 13 with lower intensity exerts no influence on transfer of a pattern from the master carrier for magnetic transfer to the slave medium because it is far lower compared with the optimal transfer magnetic field intensity range, and only a peak 14 with higher intensity contributes to the magnetic transfer. By applying a magnetic field within the optimal transfer magnetic field intensity range from the master carrier for magnetic transfer to the slave medium, the peak 14 with higher intensity can provide a satisfactory pattern regardless of the shape of the pattern.

In FIG. 31, description has been given on an example where a ring-type head electromagnet is arranged on upper surface of the combination unit, while it may be arranged on any surface or on both surfaces of the combination unit.

FIG. 32 represents drawings to explain a method for transfer and an apparatus for transfer to apply magnetic field using an annular electromagnet.

Figure 32A:
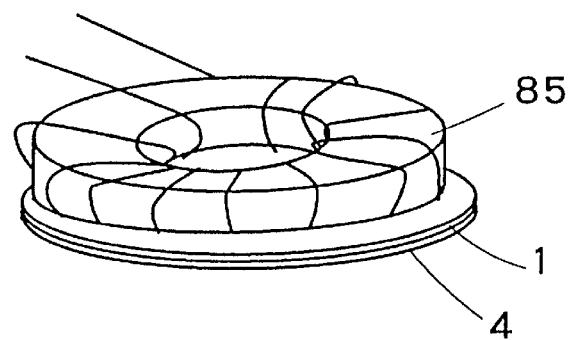
FIG. 32 represents drawings to explain a method for transfer and an apparatus for transfer for applying magnetic field using an annular electromagnet.

FIG. 32(A) shows an annular electromagnet 85 arranged on upper surface of a combination unit 15.

Figure 32B:
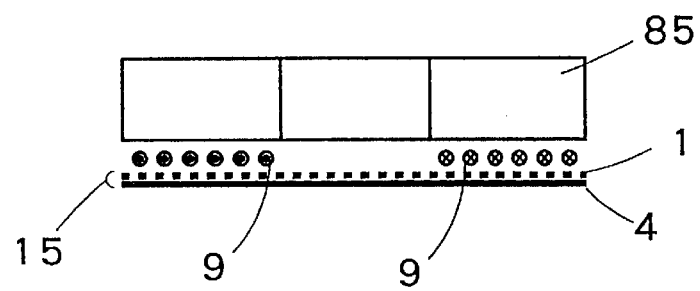

From the annular electromagnet 85 arranged on upper surface of the combination unit 15, as shown in FIG. 32(B), a magnetic field in opposite direction to the magnetizing direction of initial DC magnetization is applied to the entire surface of the combination unit 15 by a magnetic field from the annular electromagnet. As a result, a recording information is transferred from the master carrier 1 for magnetic transfer to the slave medium.

The intensity of the magnetic field applied to the combination unit from the annular electromagnet can be adjusted by changing intensity of electric current supplied to the annular electromagnet and by adjusting spacing between the annular electromagnet and the surface of the slave medium.

Figure 32C:
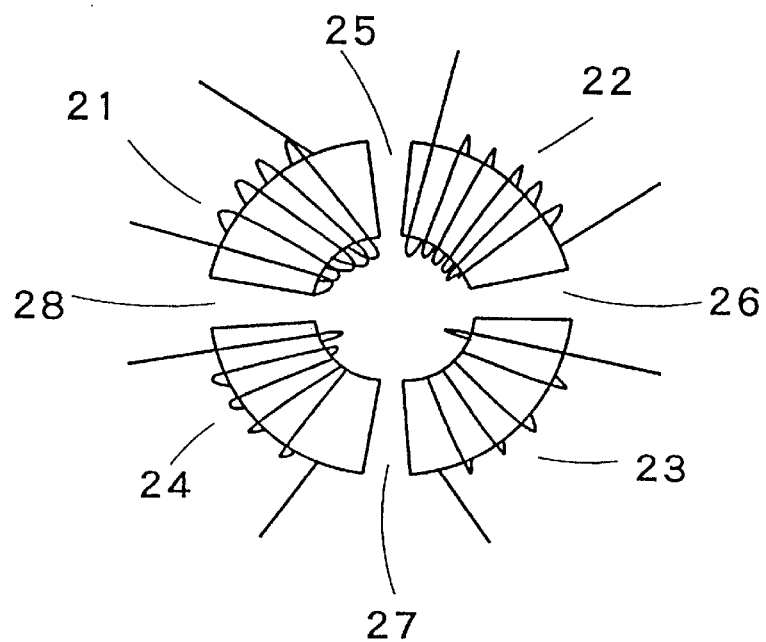

FIG. 32(C) is a drawing to explain another type of annular electromagnet.

In the annular electromagnet shown in FIG. 32(C), a coil wound on the annular electromagnet is divided to four pieces of 21 to 24. In addition to the means such as adjustment of electric current to the coils 21 to 24, it is possible to adjust intensity of the magnetic field applied to the surface of the slave medium by adjusting spacings 25 to 28 between coils.

In FIG. 32, description has been given on an example where the annular electromagnet is arranged on upper surface of the combination unit, while it may be arranged on any of the surface or on both surfaces of the combination unit.

In each of the apparatuses shown in FIGS. 2, 3, 6, 8, 9, 11, 12 and 16 as well as 20, 22, 24 to 26, and 29 to 32, there is provided a mechanism to arbitrarily adjust the distance between the surface of the slave medium and the magnet. In each of the apparatuses shown in FIGS. 4, 5, 7, 13 as well as 15, 21, 23, 27 and 28, there is provided a mechanism for arbitrarily adjusting the distance between the opposing magnets. Also, in each of the apparatuses shown in FIGS. 7, 8, 15, 17, 23, 24, 28 and 30, there is provided a mechanism for arbitrarily adjusting the distance between the magnets arranged in parallel. In each of the apparatuses shown in FIGS. 3, 5, 12, 14, 20, 21, 26 and 27, there is provided a mechanism for arbitrarily adjusting the angle of the magnet to the surface of the slave medium. Further, in each of the apparatuses shown in FIGS. 11 to 19 and 26 to 32, there is provided a mechanism for arbitrarily adjusting direction and value of electric current to excite the electromagnet.

By adjusting these parameters such as distance, angle, and direction and value of electric current, etc. to predetermined values, it is possible to have magnetic field intensity as desired on the surface of the slave medium.

In the apparatuses shown in FIGS. 3, 5, 12, 14, 21, 26 and 27, description has been given simply on a basic method to turn magnetic field intensity distribution at circumferential position to asymmetrical using a magnet. It is also possible to have similar asymmetrical magnetic field intensity distribution by changing the shape of the magnet on the surface of the slave medium, by combining a plurality of small magnets to have a single magnet, or by designing to have asymmetrical magnetic field intensity distribution by using non-homogeneous material in the magnet.

Next, description will be given on a method for magnetic transfer by applying a magnetic field for magnetic transfer immediately after the initial DC magnetization under the condition that a master carrier for magnetic transfer and a slave medium are closely combined together in the present invention.

FIG. 33 represents drawings to explain application of magnetic field to a combination unit comprising a disk-type slave medium and a master carrier for magnetic transfer.

Figure 33A:
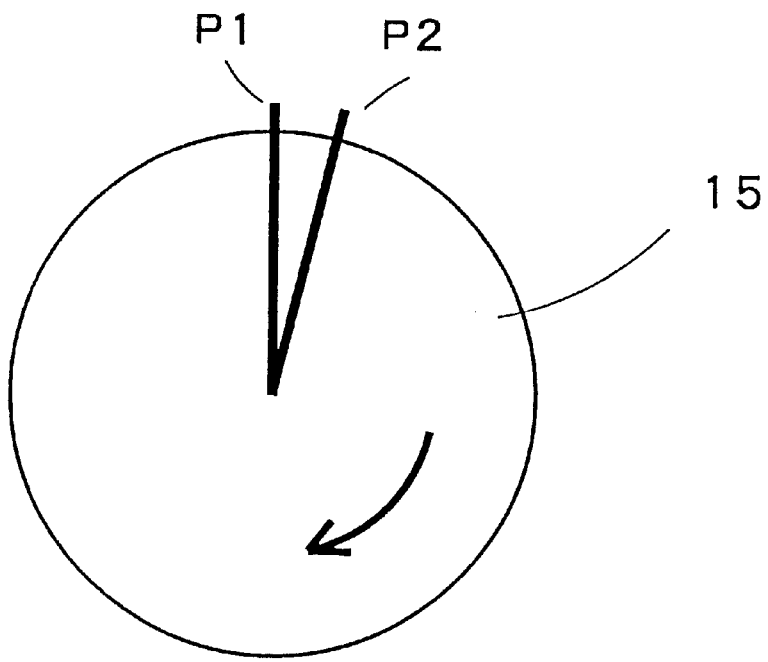
FIG. 33 represents drawings to explain application of magnetic field to a combination unit comprising a disk-type slave medium and a master carrier for magnetic transfer closely combined together.

FIG. 33(A) shows a condition where, while a combination unit comprising a slave medium and a master carrier for magnetic transfer is being rotated, a magnetic field with higher intensity for initial DC magnetization: and a magnetic field for transfer are applied from fixed magnetic field generating means.

To a combination unit 15 comprising a slave medium and a master carrier for magnetic transfer, a magnetic field for initial DC magnetization is applied at a magnetic field position P1. Immediately thereafter, a magnetic field for magnetic transfer is applied at a magnetic field position P2 for magnetic transfer in the region, which has been processed by initial DC magnetization.

Figure 33B:
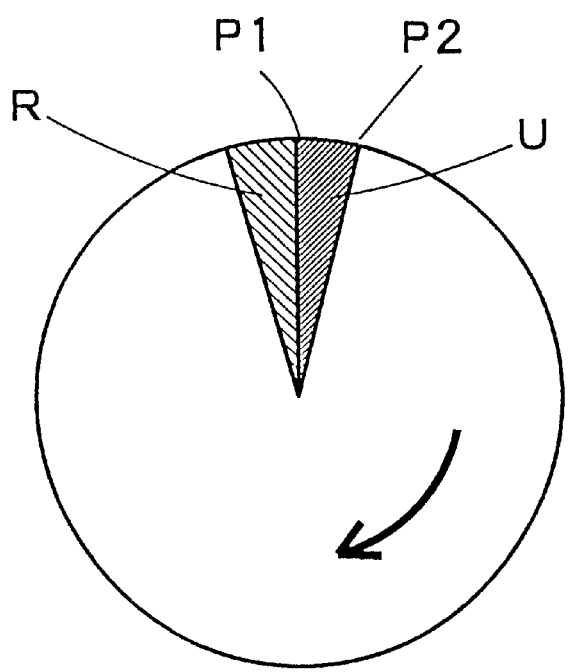

FIG. 33(B) shows a condition, where the combination unit has been rotated by one turn. However, even when it has been rotated by one turn, magnetic transfer is not performed on an initial DC magnetization region U, which was present between the magnetic field position P1 for initial DC magnetization and the magnetic field position P2 for magnetic transfer at the initiation of the initial DC magnetization. On the other hand, when the combination unit is rotated further to apply the magnetic field for transfer to the initial DC magnetization region U, the region where the magnetic field for transfer was applied is processed by initial DC magnetization, and this is turned to an initial DC magnetization region R.

In case transfer pattern of a recording information is not present in the region where the initial DC magnetization is performed again, there is no problem even when initial DC magnetization is repeated. However, when transfer pattern of the recording information is present in the region which was processed by initial DC magnetization again, the magnetic transfer pattern of the recording information may not be formed correctly.

In such case, the magnetic field for initial DC magnetization and the magnetic field for transfer are applied by more than one turn. After the rotation has been stopped, the distance between the magnetic field generating means and the combination unit is widened to such extent that the magnetic field intensity on the surface of the combination unit is turned to less than ½ of the coercive force Hcm of the slave medium and the magnetic field gives no influence any more to the slave medium. Then, by means for generating magnetic field with opposite polarity to the magnetic field, which gave the initial DC magnetization, a magnetic field is applied in track direction of the combination unit under the condition that the magnetic field on the surface of the combination unit is turned to the optimal transfer intensity. The magnetic field for transfer is applied to the entire surface and magnetic transfer is performed completely. Then, the distance between the combination unit and the magnetic field generating means is increased so that the magnetic field intensity on the surface of the combination unit is turned to less than ½ of the coercive force Hcm of the slave medium, and magnetic transfer can be completed by removing the slave medium from the combination unit.

In the following, description will be given on a method for applying magnetic field for initial DC magnetization and magnetic field for transfer to the slave medium using a permanent magnet.

FIG. 34 represents drawings to explain a method for applying magnetic field using a single tilted permanent magnet.

Figure 34A:
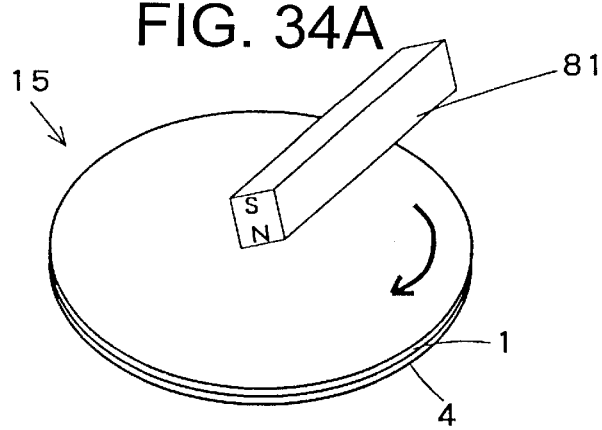
FIG. 34 represents drawings to explain a method for applying magnetic field using a single tilted permanent magnet.
Figure 34B:
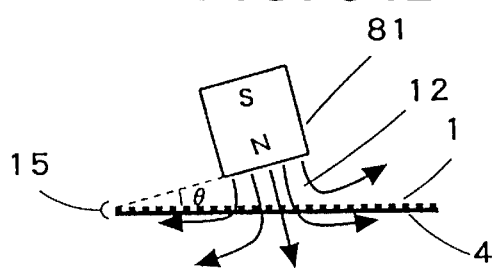

FIG. 34(A) is a perspective view to explain application of an asymmetrical magnetic field. FIG. 34 (B) is a cross-sectional view to explain a magnetic field given by application of the magnetic field of FIG. 34(A).

The magnetic field generating means comprises a tilted permanent magnet 81. An asymmetrical magnetic field 12 is applied to a combination unit 15 comprising a slave medium 4 and a master carrier for magnetic transfer 1 closely combined together, and the combination unit 15 or the tilted permanent magnet 81 is rotated in track direction with respect to the central axis of the combination unit. Thus, a peak 10 with higher intensity which is by more than 1.5 times higher than the coercive force Hcm of the slave medium applied on the combination unit 15 exerts action of initial DC magnetization. Immediately thereafter, an optimal transfer intensity peak 11a within the optimal transfer magnetic field intensity range is applied. It is rotated by more than one turn, and initial DC magnetization is completed. At the same time, a magnetic field of the optimal transfer intensity peak 11a, i.e. a magnetic field in opposite direction, is applied, and complete magnetic transfer of the recording information is performed.

Figure 34C:
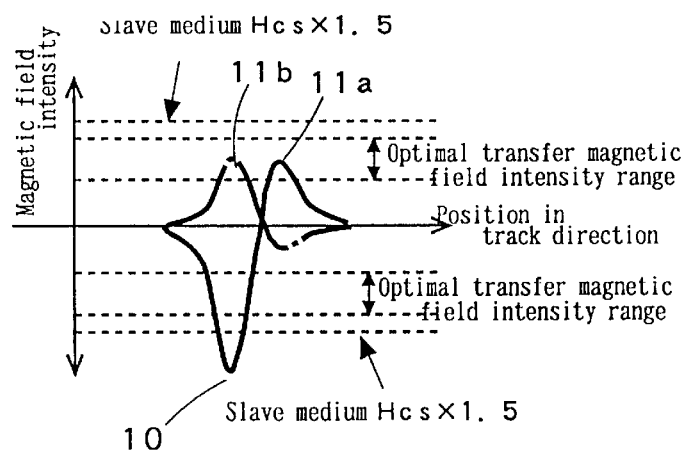
Figure 34D:
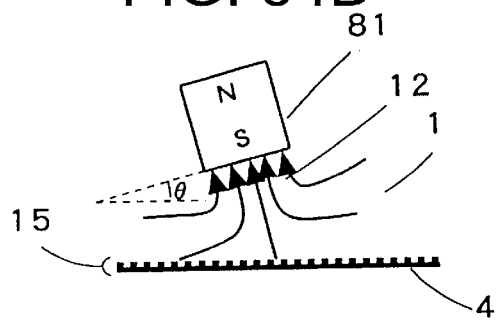

Depending on the pattern of the recording information for transfer, initial DC magnetization is performed completely, and if magnetic transfer pattern may be lost in case the magnetic field for transfer is applied to the entire surface, initial DC magnetization is performed again. The magnetic field is applied for more than one turn and: initial DC magnetization is performed. At the same time!, a magnetic field of the optimal transfer intensity peak 11a, i.e. a magnetic field of opposite direction from the same magnet, is applied, and magnetic transfer is performed. Then, the rotation is stopped, and the distance between the magnet and the combination unit is increased to such extent that the magnetic field intensity on the surface of the slave medium is turned to less than ½ of the coercive force Hcm of the slave medium and the magnetic field exerts no influence to the slave medium any more. Then, as shown in FIG. 34(D), a magnet with opposite polarity reverse to the magnetic field, which gave initial DC magnetization, is arranged, and the distance from the combination unit is, increased more than the case of the initial DC magnetization. Under the condition that the magnetic field on the surface of the slave medium is turned to an intensity given by the optimal transfer intensity peak 11b as shown in FIG. 34(C), the magnetic field is applied in track direction of the combination unit and complete magnetic transfer is performed to the entire surface. Then, the distance between the combination unit and the magnet is increased to such extent that magnetic field intensity on the surface of the slave medium is again turned to less than ½ of the coercive force Hcm of the slave medium. Under this condition, by removing the slave medium from the combination unit, magnetic transfer can be completed.

FIG. 35 represents drawings to explain a method for applying magnetic field using two tilted permanent magnet.

Figure 35A:
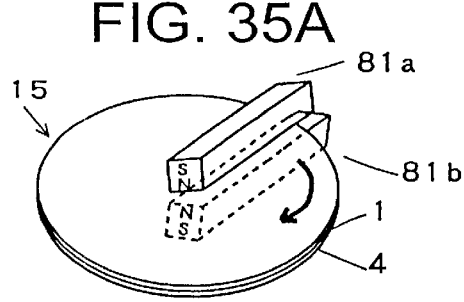
FIG. 35 represents drawings to explain a method for applying magnetic field using two tilted permanent magnets.
Figure 35B:
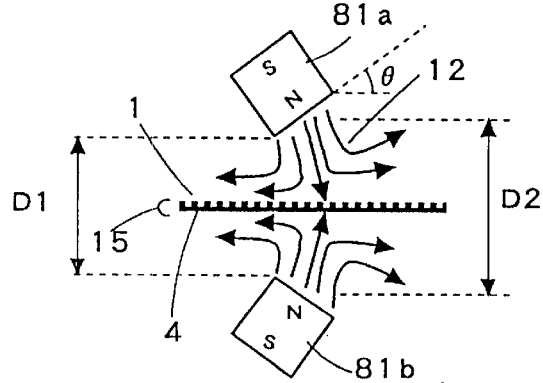

FIG. 35(A) is a drawing to explain a method for applying an asymmetrical magnetic field using two tilted permanent magnets arranged on the surface of a slave medium. FIG. 35(B) is a drawing to explain a magnetic field applied to the surface of the slave medium.

Figure 35C:
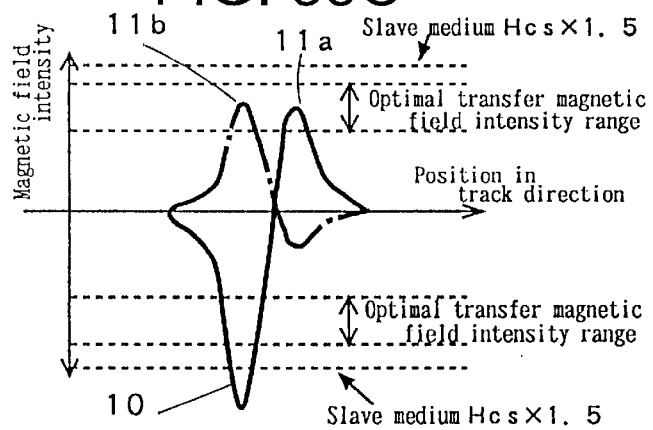

On upper surface and lower surface of a combination unit 15 comprising a slave medium 4 and a master carrier for magnetic transfer 1 closely combined together, tilted permanent magnets 81a and 81b each magnetized symmetrically to axis of magnetic poles are arranged with the magnetic poles with the same polarity facing to each other and with the combination unit 15 interposed between. Magnetic field intensity distribution in track direction is turned to asymmetrical by arranging the magnets obliquely so that a distance D1 between ends of the permanent magnets at one end of track direction is different from a distance D2 between ends of the permanent magnets at the other end. An asymmetrical field 12 is applied to the surface of the slave medium 4, and the combination unit 15 or the tilted permanent magnets 81a and 81b are rotated in track direction with respect to the central axis of the combination unit 15. The asymmetrical magnetic field is applied to the entire surface of the slave medium, and it is rotated by one turn to perform initial DC magnetization. At the same time, an optimal transfer intensity peak 11a as shown in FIG. 35(C), i.e. a magnetic field in opposite direction from the same magnet, is applied. It is rotated by one turn to perform initial DC magnetization completely. At the same time, a magnetic field of the optimal transfer intensity peak 11a, i.e. a magnetic field in opposite direction, is applied and complete magnetic transfer of the recording information is carried out.

Figure 35D:
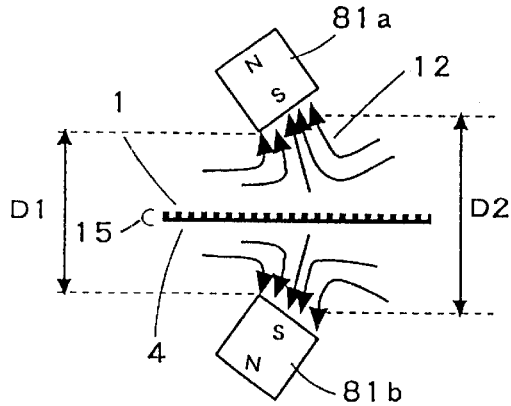

Depending on the pattern of the recording information for transfer, initial DC magnetization is completely performed, and if the magnetic field for transfer is subsequently applied to the entire surface, the initial DC magnetization may be performed again and the magnetic transfer pattern may be lost. In such case, the magnetic field is applied by more than one turn and initial DC magnetization is performed. At the same time, a magnetic field of the optimal transfer intensity peak 11a, i.e. a magnetic field in opposite direction from the same magnet, is applied, and magnetic transfer is performed. Then, the rotation is stopped, and the distance between the magnet and the combination unit is increased to such extent that the magnetic intensity on the surface of the slave medium is turned to less than ½ of the coercive force Hcm of the slave medium and the magnetic field exerts no influence on the slave medium any more. Then, as shown in FIG. 35(D), a magnet with polarity opposite to the magnetic field, which gave initial DC magnetization, is arranged as shown in FIG. 35(C), and the distance from the combination unit is increased more than the distance in case of initial DC magnetization. Under the condition that the magnetic field on the surface of the slave medium is turned to the intensity as given by the optimal transfer intensity peak 11b in FIG. 35(C), magnetic field is applied in track direction of the combination unit, and complete magnetic transfer is performed to the entire surface. Again, the distance between the combination unit and the magnet is increased to such extent that the magnetic field intensity on the surface of the slave medium is turned to less than ½ of the coercive force Hcm of the slave medium. By removing the slave medium from the combination unit, magnetic transfer can be completed.

The optimal value of tilting of the axis of magnetic poles varies according to the shape of magnet. In case of a permanent magnet of rectangular parallelepiped, it is preferable that an angle θ between a surface perpendicular to the axis of magnetic pole and the surface of the slave medium is 5° to 70, or more preferably, 20° to 55°.

FIG. 36 represents drawings to explain a method for applying magnetic field using a permanent magnet with axis of magnetic poles in lateral direction.

Figure 36A:
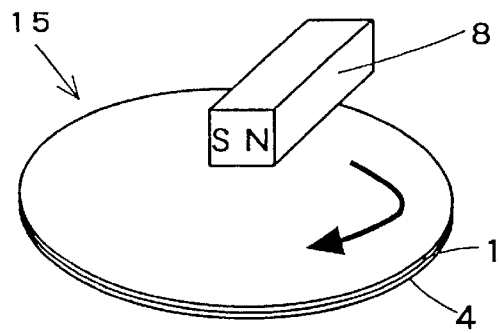
FIG. 36 represents drawings to explain a method for applying magnetic field using a permanent magnet with axis of magnetic poles in lateral direction.

FIG. 36(A) shows an example where, on upper surface of a combination unit 15 comprising a slave medium 4 and a master carrier for magnetic transfer 1, a permanent magnet 8 having magnetic field symmetrical to axis of magnetic poles is arranged with axis of magnetic poles in parallel to the surface of the slave medium 4, and the combination unit 15 is rotated.

Figure 36B:
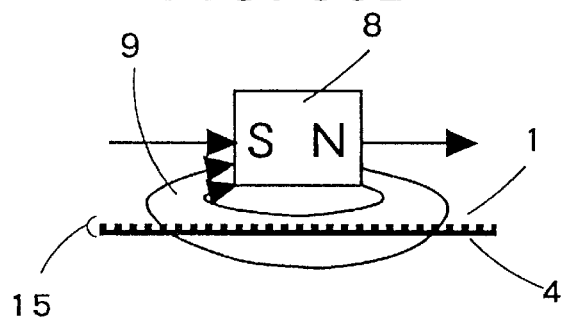

From a single permanent magnet 8 arranged on upper surface of the combination unit 15, a magnetic field 9 is applied to the surface of the slave medium 4 as shown in FIG. 36(B).

Figure 36C:
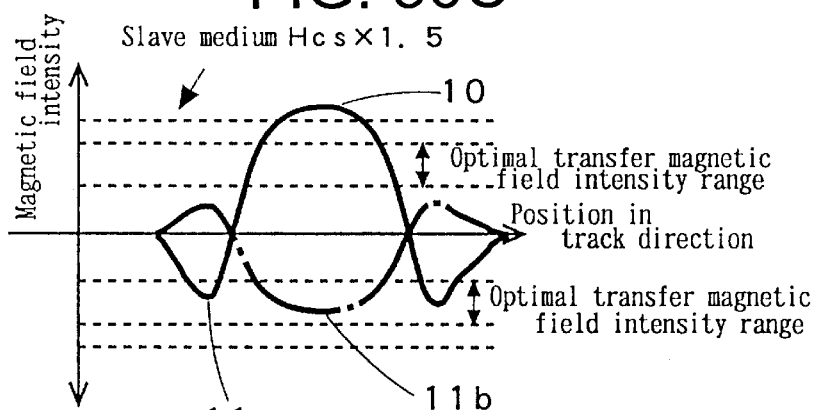

FIG. 36(C) is a diagram showing intensity of the magnetic field applied to the slave medium. In the magnetic field applied to the slave medium, a peak 10 with higher intensity which is by more than 1.5 times higher than the coercive force Hcm of the slave medium is applied to perform initial DC magnetization. Immediately thereafter, an optimal transfer intensity peak 11a within the optimal transfer magnetic field intensity range is applied from a magnet, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is carried out.

Figure 36D:
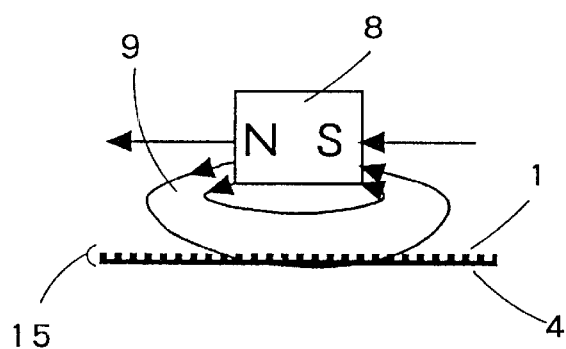

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 36(D), and the distance from the combination unit is increased more than the case of the initial DC magnetization. Under the condition that the magnetic field on the surface of the slave medium is turned to the intensity given by the optimal transfer intensity peak 11b in FIG. 36(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 37 represents drawings to explain a method for applying magnetic field using two pairs of permanent magnets at adjacent positions and arranged perpendicularly to the surface of a slave medium of a combination unit which comprises a slave medium and a master carrier for magnetic transfer and with the combination unit interposed between.

Figure 37A:
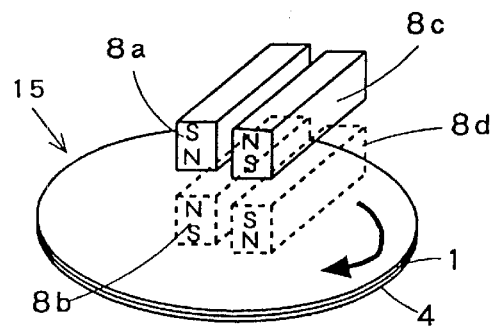

As shown in FIG. 37(A), on upper surface and lower surface of a combination unit 15 comprising a slave medium 4 and a master carrier for magnetic transfer 1, a pair of permanent magnets 8a and 8b each having magnetic field symmetrical to axis of magnetic poles are arranged with magnetic poles of the same polarity facing to each other. Another pair of permanent magnets 8c and 8d are arranged so that the magnetic poles at adjacent positions have polarities opposite to each other. Under this condition, the combination unit 15 is rotated.

Figure 37B:
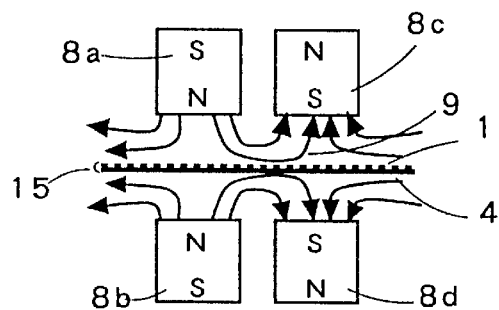

The permanent magnets 8a and 8b with the magnetic poles of the same polarity facing to each other are arranged on upper surface and lower surface of the combination unit 15 respectively. As a result, as shown in FIG. 37(B), magnetic fields of the magnets 8a and 8b repel each other. Magnetic field of the permanent magnet 8a is directed to the permanent magnet 8c of the adjacent pair of permanent magnets. Magnetic field of the permanent magnet 8b is directed to the permanent magnet 8d of the adjacent pair of permanent magnets, and a magnetic field 9 is applied to the surface of the slave medium 4.

Figure 37C:
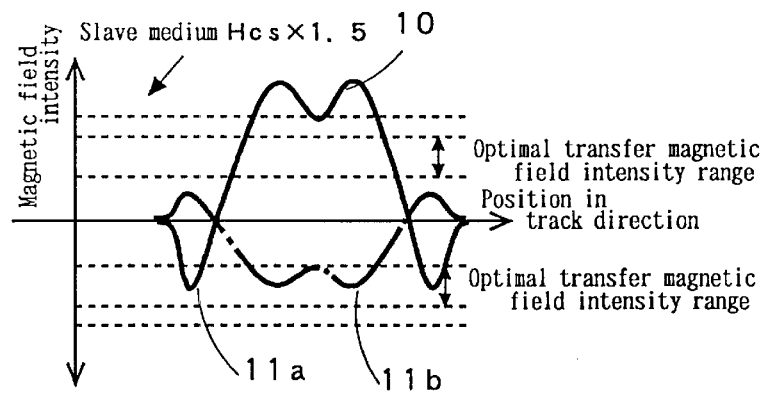

FIG. 37(C) is a diagram showing intensity of the magnetic field applied to the slave medium. In the magnetic field applied to the slave medium, a peak 10 with higher intensity by more than 1.5 times higher than the coercive force Hcm of the slave medium is applied to perform initial DC magnetization. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 37D:
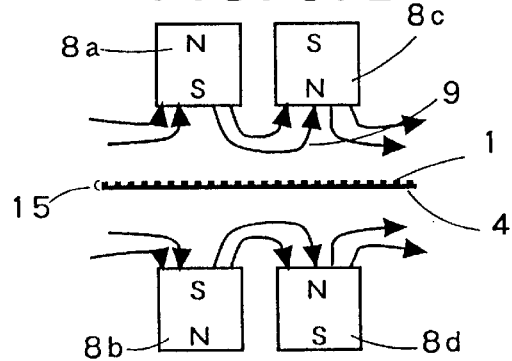

Depending on the pattern of the recording information for transfer, if initial DC magnetization is completely performed and magnetic field for transfer is subsequently applied to the entire surface, the initial DC magnetization may be performed again, and the magnetic transfer pattern may be lost. In such case, magnetic field is applied by more than one turn to perform initial DC magnetization At the same time, a magnetic field of the optimal transfer intensity peak 11a, i.e. a magnetic field in opposite direction from the same magnet, is applied to perform magnetic transfer. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnet with polarity opposite to the magnetic field, which gave initial DC magnetization, is arranged as shown in FIG. 37(D). The distance from the combination unit is increased more than the case of initial DC magnetization. Under the condition that the magnetic field on the surface of the slave medium is turned to an intensity given by the optimal transfer intensity peak 11b in FIG. 37(C). Thus, initial Dc magnetization of the slave medium and transfer of the recording information can be carried out.

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 37(D), and the distance from the combination unit is increased more than the case of the initial DC magnetization. Under the condition that the magnetic field on the surface of the slave medium is turned to the intensity given by the optimal transfer intensity peak 11b in FIG. 37(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 38 represents drawings to explain a method for applying magnetic field using two permanent magnets arranged at adjacent positions on one surface of a combination unit which comprises a slave medium and a master carrier for magnetic transfer.

Figure 38A:
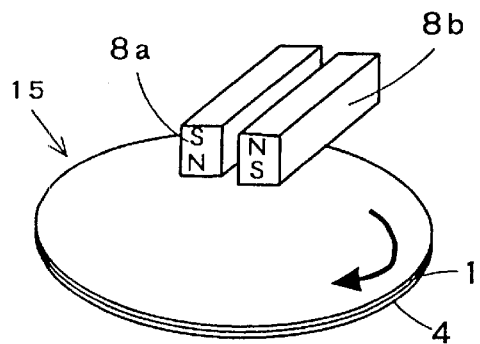
FIG. 38 represents drawings to explain a method for applying magnetic field using two permanent magnets placed at adjacent positions and arranged on one surface of a combination unit comprising a slave medium and a master carrier for magnetic transfer closely combined together.

As shown in FIG. 38(A), on one surface of a combination unit 15, two permanent magnets 8a and 8b are arranged with magnetic poles to have opposite directions, i.e. the adjacent magnetic poles to have opposite polarities, and with axis of magnetic poles perpendicularly to the combination unit 15. Under this condition, the combination unit 15 is rotated.

Figure 38B:
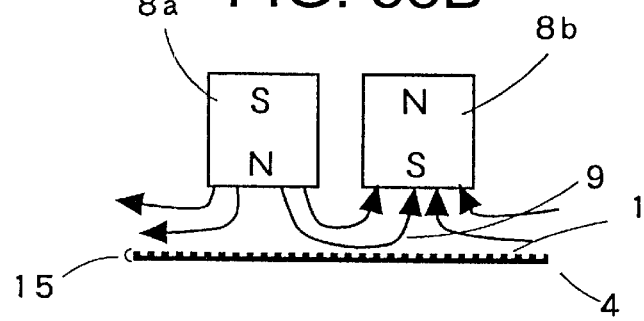

On one surface of the combination unit 15, two permanent magnets 8a and 8b are arranged with the magnetic poles to have opposite direction, i.e. adjacent magnetic poles to have opposite polarities, and with axis of each of magnetic poles arranged perpendicularly to the slave medium. As shown in FIG. 38(B), magnetic field of the permanent magnet 8a is directed to the adjacent permanent magnet 8b, and a magnetic field 9 is applied to the surface of the slave medium 4.

Figure 38C:
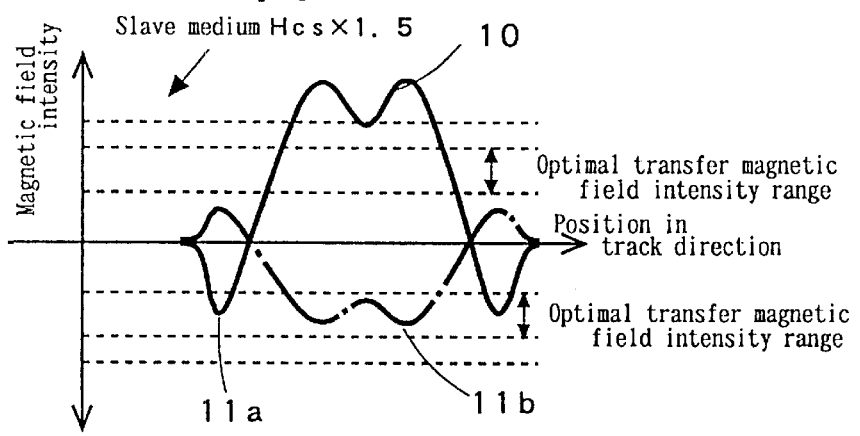

FIG. 38(C) is a diagram showing intensity of the magnetic field applied to the slave medium. In the magnetic field applied to the slave medium, a peak 10 with higher intensity by more than 1.5 times higher than the coercive force Hcm of the slave medium is applied to perform initial DC magnetization. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information.is performed.

Figure 38D:
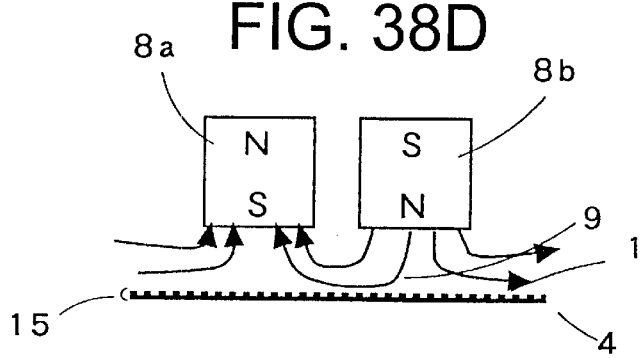

Depending on the pattern of the recording information for transfer, if initial DC magnetization is completely: performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 38(D), and the distance from the combination unit is increased more than the case of the initial DC magnetization. Under the condition that the magnetic field on the surface of the slave medium is turned to the intensity given by the optimal transfer intensity peak 11b in FIG. 38(C), the: magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 39 represents drawings to explain a method for applying magnetic field using a permanent magnet with end surfaces of both magnetic poles facing to the surface of a combination unit an arranged on the surface a combination unit.

Figure 39A:
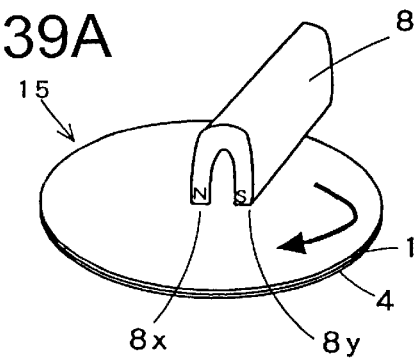
FIG. 39 represents drawings to explain a method for applying magnetic field using a permanent magnet placed on the surface of a combination unit with end surfaces of both magnetic poles of the permanent magnet being faced to the surface of the combination unit.

FIG. 39(A) shows an example where, on upper surface of a combination unit 15 comprising a slave medium 4 and a master carrier for magnetic transfer 1, end surfaces 8x and 8y or both magnetic poles of a permanent magnet 8 are faced to the combination unit 15 and magnetic field is applied. Then, the combination unit is rotated.

Figure 39B:
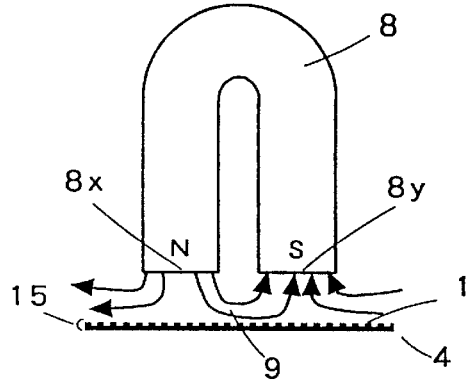

From the end surfaces 8x and 8y of the magnetic poles of a single permanent magnet 8 arranged on upper surface of the combination unit 15, a magnetic field 9 in track direction in parallel to the surface of the slave medium is applied as shown in FIG. 39(B), and the combination unit 15 or the permanent magnet is rotated in track direction with respect to the central axis of the combination unit. In the example shown in FIG. 39, a permanent magnet is arranged on upper surface of the slave medium, while it may be arranged on lower surface or both surfaces.

Figure 39C:
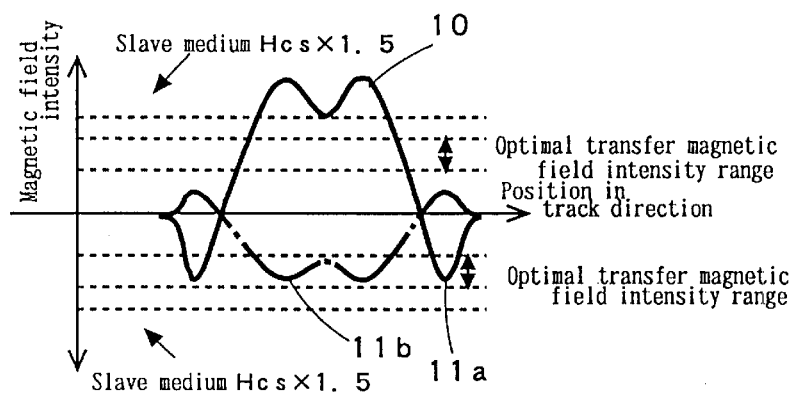

FIG. 39(C) is a diagram showing intensity of the magnetic field applied to the slave medium. In the magnetic field applied to the slave medium, a peak 10 with higher intensity by more than 1.5 times higher than the coercive force Hcm of the slave medium is applied to perform initial DC magnetization. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 39D:
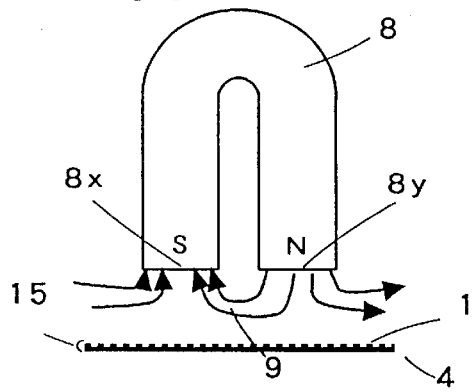

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 39(D), and the distance from the combination unit is increased more than the case of the initial DC magnetization. Under the condition that the magnetic field on the surface of the slave medium is turned to the intensity given by the optimal transfer intensity peak 11b in FIG. 39(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

Because the end surfaces of both magnetic poles are positioned to face the surface of the combination unit and magnetic field is applied, a magnet in form of U-shape, horseshoe-shape, circular shape, or elliptical shape may be used. Also, a permanent magnet of such type may be used that the central axes of the magnetic poles are not in parallel to but cross each other. The end surface of the magnetic poles is not limited to the surface in parallel to the surface of the slave medium but may be tilted with respect to the surface of the slave medium.

These are also shown in FIG. 10.

Also, in case the permanent magnet is replaced by an electromagnet and magnetic field is applied to the surface of the slave medium, the magnetic field for initial DC magnetization and magnetic field for transfer are generated at the same time. By the rotation of one turn, initial D C magnetization is carried out and magnetic transfer can be performed immediately thereafter.

In case complete magnetic transfer cannot be performed by the procedure to rotate by one turn or in case the region received the magnetic transfer is again processed by initial DC magnetization, it should be performed as follows:

(1) It is rotated by more than one turn to apply initial DC magnetic field. Immediately thereafter, magnetic field for transfer is applied, and rotation is then stopped.

(2) Electric current to the electromagnet is stopped to eliminate the magnetic field in the electromagnet. Then, electric current is supplied in reverse direction to have the maximum magnetic field equal to the optimal transfer magnetic field intensity. The magnetic field for transfer is applied, and it is rotated. Then, electric current to the electromagnet is stopped, and the combination unit is removed.

By the above processes, initial DC magnetization and the magnetic transfer thereafter can be completed in any type of transfer pattern.

In the following, description will be given on a method for applying magnetic field using electromagnet.

FIG. 40 represents drawings to explain a method for applying magnetic field using a tilted electromagnet on one surface of a combination unit.

Figure 40A:
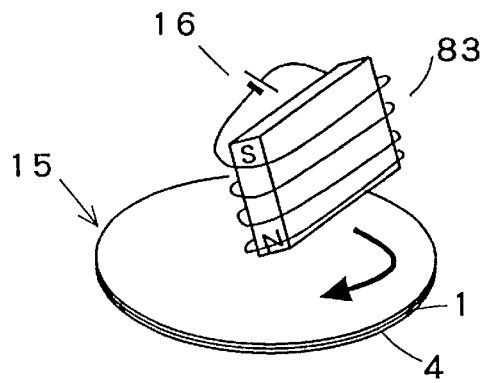
FIG. 40 represents drawings to explain a method for applying magnetic field using a tilted electromagnet arranged on one surface of a combination unit.
Figure 40B:
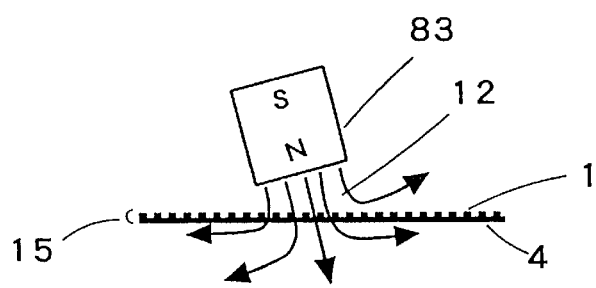
Figure 40C:
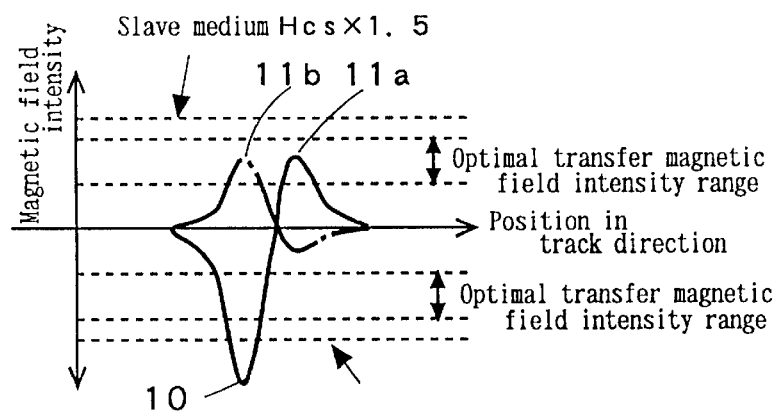

FIG. 40(A) shows an example where a tilted electromagnet 83 is arranged on a combination unit 15 which comprises a slave medium 4 and a master carrier for magnetic transfer 1, and the combination unit 15 is rotated under application of magnetic field. FIG. 40(B) is a drawing to explain magnetic field applied to the combination unit.

As shown in FIG. 40(A), a single tilted electromagnet 83 arranged on upper surface of the combination unit 15 is under DC excitation as DC current is supplied from a DC power source 16. Axis of magnetic poles of the tilted electromagnet 83 is arranged obliquely to the combination unit 15.

As shown in FIG. 40(B), an asymmetrical magnetic field 12 is applied to the combination unit 15. As a result, a magnetic field having a peak 10 with intensity which is by more than 1.5 times higher than the coercive force Hcm of the slave medium is applied to the slave medium, and initial DC magnetization is performed. Immediately thereafter, an optimal transfer intensity peak 11a within the optimal transfer magnetic field intensity range is applied from the same electromagnet. It is rotated by one turn to perform initial DC magnetization. At the same time, magnetic field of the optimal transfer intensity peak 11a, i.e. a magnetic field in opposite direction, is applied, and complete magnetic transfer of the recording information is performed.

Figure 40D:
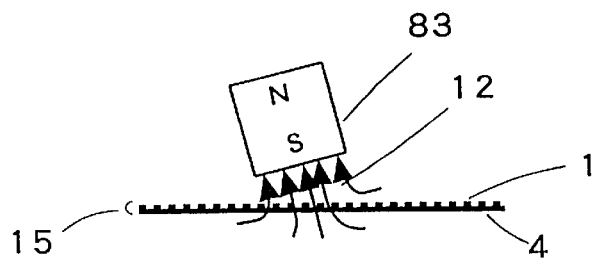

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 40(D), and the distance from the combination unit is increased more than the case of the initial DC magnetization. Under the condition that the magnetic field on the surface of the slave medium is turned to the intensity given by the optimal transfer intensity peak 11b in FIG. 40(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 41 represents drawings to explain a method for applying magnetic field using a pair of tilted electromagnet.

Figure 41A:
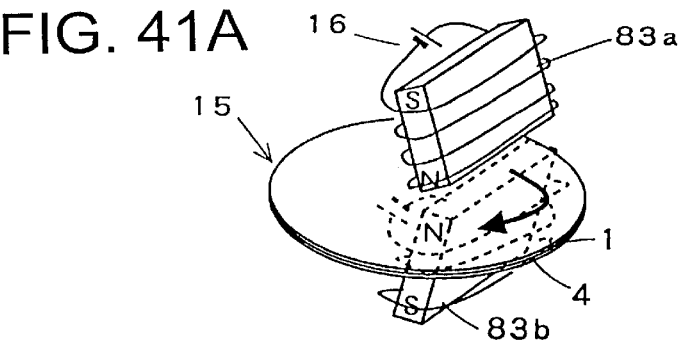
FIG. 41 represents drawings to explain a method for applying magnetic field using a pair of tilted electromagnets each magnet placed on each of the surfaces of the combination unit.
Figure 41B:
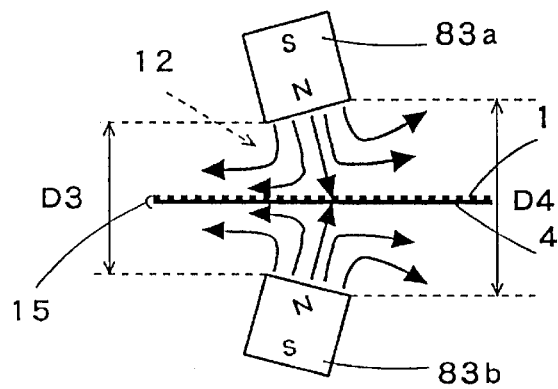

FIG. 41(A) shows an example where two tilted electromagnets 83a and 83b are arranged on two surfaces of a combination unit which comprises a slave medium 4 and a master carrier for magnetic transfer 1, and the combination unit 15 is rotated under application of magnetic field. FIG. 41(B) is a drawing to explain magnetic field applied to the slave medium. The two electromagnets are arranged obliquely by varying a distance D3 between ends of the electromagnets from a distance D4, and an asymmetrical magnetic field 12 is applied to the combination unit 15.

Figure 41C:
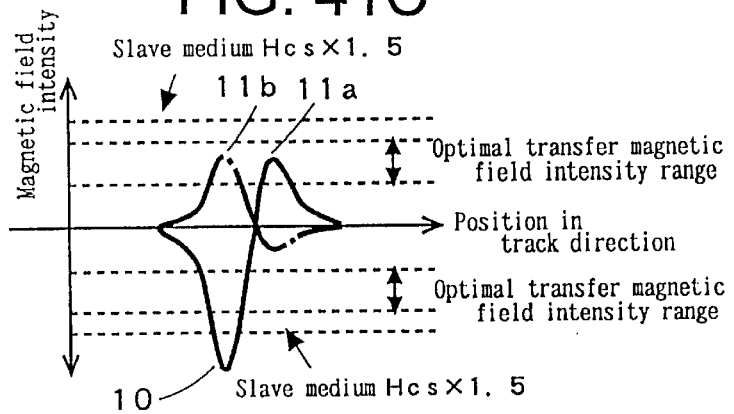

As the magnetic field intensity distribution shown in FIG. 41(C), a magnetic field having a peak 10 which is by more than 1.5 times higher than the coercive force Hcm of the slave medium is applied to the slave medium and initial DC magnetization is performed. Immediately thereafter, the optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 41D:
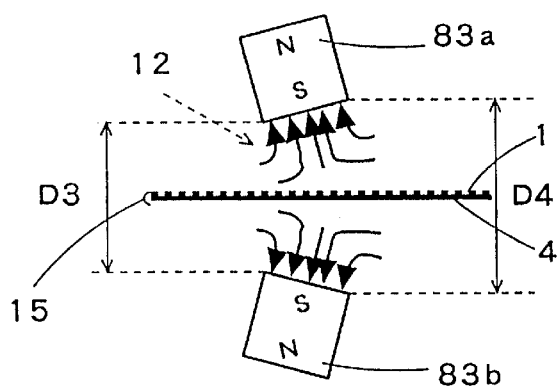

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 41(D), and the distance from the combination unit is increased more than the case of the initial DC magnetization. Under the condition that the magnetic field on the surface of the slave medium is turned to the intensity given by the optimal transfer intensity peak 11b in FIG. 41(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 42 represents drawings to explain a method for applying magnetic field using two pairs of electromagnets at adjacent positions and arranged perpendicularly to the surface of the slave medium with a combination unit interposed between.

Figure 42A:
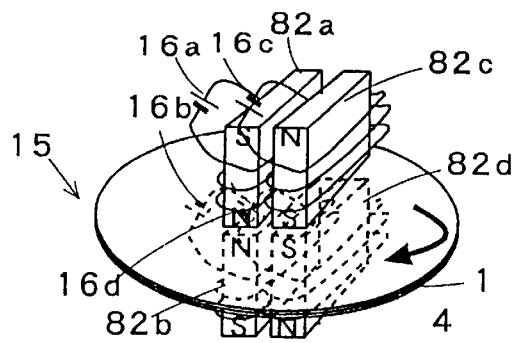

As shown in FIG. 42(A), on upper surface and lower surface of a combination unit 15 which comprises a slave medium and a master carrier for magnetic transfer, a pair of electromagnets 82a and 82b each having magnetic field symmetrical to axis of magnetic poles are arranged with magnetic poles of the same polarity facing to each other. Further, another pair of electromagnets 82c and 82d are arranged at adjacent positions so that each magnetic pole faces to a magnetic pole of opposite polarity in the adjacent pair of electromagnets. Under this condition, the combination unit 15 is rotated. DC excitation current is supplied to each of the electromagnets 82a, 82b, 82c and 82d from DC power sources 16a, 16b, 16c and 16d respectively.

Figure 42B:
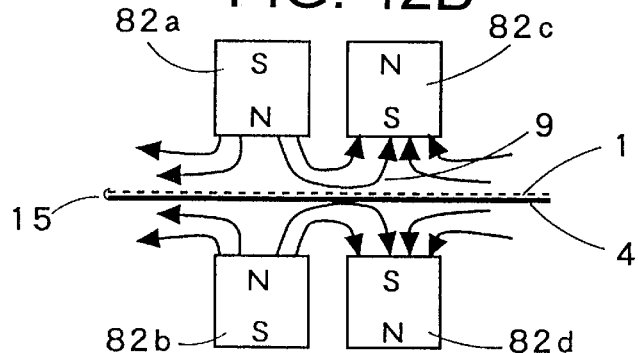
Figure 42C:
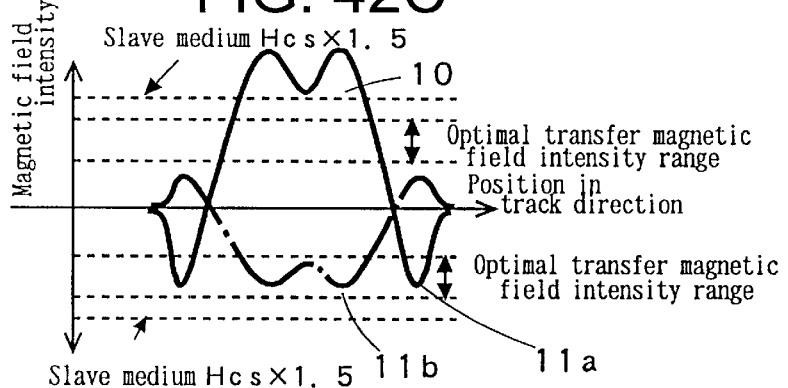

The electromagnets 82a and 82b are arranged on upper surface and lower surface of the combination unit 15 respectively with magnetic poles of the same polarity facing to each other. As shown in FIG. 42(B), the electromagnets 82a and 82b repel each other. Magnetic field of the electromagnet 82a is directed to the electromagnet 82c of the adjacent pair of 82c and 82d. Magnetic field of the electromagnet 82b is directed to the electromagnet 82d of the adjacent pair of electromagnets, and a magnetic field 9 is applied to the surface of the slave medium 4. FIG. 42(C) is a diagram to explain magnetic field intensity distribution in this case.

To the combination unit 15 comprising the slave medium and the master carrier for magnetic transfer, the magnetic field 9 is applied. A magnetic field having a peak 10 which is by more than 1.5 times higher than the coercive force Hcm of the slave medium is applied to the slave medium, and initial DC magnetization is performed. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 42D:
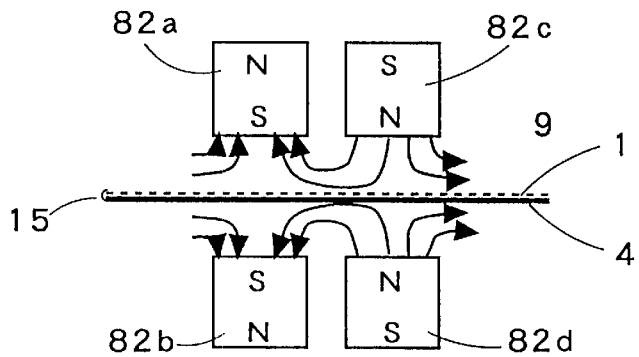

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 42(D), and the distance from the combination unit is increased more than the case of the initial DC magnetization. Under the condition that the magnetic field on the surface of the slave medium is turned to the intensity given by the optimal transfer intensity peak 11b in FIG. 42(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

The distance between the electromagnets arranged at opposed and adjacent positions should be set to such a distance that the magnetic field provided by the adjacent electromagnets can apply a magnetic field with intensity for initial DC magnetization to the slave medium or a magnetic field with intensity within the optimal transfer intensity range.

FIG. 43 represents drawings to explain a method for applying magnetic field using a single electromagnet with axis of magnetic poles in lateral direction. FIG. 43(A) shows an example where, on upper surface of a combination unit 15 which comprises a slave medium 4 and a master carrier 1 for magnetic transfer, an electromagnet 82 having magnetic field symmetrical to axis of magnetic poles is arranged with axis of magnetic poles in parallel to the surface of the slave medium 4, and the combination unit 15 is rotated.

Figure 43A:
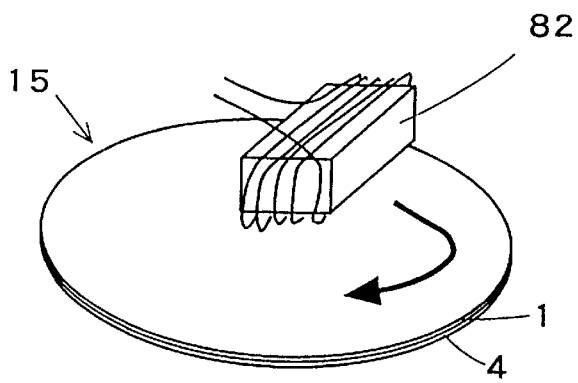
FIG. 43 represents drawings to explain a method for applying magnetic field using a single electromagnet with axis of magnetic poles in lateral direction.
Figure 43B:
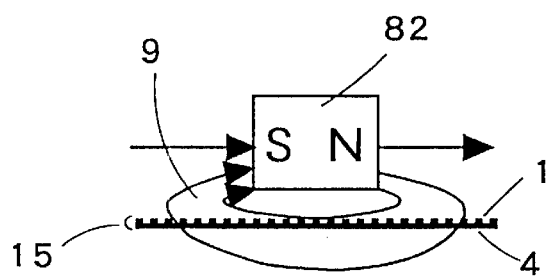
Figure 43C:
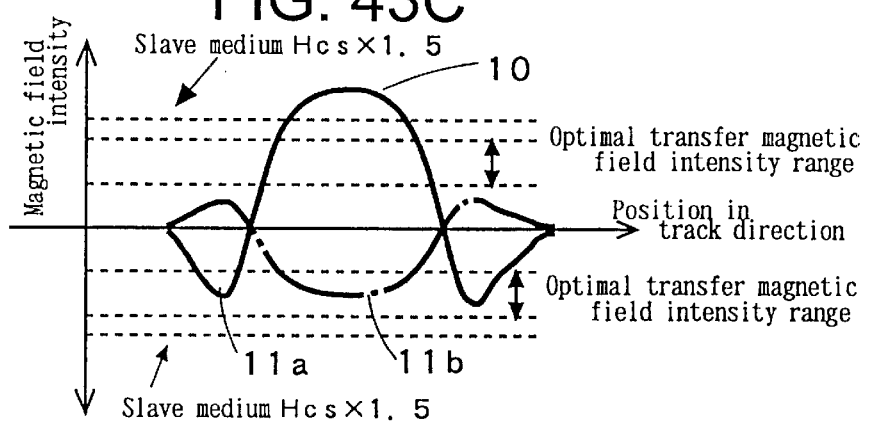

From the single electromagnet 82 arranged on upper surface of the combination unit 15, a magnetic field 9 is applied to the surface of the slave medium 4 as shown in FIG. 43(B). FIG. 43(C) is a diagram showing magnetic field intensity distribution in this case.

To the combination unit 15 comprising the slave medium and the master carrier for magnetic transfer, the magnetic field 9 is applied. A magnetic field having a peak 10 which is by more than 1.5 times higher than the coercive force Hcm of the slave medium is applied to the slave medium, and initial DC magnetization is performed. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 43D:
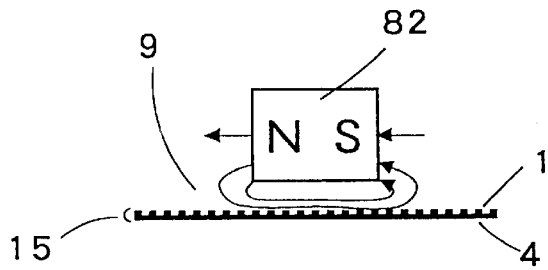

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 43(D), and the distance from the combination unit is increased more than the case of the initial DC magnetization. Under the condition that the magnetic field on the surface of the slave medium is turned to the intensity given by the optimal transfer intensity peak 11b in FIG. 43(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 44 represents drawings to explain a method for applying magnetic field using two electromagnets at adjacent positions and arranged on one surface of a combination unit which comprises a slave medium and a master carrier for magnetic transfer closely combined together.

Figure 44A:
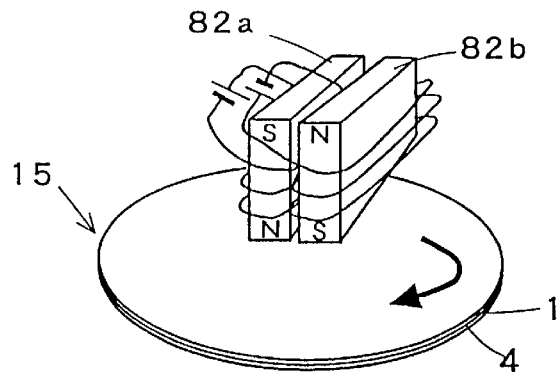
FIG. 44 represents drawings to explain a method for applying magnetic field using two electromagnets placed at adjacent positions and arranged on one surface of a combination unit comprising a slave medium and a master carrier for magnetic transfer closely combined together.

As shown in FIG. 44(A), on one surface of a combination unit 15, two electromagnets 82a and 82b are arranged with magnetic poles in opposite direction, i.e. adjacent magnetic poles to have opposite polarities, and with axis of magnetic poles perpendicularly to the slave medium. Under this condition, the combination unit 15 is rotated.

As described above, the two electromagnets 82a and 82b are arranged to have the magnetic poles in opposite direction, i.e. the adjacent magnetic poles to have opposite polarities, and with axis of each magnetic pole arranged perpendicularly to the slave medium. As a result, as shown in FIG. 44(B), magnetic field of the electromagnet 82a is directed to the electromagnet 82b of the adjacent pair of electromagnets, and a magnetic field 9 is applied to the surface of the slave medium 4.

Figure 44B:
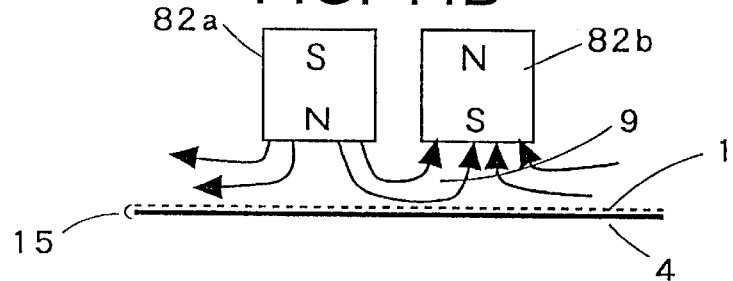
Figure 44C:
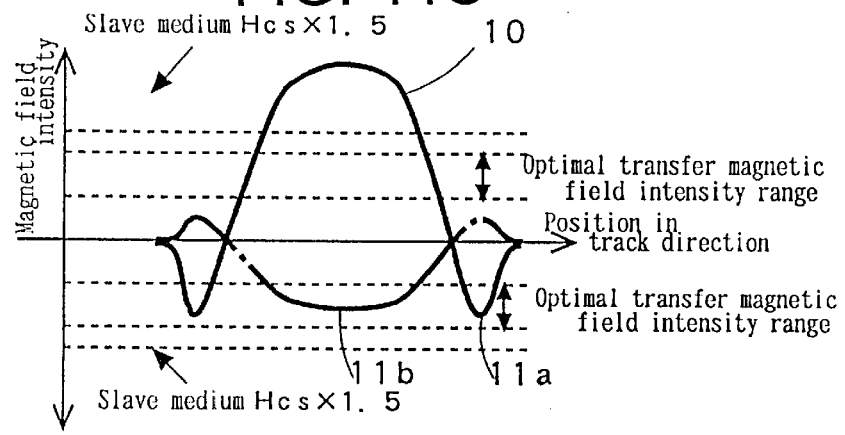

From the single electromagnet 82 arranged on upper surface of the combination unit 15, a magnetic field 9 is applied to the surface of the slave medium 4 as shown in FIG. 44(B). FIG. 44(C) is a diagram to explain magnetic field intensity distribution in this case.

To the combination unit 15 comprising the slave medium 4 and the master carrier 1 for magnetic transfer, the magnetic field 9 is applied. A magnetic field having a peak 10 which is by more than 1.5 times higher than the coercive force Hcm of the slave medium is applied to the slave medium, and initial DC magnetization is performed. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 44D:
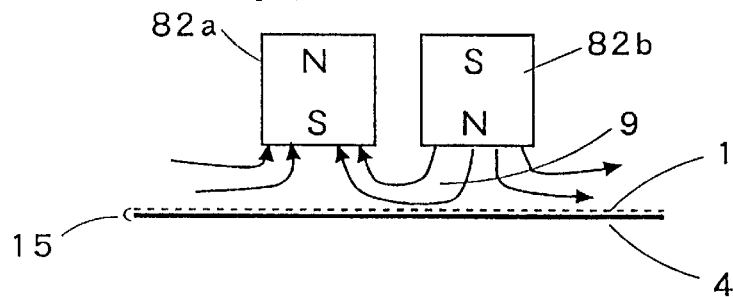

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 44(D), and the distance from the combination unit is increased more than the case of the initial DC magnetization. Under the condition that the magnetic field on the surface of the slave medium is turned to the intensity given by the optimal transfer intensity peak 11b in FIG. 44(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

FIG. 45 represents drawings to explain a method for applying magnetic field using a rig-type head electromagnet. FIG. 45(A) shows an example where a ring-type head electromagnet 84 is arranged on upper surface of the combination unit 15 which comprises a slave medium and a master carrier for magnetic transfer closely combined together, and the combination unit 15 is rotated.

Figure 45A:
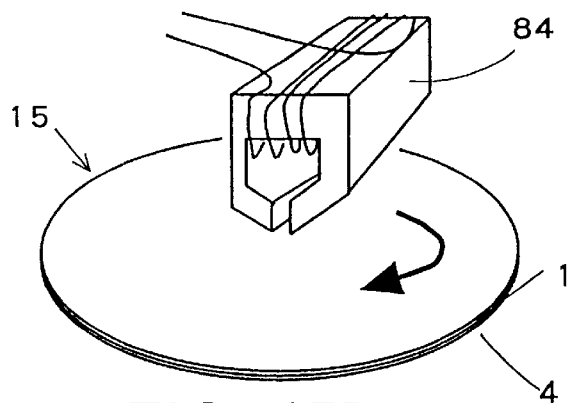
FIG. 45 represents drawings to explain a method for applying magnetic field using a ring-type head electromagnet.
Figure 45B:
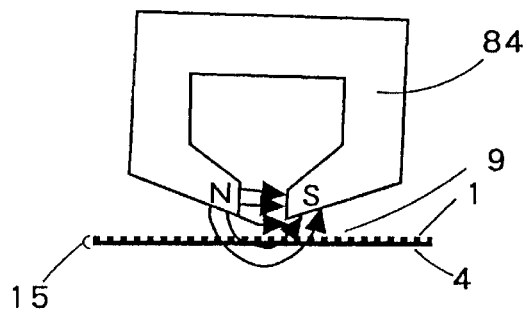

From the ring-type head electromagnet 84 arranged on upper surface of the combination unit 15, a magnetic field 9 is applied to the surface of the slave medium 4 as shown in FIG. 45(B).

Figure 45C:
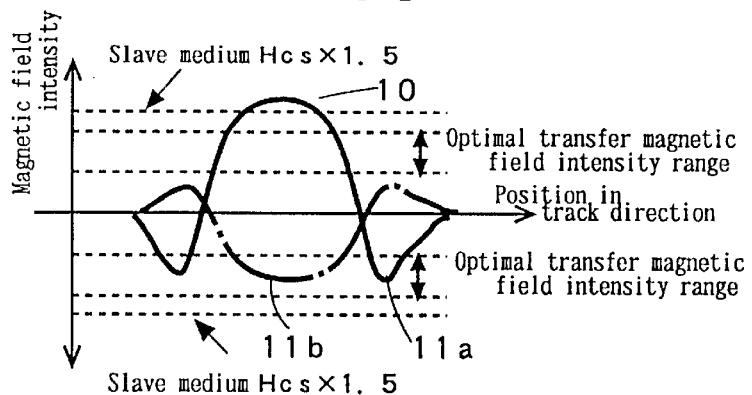

FIG. 45(C) is a diagram showing intensity of the magnetic field applied to the slave medium. The magnetic field applied to the slave medium has a peak 10 which is by more than 1.5 times higher than the coercive force Hcm of the slave medium. By rotating the combination unit or by rotating the ring-type head electromagnet, initial DC magnetization can be performed to the slave medium.

In the example shown in FIG. 45, description has been given on the case where the ring-type head electromagnet is arranged on upper surface of the combination unit, while it may be arranged in any surface or both surfaces of the combination unit.

To the combination unit 15 comprising the slave medium 4 and the master carrier 1 for magnetic transfer, the magnetic field 9 is applied. A magnetic field having a peak 10 which is by more than 1.5 times higher than the coercive force Hcm of the slave medium is applied to the slave medium, and initial DC magnetization is performed. Immediately thereafter, an optimal transfer intensity peak 11a within the optimal transfer magnetic field intensity range is applied, and it is rotated by more than one turn to perform complete initial DC magnetization. At the same time, a magnetic field of the optimal transfer intensity peak 11a, i.e. a magnetic field in opposite direction, is applied, and complete magnetic transfer of the recording information is performed.

Figure 45D:
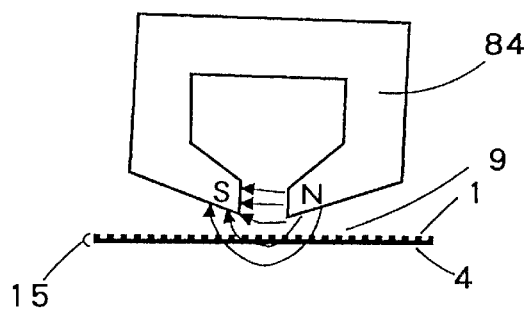

Depending on the pattern of the recording information for transfer, if initial DC magnetization is completely performed and magnetic field for transfer is applied subsequently to the entire surface, initial DC magnetization may be performed again and magnetic transfer pattern may be lost. In such case, magnetic field is applied by more than one turn to perform initial DC magnetization. At the same time, a magnetic field of optimal transfer intensity peak 11a, i.e. a magnetic field in opposite direction from the same magnet, is applied, and magnetic transfer is performed. Then, the rotation is stopped, and the distance between the magnet and the combination unit is increased to such extent that magnetic field intensity on the surface of the slave medium is turned to less than ½ of the coercive force Hcm of the slave medium and the magnetic field gives no more influence to the slave medium. Then, a magnetic field with polarity opposite to the magnetic field, which gave initial DC magnetization, is arranged as shown in FIG. 45(D), and the distance from the combination unit is increased more than the case of the initial DC magnetization. Under the condition that the magnetic field on the surface of the slave medium is turned to the intensity given by the optimal transfer intensity peak 11b in FIG. 45(C), the magnetic field is applied in track direction of the combination unit, and complete magnetic transfer is performed to the entire surface. Then, the distance between the combination unit and the magnet is increased so that the magnetic field intensity on the surface of the slave medium is turned to less than ½ of the coercive force Hcm of the slave medium, and by removing the slave medium from the combination unit, magnetic transfer can be completed.

As the permanent magnet, a permanent magnet made of alloy steel or rare earth elements may be used. As the electromagnet, an electromagnet may be used, which has a core made of soft iron, silicon steel, Permalloy, high magnetic permeability ferrite, etc. at the central portion of the coil such as air-core type solenoid coil.

As the ring-type head electromagnet, core material such as soft iron, silicon steel, Permalloy, high magnetic permeability ferrite, etc. may be used. Head spacing is preferably 1 to 20 mm, or more preferably 5 to 15 mm.

Now, description will be given on a method to manufacture the master carrier for magnetic transfer to be used in the magnetic transfer of the present invention.

As a substrate for the master carrier for magnetic transfer, a planar member with flat and smooth surface may be used, which is made of silicon, quartz plate, glass, non-magnetic metal such as aluminum or alloy, ceramics, synthetic resin, etc., and which has enough resistance to processing environment such as temperature in etching and film forming processes.

On a substrate with flat and smooth surface, photoresist is coated, and light exposure or development is performed using a photo mask to match the pattern of pre-format. Or, the photoresist is directly marked, and a pattern corresponding to the pre-format information is formed.

Next, in the etching process, etching of the substrate is performed corresponding to the pattern by etching means such as reactive etching, physical etching using argon plasma, or etching using liquid.

The depth of the hole to be formed by the etching should be a depth corresponding to thickness of a magnetic layer formed as a transfer information recording portion. It is preferably 20–1000 nm. If it is too thick, spreading width of the magnetic field becomes too large, and this is not desirable.

The holes to be formed have preferably uniform depth so that bottom surface can be formed with a surface plane which runs in parallel to the surface of the substrate.

Also, the hole has preferably such a shape that its cross-section in the track direction perpendicular to the surface is of rectangular shape.

Next, the magnetic material is processed by vacuum film forming means such as vacuum deposition method, sputtering method, ion plating method, and a film of magnetic material is formed up to the surface of the substrate in thickness to correspond to the formed hole. Magnetic characteristics of the transfer information recording portion are as follows: coercive force (Hcm) not more than 198.9 kA/m (2500 Oe), or more preferably, 0.39–119.3 kA/m (5–1500 Oe); saturation magnetic flux density (Bs) not less than 0.3 T (Tesla), or more preferably, not less than 0.5 T.

Then, photoresist is removed by lift-off method. The surface is polished, and burrs are removed if any, and the surface is flattened.

In the above, description has been given on the method to form holes on the substrate and to form a film of magnetic material in the holes thus formed. It may be designed in such manner that the film of magnetic material is formed at predetermined points on the substrate by photo-fabrication method to make convex portions on the transfer information recording portion, and non-magnetic material is formed in film or is filled between the convex portions, and the surface may be made on the same level as the non-magnetic material portion of the transfer information recording portion.

As the magnetic material to be used in the magnetic layer, cobalt, iron or their alloys having high magnetic flux density may be used. More concretely, Co, CoPtCr, CoCr, CoPtCrTa, CoPtCrNbTa, CoCrB, CoNi, Fe, FeCo, FePt, etc. may be used.

The thickness of the magnetic layer is preferably 20–1000 nm, or more preferably, 30–500 nm. If it is too thick, resolution of recording is decreased.

In particular, it is preferable for the purpose of providing clear transfer that magnetic flux density is high and it is in the same direction as the slave medium, e.g. in intra-surface direction in case of intra-surface recording, and to have magnetic anisotropy in vertical direction in case of vertical recording. It is preferable that the magnetic material has a structure of fine magnetic particles or amorphous structure because sharp edge can be produced.

In order to provide magnetic anisotropy on the magnetic material, it is preferable to have a non-magnetic underlayer, and crystal structure and lattice constant should be the same as those of the magnetic layer. More concretely, Cr, CrTi, CoCr, CrTa, CrMo, NiAl, Ru, etc. may be used to form the film by sputtering.

A protective film such as a diamond-like carbon film may be formed on the magnetic layer, and lubricant may be provided. As the protective film, it is more preferable that diamond-like carbon film of 5–30 nm and lubricant are present. The reason why lubricant must be provided is as follows: When deviation is caused during the contact process with the slave medium and this deviation is to be corrected, friction occurs, and if there is no lubricant layer, durability may be decreased.

The master carrier for magnetic transfer according to the present invention can be used not only in the transfer of magnetic recording information to a disk-type magnetic recording medium such as hard disk, large capacity removable type magnetic recording medium, etc. but also in the transfer of magnetic recording information to a card-type magnetic recording medium or a tape-type magnetic recording medium.

In the following, description will be given in detail on the present invention by referring to examples.

EXAMPLE 1-1 AND COMPARATIVE EXAMPLE 1-1

Preparation of Master Carrier for Magnetic Transfer

In a vacuum film-making apparatus, pressure was reduced to $1.33 \times 10^{-5}$ Pa ($10^{-7}$ Torr) at room temperature, and argon was then introduced to turn the pressure to $4.0 \times 10^{-1}$ Pa ($3 \times 10^{-3}$ Torr). Then, a film of FeCo of 200 nm in thickness was formed on a silicon substrate, and this was used as the disk-type master carrier for magnetic transfer with diameter of 3.5 inches.

It had coercive force Hcm of 8 kA/m (100 Oe) and magnetic flux density (Ms) of 28.9T (23000 Gauss).

A disk-like pattern was formed by radial lines extending from the center of the disk to a position of 20–40 mm in radial direction with equal spacing of 10 $\mu$ in width. The spacing of the lines was set to 10 $\mu$m at the innermost position, i.e. 20 mm in radial direction.

Preparation of the Slave Medium

In a vacuum film-making apparatus, pressure was reduced to $1.33 \times 10^{-5}$ Pa ($10^{-7}$ Torr) at room temperature, and argon was then introduced to turn the pressure to $4.0 \times 10^{-1}$ Pa ($3 \times 10^{-3}$ Torr). Then, a glass plate was heated up to 200° C., and a disk-type magnetic recording medium of 3.5 inches in diameter was prepared, which had CoCrPt of 25 nm, Ms of 5.7 T (4500 Gauss), and coercive force (Hcm) of 199 kA/m (2500 Oe).

Initial DC Magnetization of the Slave Medium and Magnetic Transfer Test Method

As the slave medium, a disk-type magnetic recording medium having coercive force Hcm of 199 kA/m (2500 Oe) was used. Using an apparatus for magnetic field application as shown in FIG. 13, with peak magnetic field intensity of 398 kA/m (5000 Oe), i.e. with magnetic field intensity by 2 times higher than the coercive force Hcm of the slave medium, initial DC magnetization was performed under the condition that the slave medium was closely combined with the master carrier for magnetic transfer. Then, under the condition that the slave medium processed by initial DC magnetization was closely combined together with the master carrier for magnetic transfer, using an apparatus for magnetic field application shown in FIG. 28, a magnetic field in opposite direction to the direction of the initial DC magnetization was applied, and the recording information was transferred to the slave medium. The magnetic field for transfer is given by peak intensity of magnetic field distribution shown in FIG. 28.

To combine the master carrier for magnetic transfer with the slave medium, both members were pressurized via an aluminum plate with a rubber sheet interposed between.

Method to Evaluate Electromagnetic Transfer Characteristics

An electromagnetic transfer characteristics measuring system (manufactured by Kyodo Electronics; SS-60) was used to evaluate transfer signal of the slave medium. As the head, an inductive head having head gap of 0.4 $\mu$m and reproduction track width of 3.5 $\mu$m was used.

Reading signal was processed by a spectro-analyzer for frequency analysis, and a difference (C/N) between peak intensity of primary signal (C) and extrapolated medium noise (N) was determined. In the values of C/N at each magnetic field intensity, relative value of $\Delta$C/N was evaluated with the maximum value at 0 dB. The results are shown in Table 1. When the value of C/N was not more than −20 dB, signal quality of magnetic transfer did not reach the level for practical use, and this was indicated with the mark *.

TABLE 1

Hcm of slave medium: 199 kA/m

| Peak intensity of magnetic field for transfer (kA/m) | Ratio to Hcm | ΔC/N (dB) |
|---|---|---|
| 59.7 | 0.3 | * |
| 99.5 | 0.5 | −13.5 |
| 119 | 0.6 | −3.5 |
| 159 | 0.8 | −1.3 |
| 179 | 0.9 | −0.9 |
| 199 | 1.0 | 0.0 |
| 219 | 1.1 | −0.7 |
| 239 | 1.2 | −4.3 |
| 259 | 1.3 | −6.8 |
| 279 | 1.4 | −9.6 |
| 298 | 1.5 | −17.2 |
| 318 | 1.6 | * |
| 398 | 2.0 | * |

EXAMPLE 1-2 AND COMPARATIVE EXAMPLE 1-2

A slave medium having coercive force Hcm of 199 kA/m (2500 Oe) was used. Using an apparatus for magnetic field application shown in FIG. 13 was used, with peak magnetic field intensity of 298 kA/m (3750 Oe), i.e. with magnetic field intensity by 1.5 times higher than the coercive force Hcm of the slave medium, initial DC magnetization of the slave medium was performed under the condition that the slave medium was closely combined with the master carrier for magnetic transfer. Next, using an apparatus for applying magnetic field shown in FIG. 28, under the condition that the slave medium processed by initial DC magnetization and the master carrier for magnetic transfer were closely combined together, magnetic transfer was performed by the same procedure as in Example 1-1 except that magnetic transfer was performed in a transfer magnetic field in opposite direction to the direction of the initial DC magnetization. Measurement was performed by the same procedure as in Example 1-1. The results are shown in FIG. 2. Peak intensity of the magnetic field for transfer shows a peak of magnetic field intensity distribution shown in FIG. 28.

TABLE 2

Hcm of slave medium: 199 kA/m

| Peak intensity of magnetic field for transfer (kA/m) | Ratio to Hcm | ΔC/N (dB) |
|---|---|---|
| 59.7 | 0.3 | * |
| 99.5 | 0.5 | −9.1 |
| 119 | 0.6 | −3.2 |
| 159 | 0.8 | −1.3 |
| 179 | 0.9 | 0.0 |
| 199 | 1.0 | 0.0 |
| 219 | 1.1 | −0.7 |
| 239 | 1.2 | −3.5 |
| 259 | 1.3 | −6.3 |
| 279 | 1.4 | −10.2 |
| 298 | 1.5 | −16.3 |
| 318 | 1.6 | * |
| 398 | 2.0 | * |

COMPARATIVE EXAMPLE 1-3

To a slave medium having coercive force Hcm of 199 kA/m (2500 Oe), using an apparatus for applying magnetic field as shown in FIG. 13, initial DC magnetization of the slave medium was performed with the slave medium closely combined with the master carrier for magnetic transfer with peak magnetic field intensity of 238.7 kA/m (3000 Oe), i.e. with magnetic field intensity by 1.2 times higher than the coercive force Hcm of the slave medium. Next, using an apparatus for applying magnetic field shown in FIG. 28, under the condition that the slave medium processed by initial DC magnetization was closely combined with the master carrier for magnetic transfer, magnetic transfer was performed by the same procedure as in Example 1-1 except that magnetic transfer was performed in a magnetic field for transfer in opposite direction to the direction of the initial DC magnetization. The measurement was performed by the same procedure as in Example 1-1. The results are summarized in Table 3. Peak intensity of the magnetic field for transfer shows a peak of magnetic field intensity distribution shown in FIG. 28.

TABLE 3

Hcm of slave medium: 199 kA/m

| Peak intensity of magnetic field for transfer (kA/m) | Ratio to Hcm | ΔC/N (dB) |
|---|---|---|
| 59.7 | 0.3 | * |
| 99.5 | 0.5 | * |
| 119 | 0.6 | * |
| 159 | 0.8 | * |
| 179 | 0.9 | * |
| 199 | 1.0 | * |
| 219 | 1.1 | * |
| 239 | 1.2 | * |
| 259 | 1.3 | * |
| 279 | 1.4 | * |
| 298 | 1.5 | * |
| 318 | 1.6 | * |
| 398 | 2.0 | * |

EXAMPLE 1-3 AND COMPARATIVE EXAMPLE 1-4

A slave medium having coercive force Hcm of 159 kA/m (2000 Oe) was prepared by the same procedure as in Example 1-1. Using an apparatus for applying magnetic field shown in FIG. 13, with peak magnetic field intensity of 318 kA/m (4000 Oe), i.e. with magnetic field intensity by 2 times higher than the coercive force Hcm of the slave medium, initial DC magnetization of the slave medium was performed under the condition that the slave medium was closely combined with the master carrier for magnetic transfer. Then, using an apparatus for applying magnetic field as shown in FIG. 27, magnetic transfer was performed by the same procedure as in Example 1-1 except that a magnetic field for transfer in opposite direction to the direction of the initial DC magnetization was applied under the condition that the slave medium processed by the initial DC magnetization was closely combined with the master carrier for magnetic transfer. Then, measurement was performed by the same procedure as in Example 1-1. The results are summarized in Table 4. Peak intensity of the magnetic field for transfer shows a peak in magnetic field intensity distribution shown in FIG. 28.

TABLE 4

Hcm of slave medium: 159 kA/m

| Peak intensity of magnetic field for transfer (kA/m) | Ratio to Hcm | ΔC/N (dB) |
|---|---|---|
| 47.7 | 0.3 | * |
| 79.6 | 0.5 | −12.4 |
| 95.5 | 0.6 | −2.6 |
| 127 | 0.8 | −1.1 |
| 143 | 0.9 | −0.1 |
| 159 | 1.0 | 0.0 |
| 175 | 1.1 | −1.5 |
| 191 | 1.2 | −2.9 |
| 207 | 1.3 | −6.9 |
| 223 | 1.4 | −10.3 |
| 239 | 1.5 | −16.4 |
| 255 | 1.6 | * |
| 319 | 2.0 | * |

EXAMPLE 1-4 AND COMPARATIVE EXAMPLE 1-5

To a slave medium having coercive force Hcm of 159 kA/m (2000 Oe), using an apparatus for applying magnetic field as shown in FIG. 13, initial DC magnetization of the slave medium was performed with the slave medium closely combined with the master carrier for magnetic transfer with peak magnetic field intensity of 234 kA/m (3000 Oe), i.e. with magnetic field intensity by 1.5 times higher than the coercive force Hcm of the slave medium. Next, using an apparatus for applying magnetic field shown in FIG. 28, under the condition that the slave medium processed by initial DC magnetization was closely combined with the master carrier for magnetic transfer, magnetic transfer was performed by the same procedure as in Example 1-1 except that magnetic transfer was performed in a magnetic field for transfer in opposite direction to the direction of the initial DC magnetization. The measurement was performed by the same procedure as in Example 1-1. The results are summarized in Table 5. Peak intensity of the magnetic field for transfer shows a peak of magnetic field intensity distribution shown in FIG. 28.

TABLE 5

Hcm of slave medium: 159 kA/m

| Peak intensity of magnetic field for transfer (kA/m) | Ratio to Hcm | ΔC/N (dB) |
|---|---|---|
| 47.7 | 0.3 | * |
| 79.6 | 0.5 | −16.9 |
| 95.5 | 0.6 | −5.6 |
| 127 | 0.8 | −0.8 |
| 143 | 0.9 | −0.1 |
| 159 | 1.0 | 0.0 |
| 175 | 1.1 | −0.8 |
| 191 | 1.2 | −3.8 |
| 207 | 1.3 | −6.8 |
| 223 | 1.4 | −9.3 |
| 239 | 1.5 | −18.4 |
| 255 | 1.6 | * |
| 318 | 2.0 | * |

COMPARATIVE EXAMPLE 1-6

A slave medium having coercive force Hcm of 159 kA/m. (2000 Oe) was prepared by the same procedure as in Example 1-1. Using an apparatus for applying magnetic field shown in FIG. 13, with peak magnetic field intensity of 191 kA/m (2400 Oe), i.e. with magnetic field intensity by 1.2 times higher than the coercive force Hcm of the slave medium, initial DC magnetization of the slave medium was performed under the condition that the slave medium was closely combined with the master carrier for magnetic transfer. Then, using an apparatus for applying magnetic field as shown in FIG. 28, magnetic transfer was performed by the same procedure as in Example 1-1 except that a magnetic field for transfer in opposite direction to the direction of the initial DC magnetization was applied under the condition that the slave medium processed by the initial DC magnetization was closely combined with the master carrier for magnetic transfer. Then, measurement was performed by the same procedure as in Example 1-1. The results are summarized in Table 6. Peak intensity of the magnetic field for transfer shows a peak in magnetic field intensity distribution shown in FIG. 28.

TABLE 6

Hcm of slave medium: 159 kA/m

| Peak intensity of magnetic field for transfer (kA/m) | Ratio to Hcm | ΔC/N (dB) |
|---|---|---|
| 47.7 | 0.3 | * |
| 79.6 | 0.5 | * |
| 95.5 | 0.6 | * |
| 127 | 0.8 | * |
| 143 | 0.9 | * |
| 159 | 1.0 | * |
| 175 | 1.1 | * |
| 191 | 1.2 | * |
| 207 | 1.3 | * |
| 223 | 1.4 | * |
| 239 | 1.5 | * |
| 255 | 1.6 | * |
| 318 | 2.0 | * |

EXAMPLE 2-1 AND COMPARATIVE EXAMPLE 2-1

Preparation of Master Carrier for Magnetic Transfer

A master carrier for magnetic transfer was prepared by the same procedure as in Example 1-1.

Preparation of Slave Medium

A slave medium was prepared by the same procedure as in Example 1-1.

Initial DC Magnetization of Slave Medium and Magnetic Transfer Test Method

As the slave medium, a disk-type magnetic recording medium having coercive force Hcm of 199 kA/m (2500 Oe) was used. Using an apparatus for applying magnetic field as shown in FIG. 35, with peak magnetic intensity of 398 kA/m (5000 Oe), i.e. with magnetic field intensity by 2 times higher than the coercive force Hcm of the slave medium, the combination unit comprising the slave medium and the master carrier for magnetic transfer was rotated by one and half turns to perform initial DC magnetization and magnetic transfer, and the rotation was stopped. Then, the distance between the permanent magnet and the combination unit was widened until intensity of the magnetic field applied to the slave medium was turned to less than ½ of the coercive force Hcm of the slave medium, and the magnetic field applied to the slave medium was reversed. After a predetermined magnetic field for transfer was applied to the surface of the slave medium, the distance between the magnet and the combination unit was widened. After the distance between the permanent magnet and the combination unit was widened until the intensity of magnetic field applied to the slave medium was turned to less than ½ of the coercive force Hcm of the slave medium, the combination unit was removed.

To combine the master carrier for magnetic transfer with the slave medium, both members were pressurized via an aluminum plate with a rubber sheet interposed between.

Method to Evaluate Electromagnetic Transfer Characteristics

An electromagnetic transfer characteristics measuring system (manufactured by Kyodo Electronics; SS-60) was used to evaluate transfer signal of the slave medium. As the head, an inductive head having head gap of 0.39 μm and reproduction track width of 3.6 μm was used.

Reading signal was processed by a spectro-analyzer for frequency analysis, and a difference (C/N) between peak intensity of primary signal (C) and extrapolated medium noise (N) was determined. In the values of C/N at each magnetic field intensity, relative value of ΔC/N was evaluated with the maximum value at 0 dB. The results are shown in Table 7. When the value of C/N was not more than −20 dB, signal quality of magnetic transfer did not reach the level for practical use, and this was indicated with the mark *. Peak intensity of the magnetic field for transfer shows a peak in magnetic field intensity distribution shown in FIG. 28.

TABLE 7

Hcm of slave medium: 199 kA/m
Peak intensity of magnetic

| field for transfer (kA/m) | Ratio to Hcm | ΔC/N (dB) |
|---|---|---|
| 59.7 | 0.3 | * |
| 99.5 | 0.5 | −15.2 |
| 119 | 0.6 | −3.6 |
| 159 | 0.8 | −2.5 |
| 179 | 0.9 | −0.6 |
| 199 | 1.0 | 0.0 |
| 219 | 1.1 | −0.7 |
| 239 | 1.2 | −4.7 |
| 259 | 1.3 | −6.3 |
| 279 | 1.4 | −11.2 |
| 298 | 1.5 | −18.4 |
| 318 | 1.6 | * |
| 398 | 2.0 | * |

EXAMPLE 2-2 AND COMPARATIVE EXAMPLE 2-2

A slave medium having coercive force Hcm of 199 kA/m (2500 Oe) was used. Using an apparatus for applying magnetic field as shown in FIG. 35, with peak magnetic field intensity of 298 kA/m (3750 Oe), i.e. with magnetic field intensity by 1.5 times higher than the coercive force Hcm of the slave medium, under the condition that the slave medium was closely combined with the master carrier for magnetic transfer, the combination unit was rotated by one and half turns to perform initial DC magnetization and magnetic transfer, and the rotation was stopped. Then, the distance between the permanent magnet and the combination unit was widened until the magnetic field intensity applied to the slave medium was turned to less than ½ of the coercive force Hcm of the slave medium. Next, the magnetic field applied to the slave medium was reversed, and the predetermined magnetic field for transfer was applied to the surface of the slave medium. Further, the distance between the magnet and the combination unit was widened. The distance between the permanent magnet and the combination unit was widened until the magnetic field intensity was turned to less than ½ of the coercive force Hcm of the slave medium. Then, the combination unit was removed, and the measurement was performed by the same procedure as in Example 2-1. The results are shown in Table 8. Peak intensity of the magnetic field for transfer shows peak intensity of the magnetic field applied to the slave medium.

TABLE 8

Hcm of slave medium: 199 kA/m
Peak intensity of magnetic

| field for transfer (kA/m) | Ratio to Hcm | ΔC/N (dB) |
|---|---|---|
| 59.7 | 0.3 | * |
| 99.5 | 0.5 | −12.3 |
| 119 | 0.6 | −3.9 |
| 159 | 0.8 | −2.1 |
| 179 | 0.9 | 0.6 |
| 199 | 1.0 | 0.0 |
| 219 | 1.1 | −0.2 |
| 239 | 1.2 | −3.9 |
| 259 | 1.3 | −9.2 |
| 279 | 1.4 | −11.3 |
| 298 | 1.5 | −16.2 |
| 318 | 1.6 | * |
| 398 | 2.0 | * |

COMPARATIVE EXAMPLE 2-3

A slave medium having coercive force Hcm of 199 kA/m (2500 Oe) was used. Using an apparatus for applying magnetic field as shown in FIG. 4, with peak magnetic field intensity of 239 kA/m (3000 Oe), i.e. with magnetic field intensity by 1.2 times higher than the coercive force Hcm of the slave medium, under the condition that the slave medium was closely combined with the master carrier for magnetic transfer, the combination unit was rotated by one and half turns to perform initial DC magnetization and magnetic transfer, and the rotation was stopped. Then, the distance between the permanent magnet and the combination unit was widened until the magnetic field intensity applied to the slave medium was turned to less than ½ of the coercive force Hcm of the slave medium. Next, the magnetic field applied to the slave medium was reversed, and the predetermined magnetic field for transfer was applied to the surface of the slave medium. Further, the distance between the magnet and the combination unit was widened. The distance between the permanent magnet and the combination unit was widened until the magnetic field intensity was turned to less than ½ of the coercive force Hcm of the slave medium. Then, the combination unit was removed, and the measurement was performed by the same procedure as in Example 2-1. The results are shown in Table 9. Peak intensity of the magnetic field for transfer shows peak intensity of the magnetic field applied to the slave medium.

TABLE 9

Hcm of slave medium: 199 kA/m
Peak intensity of magnetic

| field for transfer (kA/m) | Ratio to Hcm | ΔC/N (dB) |
|---|---|---|
| 59.7 | 0.3 | * |
| 99.5 | 0.5 | * |
| 119 | 0.6 | * |
| 159 | 0.8 | * |
| 179 | 0.9 | * |
| 199 | 1.0 | * |
| 219 | 1.1 | * |

TABLE 9-continued

Hcm of slave medium: 199 kA/m
Peak intensity of magnetic

| field for transfer (kA/m) | Ratio to Hcm | ΔC/N (dB) |
|---|---|---|
| 239 | 1.2 | * |
| 259 | 1.3 | * |
| 279 | 1.4 | * |
| 298 | 1.5 | * |
| 318 | 1.6 | * |
| 398 | 2.0 | * |

EXAMPLE 2-3 AND COMPARATIVE EXAMPLE 2-4

A slave medium having coercive force Hcm of 159 kA/m (2000 Oe) was prepared by the same procedure as in Example 1. Using an apparatus for applying magnetic field as shown in FIG. 35, with peak magnetic field intensity of 318 kA/m (4000 Oe), i.e. with magnetic field intensity by 2 times higher than the coercive force Hcm of the slave medium, the combination unit comprising the slave medium and the master carrier for magnetic transfer was rotated by one and half turns to perform initial DC magnetization and magnetic transfer, and the rotation was stopped. Then, the distance between the permanent magnet and the combination unit was widened until the intensity of the magnetic field applied to the slave medium was turned to less than ½ of the coercive force Hcm of the slave medium. Then, the magnetic field applied to the slave medium was reversed, and the predetermined magnetic field for transfer was applied to the surface of the slave medium. Then, the distance between the magnet and the combination unit was widened. The distance between the permanent magnet and the combination unit was widened until the intensity of the magnetic field applied to the slave medium was turned to less than ½ of the coercive force Hcm of the slave medium, and the combination unit was removed.

Measurement was made by the same procedure as in Example 1, and the results are shown in Table 10. Peak intensity of magnetic field for transfer shows a peak intensity of the magnetic field applied to the slave medium.

TABLE 10

Hcm of slave medium: 159 kA/m
Peak intensity of magnetic

| field for transfer (kA/m) | Ratio to Hcm | ΔC/N (dB) |
|---|---|---|
| 47.7 | 0.3 | * |
| 79.6 | 0.5 | −10.7 |
| 95.5 | 0.6 | −3.9 |
| 127 | 0.8 | −2.6 |
| 143 | 0.9 | −0.1 |
| 159 | 1.0 | 0.0 |
| 175 | 1.1 | 1.0 |
| 191 | 1.2 | −3.9 |
| 207 | 1.3 | −6.2 |
| 223 | 1.4 | −8.3 |
| 239 | 1.5 | −16.3 |
| 255 | 1.6 | * |
| 318 | 2.0 | * |

EXAMPLE 2-4 AND COMPARATIVE EXAMPLE 2-5

A slave medium having coercive force Hcm of 159 kA/m (2000 Oe) was used. Using an apparatus for applying magnetic field as shown in FIG. 35, with peak magnetic field intensity of 239 kA/m (3000 Oe), i.e. with magnetic field intensity by 1.5 times higher than the coercive force Hcm of the slave medium, the combination unit comprising the slave medium and the master carrier for magnetic transfer was rotated by one and half turns to perform initial DC magnetization and magnetic transfer, and the rotation was stopped. Then, the distance between the permanent magnet and the combination unit was widened to such extent that the intensity of the magnetic field applied to the slave medium was turned to less than ½ of the coercive force Hcm of the slave medium, and the magnetic field applied to the slave medium was reversed. After the predetermined magnetic field for transfer was applied to the surface of the slave medium, the distance between the magnet and the combination unit was widened. After the distance between the permanent magnet and the combination unit was widened to such extent that the intensity of the magnetic field applied to the slave medium was turned to less than ½ of the coercive force Hcm of the slave medium, the combination unit was removed. Measurement was made by the same procedure as in Example 2-1, and the results are summarized in Table 11. Peak intensity of the magnetic field for transfer is given by peak intensity of the magnetic field applied to the slave medium.

TABLE 11

Hcm of slave medium: 159 kA/m
Peak intensity of magnetic

| field for transfer (kA/m) | Ratio to Hcm | ΔC/N (dB) |
|---|---|---|
| 47.7 | 0.3 | * |
| 79.6 | 0.5 | −13.5 |
| 95.5 | 0.6 | −4.3 |
| 127 | 0.8 | −3.8 |
| 143 | 0.9 | −0.2 |
| 159 | 1.0 | 0.0 |
| 175 | 1.1 | −0.8 |
| 191 | 1.2 | −4.5 |
| 207 | 1.3 | −6.8 |
| 223 | 1.4 | −11.9 |
| 239 | 1.5 | −19.2 |
| 255 | 1.6 | * |
| 318 | 2.0 | * |

COMPARATIVE EXAMPLE 2-6

A slave medium having coercive force Hcm of 159 kA/m (2000 Oe) prepared by the same procedure as in Example 2-1 was used. Using an apparatus for applying magnetic field as shown in FIG. 43, with peak magnetic field intensity of 191 kA/m (2400 Oe), i.e. with magnetic field intensity by 1.2 times higher than the coercive force Hcm of the slave, medium, the combination unit comprising the slave medium and the master carrier for magnetic transfer was rotated by one and half turns to perform initial DC magnetization and magnetic transfer, and the rotation was stopped. Then, the distance between the permanent magnet and the combination unit was widened to such extent that the intensity of the magnetic field applied to the slave medium was turned to less than ½ of the coercive force Hcm of the slave medium, and the magnetic field applied to the slave medium was reversed. After the predetermined magnetic field for transfer was applied to the surface of the slave medium, the distance between the magnet and the combination unit was widened. After the distance between the permanent magnet and the combination unit was widened to such extent that the intensity of the magnetic field applied to the slave medium was turned to less than ½ of the coercive force Hcm of the slave medium, the combination unit was removed. Measurement was made by the same procedure as in Example 2-1, and the results are summarized in Table 11. Peak intensity of the magnetic field for transfer is given by peak intensity of the magnetic field applied to the slave medium.

TABLE 12

Hcm of slave medium: 159 kA/m

| Peak intensity of magnetic field for transfer (kA/m) | Ratio to Hcm | ΔC/N (dB) |
|---|---|---|
| 47.7 | 0.3 | * |
| 79.6 | 0.5 | * |
| 95.5 | 0.6 | * |
| 127 | 0.8 | * |
| 143 | 0.9 | * |
| 159 | 1.0 | * |
| 175 | 1.1 | * |
| 191 | 1.2 | * |
| 207 | 1.3 | * |
| 223 | 1.4 | * |
| 239 | 1.5 | * |
| 255 | 1.6 | * |
| 318 | 2.0 | * |

As described above, according to the present invention, in the magnetic transfer from the master carrier for magnetic transfer to the slave medium, by applying magnetic field for transfer with a specific intensity to the coercive force Hcm of the slave medium, it is possible to obtain a slave medium, which has transfer pattern of high quality regardless of position and shape of the pattern.

What is claimed is:

1. A method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprises a step of performing initial DC magnetization prior to the magnetic transfer under the condition that said master carrier for magnetic transfer is closely combined together with said slave medium.

2. A method for magnetic transfer according to claim 1, wherein said method comprises the steps of generating a magnetic field, on a part in track direction, with magnetic field intensity distribution having a portion with magnetic field intensity by more than 1.5 times higher than coercive force Hcm of the slave medium at least at one point on a position in track direction, and of applying magnetic field for performing initial DC magnetization in track direction on the slave medium by rotating a combination unit comprising the slave medium and the master carrier for magnetic transfer combined closely together or by rotating the magnetic field in track direction.

3. A method for magnetic transfer according to claim 2, wherein the coercive force Hcm of the magnetic layer of said master carrier for magnetic transfer is not more than 47.7 kA/m (600 Oe).

4. A method for magnetic transfer according to claim 2, wherein the coercive force Hcm of the slave medium receiving the magnetic transfer is not less than 143 kA/m (1800 Oe).

5. A method for magnetic transfer according to claim 2, wherein the direction of initial DC magnetization by applying magnetic field in track direction on the slave medium is in opposite direction to the magnetic field for transfer applied to perform magnetic transfer on the surface of the slave medium.

6. A method for magnetic transfer according to claim 2, wherein a portion with magnetic field intensity higher than the maximum value of the optimal transfer magnetic field intensity range is not present in any of track direction, and a portion with magnetic field intensity within the optimal transfer magnetic field intensity range is present at least at one point in one track direction, said method comprising the steps of generating a magnetic field with magnetic field intensity distribution where magnetic field intensity in track direction opposite thereto is lower than the minimum value of the optimal transfer magnetic field intensity range at a position in any track direction, and of applying magnetic field for transfer in track direction on the surface of the slave medium by rotating a combination unit of the master carrier for magnetic transfer closely combined together with the slave medium processed by initial DC magnetization in track direction or by rotating the magnetic field in track direction.

7. A method for magnetic transfer according to claim 6, wherein the optimal transfer magnetic field intensity is in the range of 0.6×Hcm to 1.3×Hcm to the coercive force Hcm of the slave medium.

8. A method for magnetic transfer according to claim 1, wherein the coercive force Hcm of the magnetic layer of said master carrier for magnetic transfer is not more than 47.7 kA/m (600 Oe).

9. A method for magnetic transfer according to claim 1, wherein the coercive force Hcm of the slave medium receiving the magnetic transfer is not less than 143 kA/m (1800 Oe).

10. A method for magnetic transfer according to claim 1, wherein the direction of initial DC magnetization by applying magnetic field in track direction on the slave medium is in opposite direction to the magnetic field for transfer applied to perform magnetic transfer on the surface of the slave medium.

11. The method of claim 1, wherein said magnetic transfer comprises generating a magnetic field in one portion in the track direction, said magnetic field having such magnetic field intensity distribution that there is a magnetic field intensity higher than the maximum value in the optimal transfer magnetic field intensity range at any position in any track direction, that there is a magnetic field intensity within the optimal transfer magnetic field intensity range at least at one point in one track direction, and that a magnetic field intensity in the track direction opposite thereto is lower than the minimum value of the optimal transfer magnetic field intensity range at any position in any track direction, whereby said method further comprises (a) rotating a combination unit comprising the master carrier for magnetic transfer closely combined together with the slave medium processed by initial DC magnetization in track direction, or (b) rotating the magnetic field in track direction to apply the magnetic field for transfer in track direction on the surface of the slave medium.

12. The method of claim 11, wherein the optimal transfer magnetic field intensity is in the range of 0.6×Hcm to 1.3×Hcm.

13. A method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprising the steps of applying magnetic field in track direction on the surface of the slave medium under the condition that said master carrier for magnetic transfer is closely combined together with said slave medium, and after performing initial DC magnetization in track direction on the slave medium in advance, of applying a magnetic field for transfer in track direction on the surface of the slave medium, and of performing magnetic transfer.

14. A method for magnetic transfer according to claim 13, wherein said method comprises the steps of generating a magnetic field, on a part in track direction, with magnetic field intensity distribution having a portion with magnetic field intensity by more than 1.5 times higher than coercive force Hcm of the slave medium at least at one point on a position in track direction, and of applying magnetic field for performing initial DC magnetization in track direction on the slave medium by rotating a combination unit comprising the slave medium and the master carrier for magnetic transfer combined closely together or by rotating the magnetic field in track direction.

15. A method for magnetic transfer according to claim 14, wherein the coercive force Hcm of the magnetic layer of said master carrier for magnetic transfer is not more than 47.7 kA/m (600 Oe).

16. A method for magnetic transfer according to claim 14, wherein the coercive force Hcm of the slave medium receiving the magnetic transfer is not less than 143 kA/m (1800 Oe).

17. A method for magnetic transfer according to claim 14, wherein the direction of initial DC magnetization by applying magnetic field in track direction on the slave medium is in opposite direction to the magnetic field for transfer applied to perform magnetic transfer on the surface of the slave medium.

18. A method for magnetic transfer according to claim 14, wherein a portion with magnetic field intensity higher than the maximum value of the optimal transfer magnetic field intensity range is not present in any of track direction, and a portion with magnetic field intensity within the optimal transfer magnetic field intensity range is present at least at one point in one track direction, said method comprising the steps of generating a magnetic field with magnetic field intensity distribution where magnetic field intensity in track direction opposite thereto is lower than the minimum value of the optimal transfer magnetic field intensity range at a position in any track direction, and of applying magnetic field for transfer in track direction on the surface of the slave medium by rotating a combination unit of the master carrier for magnetic transfer closely combined together with the slave medium processed by initial DC magnetization in track direction or by rotating the magnetic field in track direction.

19. A method for magnetic transfer according to claim 18, wherein the optimal transfer magnetic field intensity is in the range of 0.6×Hcm to 1.3×Hcm to the coercive force Hcm of the slave medium.

20. A method for magnetic transfer according to claim 13, wherein the coercive force Hcm of the magnetic layer of said master carrier for magnetic transfer is not more than 47.7 kA/m (600 Oe).

21. A method for magnetic transfer according to claim 13, wherein the coercive force Hcm of the slave medium receiving the magnetic transfer is not less than 143 kA/m (1800 Oe).

22. A method for magnetic transfer according to claim 13, wherein the direction of initial DC magnetization by applying magnetic field in track direction on the slave medium is in opposite direction to the magnetic field for transfer applied to perform magnetic transfer on the surface of the slave medium.

23. A method for magnetic transfer according to claim 13, wherein a portion with magnetic field intensity higher than the maximum value of the optimal transfer magnetic field intensity range is not present in any of track direction, and a portion with magnetic field intensity within the optimal transfer magnetic field intensity range is present at least at one point in one track direction, said method comprising the steps of generating a magnetic field with magnetic field intensity distribution where magnetic field intensity in track direction opposite thereto is lower than the minimum value of the optimal transfer magnetic field intensity range at a position in any track direction, and of applying magnetic field for transfer in track direction on the surface of the slave medium by rotating a combination unit of the master carrier for magnetic transfer closely combined together with the slave medium processed by initial DC magnetization in track direction or by rotating the magnetic field in track direction.

24. A method for magnetic transfer according to claim 23, wherein the optimal transfer magnetic field intensity is in the range of 0.6×Hcm to 1.3×Hcm to the coercive force Hcm of the slave medium.

25. A method for magnetic transfer for applying magnetic field for transfer by combining a master carrier for magnetic transfer closely together with a slave medium, said master carrier having a magnetic layer formed on a portion corresponding to an information signal on surface of a substrate, and said slave medium receiving magnetic transfer, said method comprising the steps of generating a magnetic field with magnetic field intensity distribution for initial DC magnetization by more than 1.5 times higher than coercive force Hcm of the slave medium on a portion in track direction, and after the magnetic field for initial DC magnetization has been applied, under the condition that the slave medium is closely combined together with the master carrier for magnetic transfer so that the magnetic field for magnetic transfer is applied on the surface of the slave medium, of applying magnetic field in track direction on the surface of the slave medium under the condition that the master carrier for magnetic transfer is closely combined together with the slave medium by rotating the combination unit or the magnetic field, and of performing magnetic transfer by applying the magnetic field for transfer to the surface of the slave medium immediately after the initial DC magnetization of the slave medium.

26. A method for magnetic transfer according to claim 25, wherein the coercive force Hcm of the magnetic layer of said master carrier for magnetic transfer is not more than 47.7 kA/m (600 Oe).

27. A method for magnetic transfer according to claim 25, wherein the coercive force Hcm of the slave medium receiving the magnetic transfer is not less than 143 kA/m (1800 Oe).

28. A method for magnetic transfer according to claim 25, wherein the direction of initial DC magnetization by applying magnetic field in track direction on the slave medium is in opposite direction to the magnetic field for transfer applied to perform magnetic transfer on the surface of the slave medium.

29. A method for magnetic transfer according to claim 25, wherein a portion with magnetic field intensity higher than the maximum value of the optimal transfer magnetic field intensity range is not present in any of track direction, and a portion with magnetic field intensity within the optimal transfer magnetic field intensity range is present at least at one point in one track direction, said method comprising the steps of generating a magnetic field with magnetic field intensity distribution where magnetic field intensity in track direction opposite thereto is lower than the minimum value of the optimal transfer magnetic field intensity range at a position in any track direction, and of applying magnetic field for transfer in track direction on the surface of the slave medium by rotating a combination unit of the master carrier for magnetic transfer closely combined together with the slave medium processed by initial DC magnetization in track direction or by rotating the magnetic field in track direction.

30. A method for magnetic transfer according to claim 29, wherein the optimal transfer magnetic field intensity is in the range of 0.6×Hcm to 1.3×Hcm to the coercive force Hcm of the slave medium.

31. An apparatus for magnetic transfer for applying magnetic field for transfer by combining a master carrier for magnetic transfer and a slave medium closely together, said master carrier having a magnetic layer formed on a portion corresponding to an information signal on surface of a substrate, and said slave medium receiving magnetic transfer, said apparatus comprising means for combining said master carrier for magnetic transfer with said slave medium closely together, initial DC magnetizing means for performing initial DC magnetization in track direction on the slave medium by applying magnetic field in advance in track direction on the surface of the slave medium under the condition that said master carrier for magnetic transfer is closely combined together with the slave medium, and transfer magnetic field applying means for applying magnetic field for transfer in track direction of the slave medium under the condition that said master carrier for magnetic transfer is closely combined together with the slave medium.

32. An apparatus for magnetic transfer according to claim 31, wherein the coercive force Hcm of the magnetic layer of said master carrier for magnetic transfer is not more than 47.7 kA/m (600 Oe).

33. An apparatus for magnetic transfer according to claim 31, wherein the coercive force Hcm of the magnetic layer of said slave medium receiving magnetic transfer is not more than 143 kA/m (1800 Oe).

34. An apparatus for magnetic transfer according to claim 31, wherein the direction of initial DC magnetization by applying magnetic field in track direction on the slave. medium is in opposite direction, on the surface of the slave medium, to the magnetic field for transfer applied for performing magnetic transfer.

35. An apparatus for magnetic transfer according to claim 31, wherein said initial DC magnetizing means has a portion with magnetic field intensity by more than 1.5 times higher than the coercive force Hcm of the slave medium only in one direction at a position in track direction, the magnetic field intensity is such that a magnetic field with magnetic field intensity distribution lower than the coercive force Hcm of the slave medium at any position in any track direction is generated at one portion in track direction, and a magnetic field for initial DC magnetization is applied in track direction on the slave medium by rotating the combination unit of the slave medium with the master carrier for magnetic transfer or by rotating the magnetic field in track direction.

36. An apparatus for magnetic transfer according to claim 31, wherein said transfer magnetic field applying means comprises means for generating a magnetic field in one portion in track direction, said magnetic field has such magnetic field intensity distribution that there is a magnetic field intensity higher than the maximum value in the optimal transfer magnetic field intensity range at any position in any track direction, that there is a magnetic field intensity within the optimal transfer magnetic field intensity range at least at one point in one track direction, and that a magnetic field intensity in track direction opposite thereto is lower than the minimum value of the optimal transfer magnetic field intensity range at any position in any track direction, whereby said apparatus comprises means for rotating a combination unit comprising the master carrier for magnetic transfer closely combined together with the slave medium processed by initial DC magnetization in track direction, or means for rotating the magnetic field in track direction to apply the magnetic field for transfer in track direction on the surface of the slave medium.

37. An apparatus for magnetic transfer according to claim 36, wherein the optimal transfer magnetic field intensity is in the range of 0.6×Hcm to 1.3×Hcm.

38. The apparatus of claim 31, wherein poles of said magnetic field applying means are configured parallel to track direction.

39. The apparatus of claim 31, wherein said magnetic field applying means comprises an annular electromagnet.

40. An apparatus for magnetic transfer for applying magnetic field for transfer by combining a master carrier for magnetic transfer and a slave medium closely together, said master carrier having a magnetic layer formed on a portion corresponding to an information signal on surface of a substrate, and said slave medium receiving magnetic transfer, said apparatus comprises means for applying initial DC magnetization by more than 1.5 times higher than the coercive force Hcm of the slave medium, means for applying magnetic field for magnetic transfer within the optimal transfer magnetic field intensity range in opposite direction to the magnetic field for initial DC magnetization, means for combining the slave medium with the master carrier for magnetic transfer closely together, and rotating means for rotating either the combination unit comprising the slave medium and the master carrier for magnetic transfer or the magnetic field in track direction, whereby the magnetic field is applied in track direction on the surface of the slave medium under the condition that the slave medium is combined with the master carrier for magnetic transfer closely together, and immediately after the completion of initial DC magnetization in track direction of the slave medium, magnetic transfer is performed by applying the magnetic field for transfer in track direction of the slave medium under the condition that the slave medium is combined with the master carrier for magnetic transfer closely together.

41. An apparatus for magnetic transfer according to claim 40, wherein the optimal transfer magnetic field intensity is in the range of 0.6×Hcm to 1.3×Hcm.

42. The apparatus of claim 40, wherein said initial DC magnetizing means has a portion with magnetic field intensity more than 1.5 times higher than the coercive force Hcm of the slave medium only in one direction at a position in the track direction, the magnetic field intensity is such that a magnetic field with magnetic field intensity distribution lower than the coercive force Hcm of the slave medium at any position in any track direction is generated at one portion in the track direction, and a magnetic field for initial DC magnetization is applied in the track direction on the slave medium by rotating the combination unit of the slave medium with the master carrier for magnetic transfer or by rotating the magnetic field in the track direction.

43. The apparatus of claim 40, wherein said transfer magnetic field applying means comprises means for generating a magnetic field in one portion in the track direction, said magnetic field has such magnetic field intensity distribution that there is a magnetic field intensity higher than the maximum value in the optimal transfer magnetic field intensity range at any position in any track direction, that there is a magnetic field intensity within the optimal transfer magnetic field intensity range at least at one point in one track direction, and that a magnetic field intensity in track direction opposite thereto is lower than the minimum value of the optimal transfer magnetic field intensity range at any position in any track direction, whereby said apparatus comprises means for rotating a combination unit comprising the master carrier for magnetic transfer closely combined together with the slave medium processed by initial DC magnetization in the track direction, or means for rotating the magnetic field in the track direction to apply the magnetic field for transfer in the track direction on the surface of the slave medium.

44. The apparatus of claim 43, wherein the optimal transfer magnetic field intensity is in the range of 0.6×Hcm to 1.3×Hcm.

* * * * *